(12) United States Patent
Kamo et al.

(10) Patent No.: US 8,558,733 B2
(45) Date of Patent: Oct. 15, 2013

(54) RADAR APPARATUS AND COMPUTER PROGRAM

(75) Inventors: Hiroyuki Kamo, Kanagawa (JP); Takeshi Kambe, Kanagawa (JP)

(73) Assignee: Honda Elesys Co., Ltd., Yokohama (JP)

( * ) Notice: Subject to any disclaimer, the term of this patent is extended or adjusted under 35 U.S.C. 154(b) by 233 days.

(21) Appl. No.: 13/064,270

(22) Filed: Mar. 15, 2011

(65) Prior Publication Data

US 2011/0221628 A1    Sep. 15, 2011

(30) Foreign Application Priority Data

Mar. 15, 2010 (JP) ............................... P.2010-057982
Jul. 7, 2010 (JP) ............................... P.2010-155052

(51) Int. Cl.
*G01S 13/93* (2006.01)

(52) U.S. Cl.
USPC ............................................. 342/70; 342/27

(58) Field of Classification Search
USPC .............................................. 342/27, 70–72
See application file for complete search history.

(56) References Cited

U.S. PATENT DOCUMENTS

| | | | | |
|---|---|---|---|---|
| 4,308,536 A * | 12/1981 | Sims et al. | | 342/70 |
| 5,351,032 A * | 9/1994 | Latorre et al. | | 340/983 |
| 5,389,912 A * | 2/1995 | Arvin | | 340/435 |
| 7,592,945 B2 * | 9/2009 | Colburn et al. | | 342/70 |
| 7,877,209 B2 * | 1/2011 | Harris et al. | | 701/301 |
| 8,106,755 B1 * | 1/2012 | Knox | | 340/439 |
| 8,207,836 B2 * | 6/2012 | Nugent | | 340/435 |
| 8,354,920 B2 * | 1/2013 | Kole | | 340/435 |
| 2003/0001771 A1 * | 1/2003 | Ono | | 342/70 |
| 2004/0183661 A1 * | 9/2004 | Bowman | | 340/435 |
| 2008/0077327 A1 * | 3/2008 | Harris et al. | | 701/301 |
| 2009/0002222 A1 * | 1/2009 | Colburn et al. | | 342/145 |
| 2011/0181407 A1 * | 7/2011 | Kole | | 340/435 |
| 2011/0221628 A1 * | 9/2011 | Kamo et al. | | 342/70 |

FOREIGN PATENT DOCUMENTS

JP    2006-275840    10/2006

* cited by examiner

*Primary Examiner* — John B Sotomayor

(57) ABSTRACT

According to embodiments, there is provided a radar apparatus including:
  a transmission antenna configured to transmit an electromagnetic wave;
  a reception antenna configured to receive an electromagnetic wave when the transmitted electromagnetic wave has been reflected by an object;
  a reception wave acquisition section configured to acquire the received electromagnetic wave at specific intervals in time;
  a reception power calculator configured to compute the power of the received electromagnetic wave as a function of the acquisition time number by the reception wave acquisition section;
  a representative point extractor configured to extract plural representative points from the function; and
  a determination section configured to determine whether or not the object is an overhead object positioned higher than the optical axis of the receiving antenna based on the representative points.

35 Claims, 43 Drawing Sheets

*FIG. 27*

| THEORETICAL VALUE OF SEPARATION DISTANCE CORRESPONDING TO FIRST NULL POINT | HEIGHT DIFFERENCE $\Delta h$ |
|---|---|
| 6 | 0.5 |
| 12 | 1 |
| 18 | 1.5 |
| 24 | 2 |
| 30 | 2.5 |
| 36 | 3 |
| 42 | 3.5 |
| 48 | 4 |
| 54 | 4.5 |
| 60 | 5 |
| 66 | 5.5 |
| 73 | 6 |
| 79 | 6.5 |
| 85 | 7 |
| 91 | 7.5 |
| 97 | 8 |
| 103 | 8.5 |
| 110 | 9 |
| 116 | 9.5 |
| 122 | 10 |

RADAR APPARATUS AND COMPUTER PROGRAM

CROSS-REFERENCE TO RELATED APPLICATION(S)

This application claims priorities from Japanese Patent Application No. 2010-057982 filed on Mar. 15, 2010, and from Japanese Patent Application No. 2010-155052 filed on Jul. 7, 2010, the entire contents of which are incorporated herein by reference.

FIELD

Embodiments described herein relate generally to a radar apparatus and a computer program.

BACKGROUND

Some vehicles (automobiles) are mounted with milliwave radar (referred to below as radar). Such milliwave radar is mounted to face forward on vehicle, and is used for inter-vehicle separation warning and vehicle speed control. As vehicle mounted radar, electronic scanning radars such as Frequency Modulated Continuous Wave (FMCW) radar, multi-frequency Continuous Wave (CW) radar and pulse radar are used.

When there is an obstruction around a vehicle, the vehicle mounted radar supplies target data, with relative information concerning the separation distance, orientation and velocity between the vehicle and the obstruction, to an inter-vehicle separation warning or vehicle speed control system. Inter-vehicle separation warning and vehicle speed control systems maintain a separation between the vehicle and the obstruction according to positional data of the target, issue a warning when collision is anticipated, and perform vehicle control to decelerate the vehicle (referred to below as impact reduction control) (see, for example, JP-2006-275840-A). A vehicle mounted radar is hence desired to have capability for rapidly and accurately detecting an object with which the vehicle might collide.

On general highways, there are reflective structures positioned sufficiently high above the height of the reception antenna optical axis of the radar, such as high span bridges, snow sheds and landslide shelters (referred to below as overhead objects). According to legal regulation, such overhead objects should be positioned sufficiently higher than vehicles (specifically 4.5 m or higher). Therefore, such overhead objects do not impede passage of vehicles.

However, a current radar apparatus may misdiagnose an overhead object as being an object with collision danger. Due to such a misdiagnosis by the radar apparatus, a vehicle control device will erroneously determine that there is a danger of collision, despite actually being in a safe passage state. Due to such erroneous determination, a warning may be issued or the vehicle may be decelerated unnecessarily, thereby irritating driver.

In order to address the above issue, it is attempted to control antenna directionality. However, such method requires improved high-functional. It is practically difficult to adapt antenna directionality control in vehicle mounted radars, in view of miniaturization and lower cost.

On the other hand, where there are no obstructions around the vehicle, the radar does not detect anything, and the radar does not output target data to a vehicle speed control system. In such cases, the vehicle speed control system and steering control system perform control such that the vehicle travels at the pre-set speed and steering angle.

Here, if there is an obstruction around the vehicle, sometimes, the height of the obstruction may be sufficiently low with respect to the vehicle ground clearance. Since such obstruction (referred to below as a low height object) does not impede passage of the vehicle, such obstruction should be disregarded such that there is no inter-vehicle separation warning issued, and the vehicle speed control system and the steering control system allow the vehicle to continue traveling at the already set speed and steering angle.

However, when vehicle mounted radars without resolution in the height direction is used, sometimes, the low height object may be misdiagnosed as a passage impeding obstruction depending on the antenna characteristics and the refection intensity. Due to such a misdiagnosis of the radar, a vehicle control device will erroneously determine that there is a danger of collision, despite actually being in a safe passage state. Due to such erroneous determination, a warning may be issued or the vehicle may be decelerated unnecessarily, thereby irritating driver. Further, there is a risk of being collided into by the vehicle behind.

SUMMARY

Embodiments also provide a radar apparatus and computer program for distinguishing whether a detected object is an overhead object, without on antenna directionality control.

According to embodiments, there is provided a radar apparatus including:

a transmission antenna configured to transmit an electromagnetic wave;

a reception antenna configured to receive an electromagnetic wave when the transmitted electromagnetic wave has been reflected by an object;

a reception wave acquisition section configured to acquire the received electromagnetic wave at specific intervals in time;

a reception power calculator configured to compute the power of the received electromagnetic wave as a function of the acquisition time number by the reception wave acquisition section;

a representative point extractor configured to extract plural representative points from the function; and a determination section configured to determine whether or not the object is an overhead object positioned higher than the optical axis of the receiving antenna based on the representative points.

According to the above feature, by extracting appropriate representative points robust determination can be made as to whether an object is an overhead object without being affected by fluctuations in reception power, such as due to spike noise, and hence an overhead object can be prevented from being misdiagnosed as an object with a danger of collision.

There may be provided the apparatus, wherein the representative point extractor extracts points where the function exhibits extreme values, and wherein the determination section determines whether or not the object is an overhead object based on the extreme values.

According to the above feature, robust determination can accordingly be made of whether or not an object is an overhead object without being affected by fluctuations in reception power, such as due to spike noise, and hence misdiagnosis of overhead objects as objects with a danger of collision can be prevented.

There may be provided the apparatus, wherein the determination section counts the number of the extreme values, and determines the object to be an overhead object when the number of the extreme values exceeds a specific threshold value.

According to the above feature, due to the relationship that the higher the height of an overhead object the greater the number of extreme values, by setting an appropriate specific threshold value, robust determination can be made of an object being an overhead object, and hence misdiagnosis of overhead objects as objects with a danger of collision can be prevented.

There may be provided the apparatus further including:

a memory configured to store the number of extreme values associated with respective differences in height between the object and the optical axis of the reception antenna, wherein the determination section extracts from the memory the height difference corresponding to the number of extreme values counted.

According to the above feature, since the height difference between the object and the reception antenna optical axis can be derived from the counted number of extreme values, the object's height can be computed from this height difference. Consequently, by comparing the object's height with the vehicle's height when the object is an overhead object, determination can be made as to whether or not the vehicle will collide with the object. Danger of an impending collision between the object and the vehicle mounted with the radar apparatus can consequently be notified to the vehicle driver in advance. When the object is not an overhead object, the object's vehicle type can also be estimated from the thus-computed object's height.

There may be provided the apparatus, wherein the determination section computes an approximation function that approximates to a relationship of the acquisition time number and power at the representative points, and determines whether or not the object is an overhead object based on the approximation function.

According to the above feature, determination can be made by computing an appropriate approximation function as to whether or not an object is an overhead object from the characteristics of the computed approximation function, and hence misdiagnosis of overhead objects as objects with a danger of collision can be prevented.

There may be provided the apparatus, wherein the determination section approximates the relationship of the acquisition time number and the power at the representative points with a first order function, and determines the object to be an overhead object when the first order coefficient of the first order function exceeds a specific threshold value.

According to the above feature, by appropriate selection of specific threshold values, robust determination can be made of whether or not an object is an overhead object without being affected by fluctuations in reception power, such as due to spike noise, and hence misdiagnosis of overhead objects as objects with a danger of collision can be prevented.

There may be provided the apparatus, wherein the determination section approximates the relationship of the acquisition time number and the power at the representative points with a first order function, computes a difference at a specific acquisition time number between a value of the first order function and either the power of the received electromagnetic wave or the power at the representative point, and determines the object to be an overhead object based on the difference.

According to the above feature, by comparing the difference between the value of the first order function and the received power against a specific threshold value, determination can be made as to whether or not an object is an overhead object, and hence misdiagnosis of overhead objects as objects with a danger of collision can be prevented.

There may be provided the apparatus, wherein the determination section approximates the relationship of the acquisition time number and power at the representative points with a first order function, approximates the relationship of the acquisition time number and power at the representative points with a second order or higher function, computes a difference at a specific acquisition time number between a value of the first order function and a value of the second order or higher function, and determines the object to be an overhead object based on the difference.

According to the above feature, since the difference between the value of the first order function and the value of the second order or higher function at the same separation distance become greater for an overhead object, robust determination can be made of whether or not an object is an overhead object without being affected by fluctuations in reception power, such as due to spike noise. Consequently, misdiagnosis of overhead objects as objects with a danger of collision can be prevented.

There may be provided the apparatus, wherein the determination section determines whether or not the object is an overhead object based on power at the representative point at a predetermined acquisition time number.

According to the above feature, by appropriate determination of the predetermined acquisition time number (for example, the acquisition time number corresponding to a separation distance to the object of 150 m), since determination of whether or not an object is an overhead object can be made based on the power of the representative point at this acquisition time number, misdiagnosis of overhead objects as objects with a danger of collision can be prevented.

There may be provided the apparatus, wherein the determination section computes a difference between the power at the representative point at the predetermined acquisition time number and the power at the representative point at a specific acquisition time number, and determines whether or not the object is an overhead object based on the difference.

According to the above feature, since determination of whether or not an object is an overhead object can be made based difference between the power of the representative point at the predetermined acquisition time number (for example, the acquisition time number corresponding to a separation distance to the object of 150 m) and the power of other representative points, misdiagnosis of overhead objects as objects with a danger of collision can be prevented.

There may be provided the apparatus, wherein the determination section approximates the relationship of the acquisition time number and power at the representative points with a second order or higher function, computes the power at the representative point at the predetermined acquisition time number and the value of the second order or higher function at a specific acquisition time number, and determines whether or not the object is a overhead object based on the difference.

According to the above feature, since robust determination can be made of whether or not an object is an overhead object based on the difference between the value of the second order or higher equation and the initial value, without being affected by fluctuations in reception power such as due to spike noise, misdiagnosis of overhead objects as objects with a danger of collision can be prevented.

There may be provided the apparatus, wherein the determination section computes a radar cross section of the object based on power at the representative points, computes an estimated power value of the received electromagnetic wave for a specific acquisition time number based on the radar cross section, and determines the object to be an overhead object based on the estimated power value.

According to the above feature, since determination can be made of whether or not an object is an overhead object by comparing the estimated power value to the power of the received electromagnetic wave or the power of the representative point, misdiagnosis of overhead objects as objects with a danger of collision can be prevented.

There may be provided the apparatus, wherein the determination section computes a difference between the estimated power value at the specific acquisition time number and power at the representative point of the acquisition time number, and determines the object to be an overhead object based on the difference.

According to the above feature, since robust determination can be made of whether or not an object in an overhead object based the difference between the power of the representative point and the estimated power value, without being affected by fluctuations in reception power such as due to spike noise, misdiagnosis of overhead objects as objects with a danger of collision can be prevented.

There may be provided the apparatus, wherein the determination section computes an approximation function approximating to a relationship of the acquisition time number and power at the representative points, computes a difference between the estimated power value and the value the approximation function at a specific acquisition time number, and determines the object to be an overhead object based on the difference.

According to the above feature, since robust determination can be made of whether or not an object is an overhead object based on the difference between the estimated power value and the value of the approximation function at a specific acquisition time number, misdiagnosis of overhead objects as objects with a danger of collision can be prevented.

There may be provided the apparatus, wherein the representative point extractor extracts plural representative points from the power of received electromagnetic wave in a specific range of acquisition time numbers, and wherein the determination section determines whether or not the object is an overhead object based on the plural representative points at the specific acquisition time numbers.

According to the above feature, since determination can be made of an object being an overhead object based on plural representative points against acquisition time number in a specific range of acquisition time numbers, misdiagnosis of overhead objects as objects with a danger of collision can be prevented.

There may be provided the apparatus, wherein the determination section determines the object to be an overhead object when a downward pointing dip is present in a path traced by the plural representative points against acquisition time number at the specific acquisition time numbers.

According to the above feature, since determination can be made of an object being an overhead object if there is a point exhibiting a local minimum value in the plural representative points at the predetermined acquisition time number, misdiagnosis of overhead objects as objects with a danger of collision can be prevented.

There may be provided the apparatus, wherein the determination section determines the object to be an overhead object when there is a local minimum value in a curve connecting together in acquisition time number sequence the plural representative points at the specific acquisition time numbers.

According to the above feature, since robust determination can be made of an object being an overhead object without being affected by fluctuations in reception power such as due to spike noise or missed acquisitions of reception power values due to low sampling frequency of the radar apparatus, misdiagnosis of overhead objects as objects with a danger of collision can be prevented.

There may be provided the apparatus, wherein the determination section approximates the power at the plural representative points against acquisition time number with a quadratic function at the specific acquisition time numbers, computes the acquisition time number exhibited by a local minimum value or smallest value of the quadratic function, and determines whether or not the object is an overhead object based on the acquisition time number exhibited at the local minimum value or the smallest value.

According to the above feature, since robust determination can be made that an object is an overhead object without being affected by fluctuations in reception power such as due to spike noise or missed acquisitions of reception power values due to low sampling frequency of the radar apparatus, misdiagnosis of overhead objects as objects with a danger of collision can be prevented.

There may be provided the apparatus further including:

a memory configured to store the acquisition time numbers associated with respective height differences between the object and the optical axis of the reception antenna, wherein the determination section extracts from the memory the height difference corresponding to the acquisition time number exhibited by the local minimum value or the smallest value.

According to the above feature, since the height difference corresponding to the separation distance exhibited by the local minimum value can be extracted from the memory, the object's height can be computed from this height difference. Accordingly, when the object is an overhead object, determination can be made as to whether or not the vehicle will collide with the object by comparing the object's height with the vehicle's height. The danger of impending collision between the object and the vehicle mounted with the radar apparatus can be notified to the driver of the vehicle in advance. When the object is not an overhead object, the object's vehicle type can be estimated from the thus-computed object's height.

According to embodiment, there is also provided a computer program for causing a computer to execute processing, the processing including:

acquiring an electromagnetic wave received by a reception antenna at specific intervals in time;

computing the power of the received electromagnetic wave as a function of the acquisition time number;

extracting plural representative points from the function; and determining whether or not the object is an overhead object positioned higher than the optical axis of the receiving antenna based on the representative points.

According to the above feature, plural representative points are extracted from a function of the received electromagnetic wave against acquisition time number, and whether or not the object is an overhead object can be determined based on these plural representative points. Consequently, by extracting appropriate representative points, robust determination can be made of whether or not an object is an overhead object without being affected by fluctuations in reception power, such as due to spike noise.

Embodiments provide a radar apparatus and computer program capable of determining whether or not an object detected by radar is a low height object.

According to embodiments, there is also provided a radar apparatus including:

a transmission antenna configured to transmit an electromagnetic wave;

a reception antenna configured to receive an electromagnetic wave when the transmitted electromagnetic wave has been reflected by an object;

a separation distance detector configured to detect separation distance to the object based on the received electromagnetic wave;

a reception power calculator configured to compute the power of the received electromagnetic wave as a function of the detected separation distance;

an area calculator configured to compute area of a region in a specific separation distance segment defined by a curve representing the function as one boundary; and a detection section configured to determine whether or not the object is a low height object based on the computed area.

According to the above feature, it is enabled to discriminate whether or not the object detected by the radar is a normal object, by expressing the reception power as a function of the separation distance between the radar apparatus and the object.

There may be provided the apparatus, wherein the detection section computes the area based on intensity of the reception wave only when the separation distance is within a specific range.

According to the above feature, the efficiency can be improved of determination of whether or not the object detected by the radar is a low height object, as well as enhancing the determination precision.

According to embodiments, there is also provided a radar apparatus including:

a transmission antenna configured to transmit an electromagnetic wave;

a reception antenna configured to receive an electromagnetic wave when the transmitted electromagnetic wave has been reflected by an object;

a reception power calculator configured to compute the power of the received electromagnetic wave as a function of time;

an area calculator configured to compute area of a region in a specific time segment defined by a curve representing the function as one boundary; and a detection section configured to determine whether or not the object is a low height object based on the computed area.

According to the above feature, it is enabled to determine whether or not the object detected by the radar is a low height object, by expressing the reception power as a function of time.

There may be provided the apparatus, wherein the detection section computes the area based on intensity of the reception wave only when the time is within a specific range.

According to the above feature, the efficiency can be improved of determination of whether or not the object detected by the radar is a low height object, as well as enhancing the determination precision.

There may be provided the apparatus, wherein the area calculator computes area of a region defined by the curve and a specific straight line as boundaries, or computes the area of a region defined by the curve and a specific curve as boundaries.

According to the above feature, in a specific segment, since a difference can be detected between the area computed when the object is a low height object and computed when the object is a normal object, by computing the area of regions (closed space) determined by the curve and a specific straight line as boundaries, determination can be made as to whether an object is a low height object.

There may be provided the apparatus, wherein the area calculator computes area of a region defined by the curve and a specific straight line determined according to the average value of received reception wave power as boundaries.

According to the above feature, since the difference between the area computed when the object is a low height object and when the object is a normal object can be made a greater difference, determination of whether an object is a low height object can be made with good precision.

There may be provided the apparatus, wherein the detection section determines that the object is a normal object when the sum of areas over plural segments exceeds a specific threshold value.

According to the above feature, since differences between a normal object and a low height object can be expressed with a greater difference by determination based on segment area, leeway can be achieved in setting the threshold value, and determination can be made with high precision.

There may be provided the apparatus, wherein the detection section determines that the object is a normal object when the area in any segment from plural segments exceeds a specific threshold value.

According to the above feature, since determination can be made prior to completing computation of area for all of the segments, determination of a normal object can be made even when there is a greater separation distance between the radar and the object. As a result, vehicle deceleration and/or object avoidance action can then be performed with even more time leeway.

There may be provided the apparatus, wherein the detection section determines that the object is a normal object when the number of times the area exceeds a specific threshold value has exceeded a predetermined number of times.

According to the above feature, since determination can be made prior to completing computation of area for all of the segments, determination of a normal object can be made even when there is a greater separation distance between the radar and the object. As a result, vehicle deceleration and/or object avoidance action can then be performed with even more time leeway.

According to embodiments, there is also provided a computer program for causing a computer to perform processing, the processing including:

detecting a separation distance to an object based on an electromagnetic wave received by a reception antenna;

computing the power of the received electromagnetic wave as a function of the detected separation distance;

computing area of a region in a specific separation distance segment defined by a curve representing the function as one boundary; and determining whether or not the object is a low height object based on the computed area.

According to the above feature, determination can be made as to whether an object detected by the radar is a low height object by expressing the reception power as a function of separation distance.

According to embodiments, there is also provided a computer program for causing a computer to perform processing, the processing including:

computing the power of a received electromagnetic wave as a function of time;

computing area of a region in a specific time segment defined by a curve representing the function as one boundary; and determining whether or not the object is a low height object based on the computed area.

According to the above feature, determination can be made as to whether an object detected by the radar is a low height object by expressing the reception power as a function of separation distance.

BRIEF DESCRIPTION OF DRAWINGS

FIG. 27 illustrates a table of separation distances $d_{1m}$ where a local minimum value is exhibited and respective associated height differences $\Delta h$.

DETAILED DESCRIPTION

Figure 1:
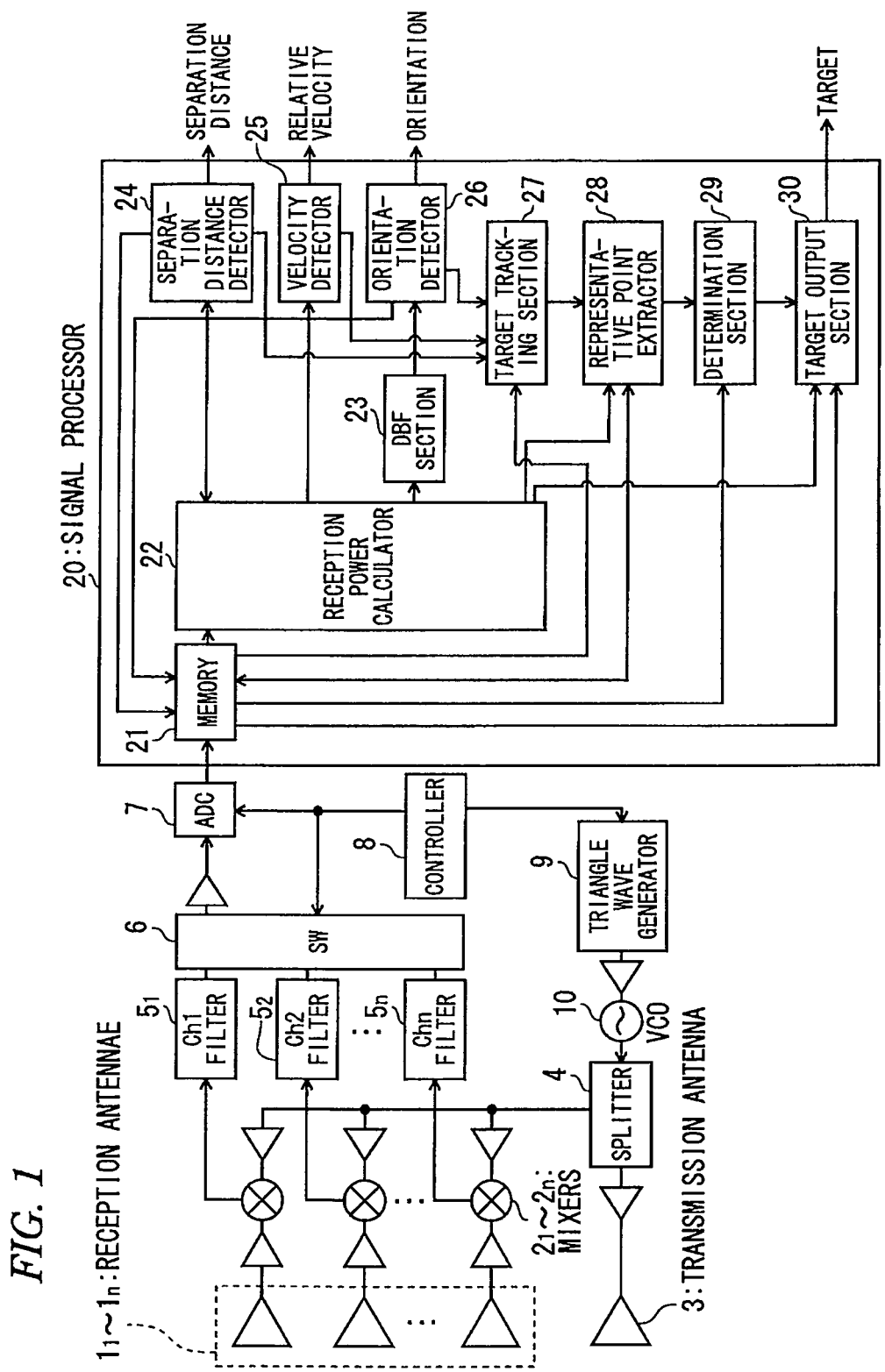
FIG. 1 illustrates a functional configuration of an electronic scanning radar apparatus according to first to seventh embodiments.

An electronic scanning radar apparatus (FMCW milliwave radar) according to first to seventh embodiments, with reference to the drawings. FIG. 1 illustrates a functional configuration of the electronic scanning radar apparatus according to the embodiments.

As shown in FIG. 1, an electronic scanning radar apparatus 1 according to the embodiments includes reception antennae $1_1$ to $1_n$, mixers $2_1$ to $2_n$, a transmission antenna 3, a splitter 4, filters $5_1$ to $5_n$ (wherein n is a positive integer), a switch (SW) 6, an A/D converter (ADC) (reception wave acquisition section) 7, a controller 8, a triangle wave generator 9, a Voltage Controlled Oscillator (VCO) 10 and a signal processor 20.

The signal processor 20 is configured including a memory 21, a reception power calculator 22, a Digital Beam Forming (DBF) section 23, a separation distance detector 24, a velocity detector 25, an orientation detector 26, a target tracking section 27, a representative point extractor 28, a determination section 29 and a target output section 30.

Next an operation of the electronic scanning radar apparatus according to the embodiments, with reference to FIG. 1.

The reception antennae $1_1$ to $1_n$ receive arriving reflected waves of transmission waves that have been reflected by an object and returned from the object, namely reception waves.

The mixers $2_1$ to $2_n$ respectively mix a transmission wave for transmission from the transmission antenna 3 together with signals of the reception waves that have been received by each of the reception antennae $1_1$ to $1_n$ and amplified by amplifiers, thereby generating beat signals corresponding to the respective frequency differences.

The transmission antenna 3 is for transmitting a transmission signal, this being a triangle wave signal generated by the triangle wave generator 9 that has been frequency modulated in the Voltage Controlled Oscillator (VCO) 10, as a wave for transmission towards an object.

The splitter 4 splits and distributes the frequency modulated transmission signal from the VCO 10 to the mixers $2_1$ to $2_n$ and the transmission antenna 3.

The respective filters $5_1$ to $5_n$ perform band-limiting on beat signals generated in the respective mixers $2_1$ to $2_n$ for Ch1 to Chn, corresponding to the reception antennae $1_1$ to $1_n$, and supply band-limited beat signals to the switch (SW) 6.

According to a sampling signal input from the controller 8, the SW 6 switches sequentially between the beat signals for Ch1 to Chn corresponding to the reception antennae $1_1$ to $1_n$ passing through the filters $5_1$ to $5_n$ and supplies the beat signal to the ADC (reception wave acquisition section) 7.

The ADC (reception wave acquisition section) 7 synchronizes the beat signals, for Ch1 to Chn corresponding to the respective reception antennae $1_1$ to $1_n$ input from the SW 6 in synchronization to the sampling signal, to the sampling signal and A/D converts the signals to digital signals. The digital signals are sequentially stored in the waveform storage region of the memory 21 in the signal processor 20. In other words the ADC (reception wave acquisition section) 7 acquires the beat signals at specific intervals in time.

The controller 8 is configured, for example, by a microcomputer, and performs overall control of the electronic scanning radar apparatus shown in FIG. 1 according to a control program stored, for example, on ROM, not shown in the drawings.

The memory 21 in the signal processor 20 stores the digital signals that have been digitally converted in the A/D converter 7 by each channel corresponding to the reception antennae $1_1$ to $1_n$.

The memory 21 stores the vehicle's height and the load's height (total height) from the ground. The memory 21 also stores a table 100 of numbers of times of detection of local maximum values and their associated height differences, described later. The memory 21 also stores a table 270 of theoretical values of separation distance corresponding to the first null point and their associated height differences, described later.

Principles of Separation Distance, Relative Velocity and Horizontal Angle (Orientation) Detection Next, with reference to FIG. 2, the principles employed in the signal processor 20 for detecting the separation distance, relative velocity and angle (orientation) between the electronic scanning radar apparatus and an object is described.

Figure 2A:
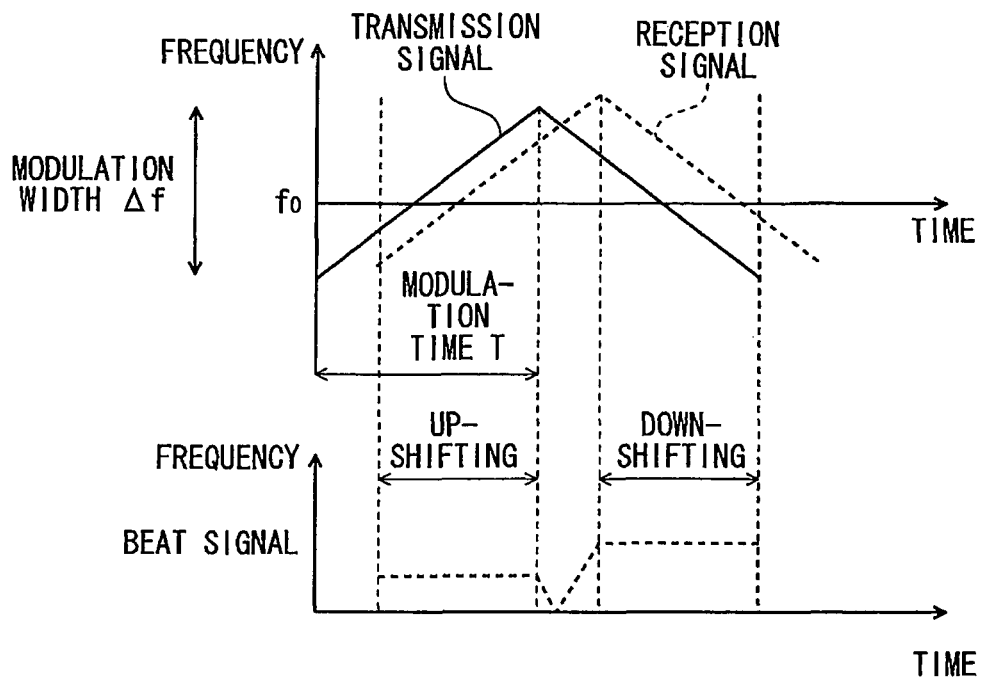
FIGS. 2A and 2B illustrate the occurrence of beat signals due to a transmission wave and reception wave in the down-shifting regions and the up-shifting regions of a triangle wave.
Figure 2B:
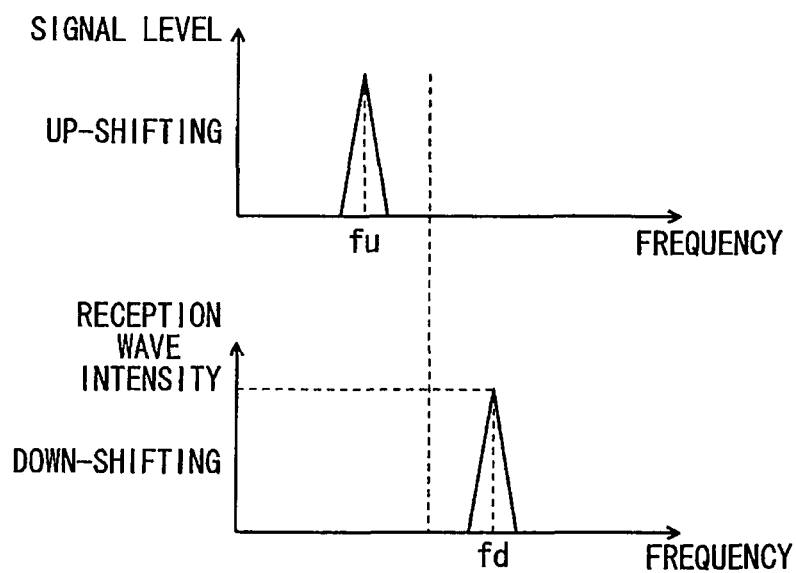

FIG. 2A illustrates states of input of a transmission signal of the signal generated in the triangle wave generator 9 of FIG. 1 that has been frequency modulated in the VCO 10 to give a central frequency $f_0$ and modulation width $\Delta f$, and of a reception signal resulting from the transmission signal being reflected back from an object. The example shown in FIGS. 2A and 2B is for a case in which there is a single object.

As shown in FIG. 2A, the reception signal, this being the reflected wave from the object in response to the transmission signal, is received with a delay shift towards the right hand side (the time delay direction) corresponding to the separation distance between the radar and the object. The reception signal is also shifted with respect to the transmission signal in the vertical direction (frequency direction) due to the Doppler effect by an amount dependent on the relative velocity to the object.

The reception power calculator 22 performs Fourier transformation on the beat signals stored in the memory 21 for each of the channels corresponding to the respective reception antennae $1_1$ to $1_n$ (shown at the lower portion of FIG. 2A). The amplitude of the post Fourier transformation complex number data is referred to here as the signal level.

By producing a frequency spectrum of summation values for the complex number data of some of the antennae, or complex number data from all of the antennae, the reception power calculator 22 can detect beat frequencies corresponding to the peak values of the spectrum, namely detect the presence of an object situated at a separation distance. The signal to noise (S/N) ratio is enhanced by averaging out noise components by summing together the complex number data for all of the antennae.

When there is a single object, Fourier transformation results in the presence of a single peak value for the up-shifting regions and the down-shifting regions, respectively, as shown in FIG. 2B. In FIG. 2B the horizontal axis is frequency and the vertical axis is signal intensity.

The reception power calculator 22 determines whether there is an object present by detecting whether or not there is a signal level, from out of the signal levels for each of the beat frequencies shown in FIG. 2B, that exceeds a predetermined threshold value. The peak value of the signal level is referred to here as the reception wave intensity.

When a qualifying signal level peak is detected, the reception power calculator 22 supplies the beat frequencies of the peak value (both for the up-shifting portions and the down-shifting portions of the beat signal) as an object frequency to the separation distance detector 24 and the velocity detector 25. The reception power calculator 22 supplies the frequency modulation width $\Delta f$ to the separation distance detector 24, and supplies the central frequency $f_0$ to the velocity detector 25.

The reception power calculator 22 also computes the square of the peak value of the signal level for the down-shifting portions as the reception power. The reception power calculator 22 supplies the reception power as a function of the separation distance to the object input from the separation distance detector 24 to the representative point extractor 28.

However, when a qualifying peak in the signal level is not detected, the reception power calculator 22 supplies data to the target output section 30 indicating that there are no target candidates.

The peak value of the up-shifting portions of the beat signals, or the average of the peak value of the up-shifting portions of the beat signals and the peak value of the down-shifting portions of the beat signals may be used as the signal level.

When plural objects are present, the same number of peaks as the number of objects appear after Fourier transformation in the up-shifting portions of the beat signal and the down-shifting portions of the beat signal, respectively. Due to the reception signal being delayed in proportion to the separation distance between the radar and the object, with the reception signal shown in the upper portion of FIG. 2A shifted towards the right hand side, the frequency of the beat signal in the lower portion of FIG. 2A becomes higher the greater the separation distance between the radar and the object.

When there are plural peaks detected in the signal level, corresponding to plural objects, the reception power calculator 22 allocates sequential numbers to each of the peak values separately for the up-shifting portions and the down-shifting portions, in sequence starting at the smallest frequency and supplies to the determination section 29. Peaks with the same number in the up-shifting portions and down-shifting portions correspond to the same object, and hence these respective identification numbers are used as numbers for the objects.

The separation distance detector 24 then computes a separation distance r according to the following equation, from the object frequency $f_u$ of the up-shifting portions and the object frequency $f_d$ of the down-shifting portions input from the reception power calculator 22. The separation distance detector 24 supplies the computed separation distance to the reception power calculator 22 and to the target tracking section 27. The separation distance detector 24 also stores the separation distance to the ob in the memory 21.

$$r=\{C\cdot T/(2\cdot \Delta f)\}\cdot \{(f_u+f_d)/2\}$$

The velocity detector 25 computes the relative velocity v according to the following equation, from the object frequency $f_u$ of the up-shifting portions and the object frequency $f_d$ of the down-shifting portions input from the reception power calculator 22, and supplies the relative velocity v to the target tracking section 27.

$$v=\{C/(2\cdot f_0)\}\cdot \{(f_u-f_d)/2\}$$

In the equations for computing the separation distance r and the relative velocity v, C is the speed of light, T is the modulation time (duration of up-shifting portions and duration of down-shifting portions), $f_u$ is the object frequency in the up-shifting portions and $f_d$ is the object frequency in the down-shifting portions.

Figure 3:
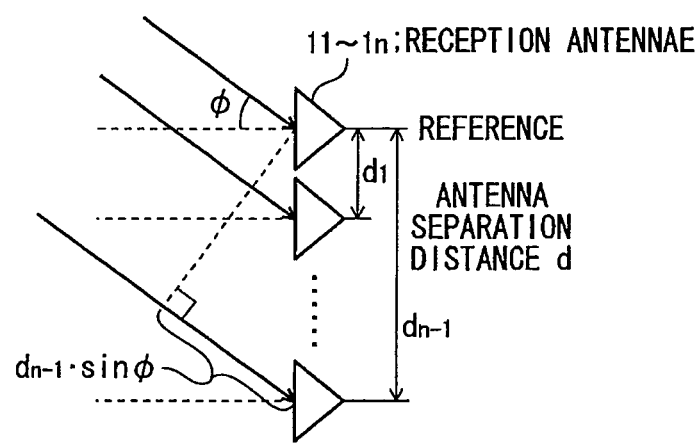
FIG. 3 illustrates a method for computing the arrival angle of a reflected wave with respect to an axis in a direction perpendicular to the disposed plane of an array of plural antennae.

The reception antennae $1_1$ to $1_n$ are arranged in an array, placed at intervals d, as shown in FIG. 3. An arriving wave from an object (incident wave, namely the reflected wave from an object in response to the transmission wave transmitted from the transmission antenna 3) enters the reception antennae $1_1$ to $1_n$ at an incident angle $\phi$ to an axis perpendicular to the plane of the antenna array.

When this occurs, the arriving wave is received at the same angle $\phi$ by the reception antennae $1_1$ to $1_n$. The phase differences occurring between the reception signals in a reception antenna at one end and in a reception antenna at the other end of the array are computed from the frequency f of the reception signal, the separation distance $d_{n-1}$ between the reception antenna at one end and the reception antenna at the other end, and angle $\phi$, according to phase difference=$2\pi f\cdot(d_{n-1}\cdot \sin\phi/C)$.

Using this phase difference, the DBF section 23 performs further Fourier transformation in the antenna array direction on the complex number data Fourier transformed on a time axis corresponding to each of the input antenna, namely performs Fourier transformation on a spatial axis. The DBF section 23 computes spatial complex number data representing the intensity of a spectrum for each of the angle channels corresponding to the angular resolution, and supplies the results for each of the beat frequencies to the orientation detector 26.

The orientation detector 26 supplies to the target tracking section 27, as an orientation where an object is present, the angle $\phi$ exhibited by the largest value from the magnitudes of values in the spatial complex number data for each of the computed beat frequencies. The orientation detector 26 also stores the orientation of the object in the memory 21.

When absolute values of differences, between the respective values of the separation distance, relative velocity and orientation of the object computed in the current cycle, and the values of the separation distance, relative velocity and orientation of the object read from the memory 21 computed 1 cycle previously, are smaller than determined values for each value type, the target tracking section 27 determines that the object detected 1 cycle previously and the object detected this time are the same object.

In such cases, the target tracking section 27 increments the number of times of target tracking processing for the object read from the memory 21 by 1. When this is not the case, the target tracking section 27 interprets this as detection of a new object. The target tracking section 27 also stores the separation distance, relative velocity and orientation of object this time, and the number of times of target tracking processing for this object, in the memory 21. The target tracking section 27 supplies an identification number for the object to the representative point extractor 28.

The representative point extractor 28 acquires the reception power as a function of separation distance to the object that has been supplied from the reception power calculator 22. The representative point extractor 28 then extracts, as representative values, local maximum values in the reception power as a function of separation distance to the object. The representative point extractor 28 then computes extreme values of the reception power, as a function of separation distance to the object. The representative point extractor 28 supplies the computed extreme values of reception power, as a function of separation distance to the object, to the determination section 29.

The representative point extractor 28 may extract, as the representative values, local minimum values instead of local maximum values. The representative point extractor 28 may also extract an average value or central value in a specific separation distance range as the representative value. The representative point extractor 28 may also extract an average value or central value of mutually adjacent local maximum value and minimum value as the representative value.

The determination section 29 acquires the extreme values of reception power as a function of separation distance to the object, supplied from the representative point extractor 28. The determination section 29 then employs an algorithm for distinguishing overhead objects, described later, to distinguish whether the object is a forward object with accompanying danger of collision or an overhead object not expected to hinder travel. The determination section 29 supplies data of the distinguishing result to the target output section 30.

When the object is a forward object, the target output section 30 supplies an identification number for this object as a target. When the target output section 30 has acquired data of the distinguishing results of plural objects supplied from the determination section 29 and all of them are forward objects, the target output section 30 reads out the orientation of the respective object from the memory 21. The target output section 30 extracts an object in the path of the vehicle from the orientations of the objects, and supplies the identification number of the object in the path of the vehicle to an external device.

The external device can accordingly, in situations where the object is a forward object with accompanying danger of collision, perform control to reduce speed in order to avoid an impact, and/or issue a warning urging the driver of the vehicle to take care.

When the target output section 30 has acquired the determination results of plural objects, all of them are forward objects and two or more of the objects are in the path of the vehicle, the target output section 30 supplies as a target the identification number of the object read from the memory 21 having the highest number of times of target tracking processing. However, when the object is an overhead object, or when data is input from the reception power calculator 22 indicating that there are no target candidates, the target output section 30 supplies data indicating no targets.

Figure 4:
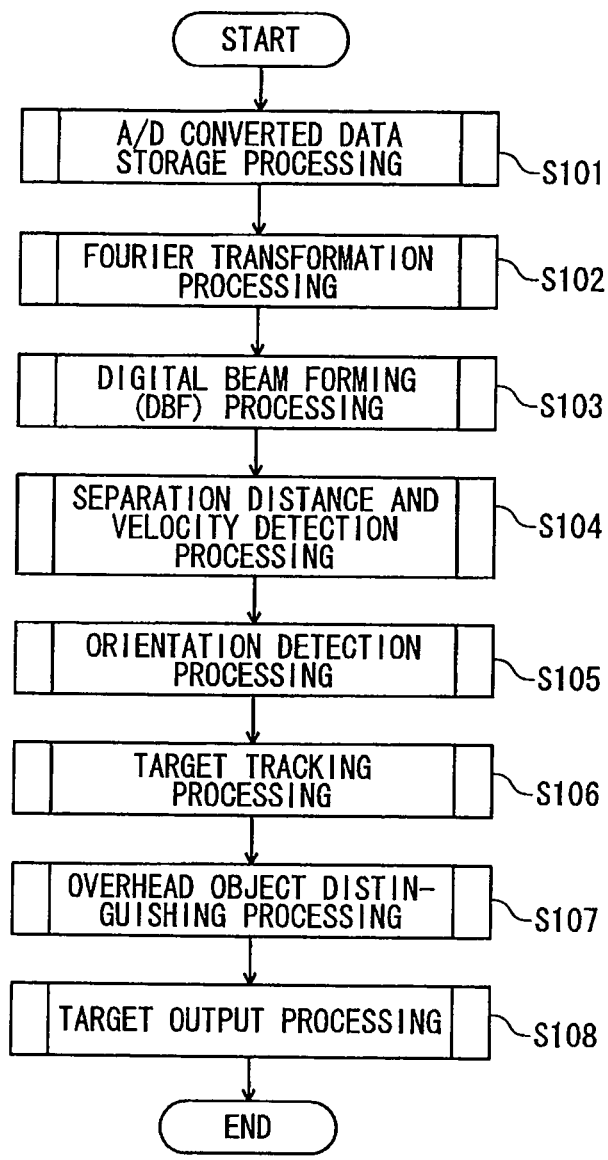
FIG. 4 illustrates a target extraction processing.

Next, a flow of target extraction processing is described, with reference to FIG. 4. FIG. 4 illustrates the target extraction processing. The signal processor 20 stores A/D converted beat signals for each of the channels corresponding to each of the reception antennae $1_1$ to $1_n$ in the memory 21 (step S101).

The reception power calculator 22 then performs Fourier transformation on the beat signals for each of the channels corresponding to each of the reception antennae $1_1$ to $1_n$, and computes signal levels (step S102).

The reception power calculator 22 supplies values Fourier transformed in the time direction for each of the antennae to the DBF section 23.

The reception power calculator 22 also supplies to the separation distance detector 24 the frequency modulation width $\Delta f$, and the object frequencies in the up-shifting portions and the object frequencies in the down-shifting portions.

The reception power calculator 22 also supplies to the velocity detector 25 the central frequency $f_0$ and the object frequencies in the up-shifting portions and the object frequencies in the down-shifting portions.

The reception power calculator 22 supplies peak values in the descending portion of the signal level to the determination section 29. When the intensity of a reception wave cannot be detected then the reception power calculator 22 supplies data to the target output section 30 indicating that there are no target candidates.

The DBF section 23 then performs further Fourier transformation in the antenna array direction on the values input from the reception power calculator 22 for each antenna that were Fourier transformed in the time direction, calculates spatial complex numbers for each angle channel corresponding to the angular resolution, and supplies the result for each of the beat frequencies to the orientation detector 26 (step S103).

The separation distance detector 24 then computes the separation distance from the frequency modulation width $\Delta f$ and the object frequencies in the up-shifting portions and the object frequencies in the down-shifting portions that have been input from the reception power calculator 22 (step S104). The velocity detector 25 computes the relative velocity from the central frequency and the object frequencies in the up-shifting portions and the object frequencies in the down-shifting portions that have been input from the reception power calculator 22 (step S104).

The orientation detector 26 then supplies to the target tracking section 27 the angle exhibited by the value having the greatest amplitude from the computed spatial complex numbers for each of the computed beat frequencies, as an orientation where an object is present (step S105).

The target tracking section 27 then determines that the object detected this time is the same as the object detected 1 cycle previously when the absolute values of differences, between the respective values of the separation distance, relative velocity and orientation of the object computed this time and the respective values of the separation distance, relative velocity and orientation of the object computed 1 cycle previously and read from the memory 21, are each smaller than respective determined values for each value type. The target tracking section 27 refreshes the values of the separation distance, relative velocity and orientation of the object in the memory 21 and supplies an identification number of the object to the determination section 29 (step S106).

The determination section 29 determines whether or not the object input from the target tracking section 27 is an overhead object, and supplies data representing whether the object is an overhead object or a forward object to the target output section 30 (step S107).

When the object is a forward object, the target output section 30 then supplies the identification number of this object as a target (step S108). When the target output section 30 has acquired the determination results of plural objects and all of these objects are forward objects, the target output section 30 then supplies as a target the identification number of an object in the path of the vehicle. When the target output section 30 has acquired determination results for plural objects and all of the objects are forward objects, with two or more of these objects being in the path of the vehicle, the target output section 30 then supplies as a target the identification number of the object read from the memory 21 with the greatest number of times of target tracking processing. This completes the processing in FIG. 4.

Overhead Object Distinguishing Algorithm

Next, an algorithm for distinguishing an overhead object in the determination section 29 is described. Examples of conditions for an object to give strong electromagnetic wave reflection normally include having a sufficiently wide radar cross-section, being an object (or conductor) having small reflection loss, having a flat reflection face (namely little scattering other than reflection) and the presence of a reflection face perpendicular to the optical axis of the antennae or presence of a reflection face with a corner reflector structure.

If one considers these conditions, together with likely actual road environments, then it can be seen that structures such as high span bridges, snow sheds and landslide shelters comply with these conditions. In particular, a steel pier bridge is an example of a high span bridge with a flat face and a reflection cross-section sufficiently wider than that of a vehicle. A steel pier bridge is also made in its entirety from metal and also has corner reflector structures. Accordingly, cases arise in which a larger refection power level P ($d_z$) is observed from a steel pier bridge than that of a vehicle in front as a forward object (on-the-optical-axis object) present on the optical axis of the antennae ($d_z$ represents the horizontal separation to an object).

Figure 5:
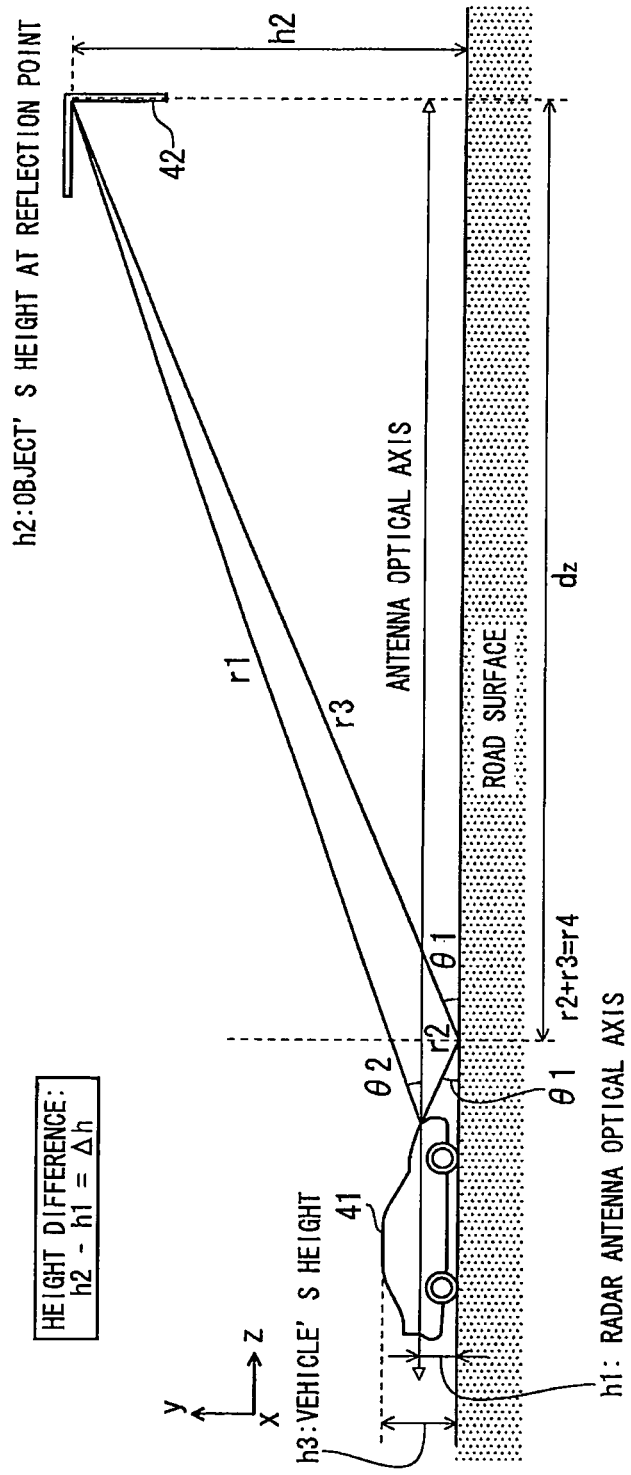
FIG. 5 illustrates a positional relationship between a vehicle and an overhead object employed in numerical simulation.

FIG. 5 illustrates a positional relationship between a vehicle and an overhead object, as employed in a numerical simulation. A vehicle 41 in FIG. 5 is installed with a radar apparatus. The height of the antenna optical axis of the radar apparatus is at height h1, the height of the reflection point from the object 42 is at height h2. The vehicle 41 has a height h3. The direct separation distance between the vehicle 41 and the overhead object 42 is r1.

The distance between the vehicle and the road surface travelled by electromagnetic waves during indirect propagation between the vehicle 41 and the overhead object 42 is denoted r2. The distance between the road surface and the overhead object travelled by electromagnetic waves during indirect propagation between the vehicle 41 and the overhead object 42 is denoted r3. Accordingly, the propagation separation distance during indirect propagation is r4 (=r2+r3).

The horizontal separation distance between the vehicle 41 and the overhead object 42 is $d_z$. During indirect propagation the angle formed between the road surface and the transmission electromagnetic wave, and the angle formed between the road surface and the reception wave, is angle θ1.

Figure 6A:
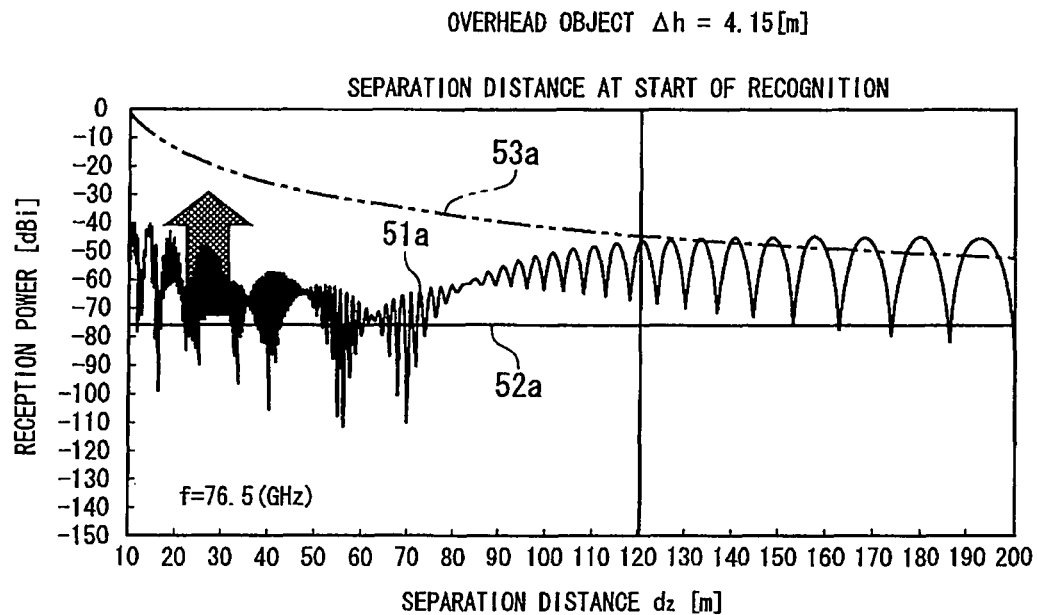
FIG. 6A and FIG. 6B illustrate estimated reception power as a function of separation distance in simulations envisaging an overhead object and a forward object, respectively.
Figure 6B:
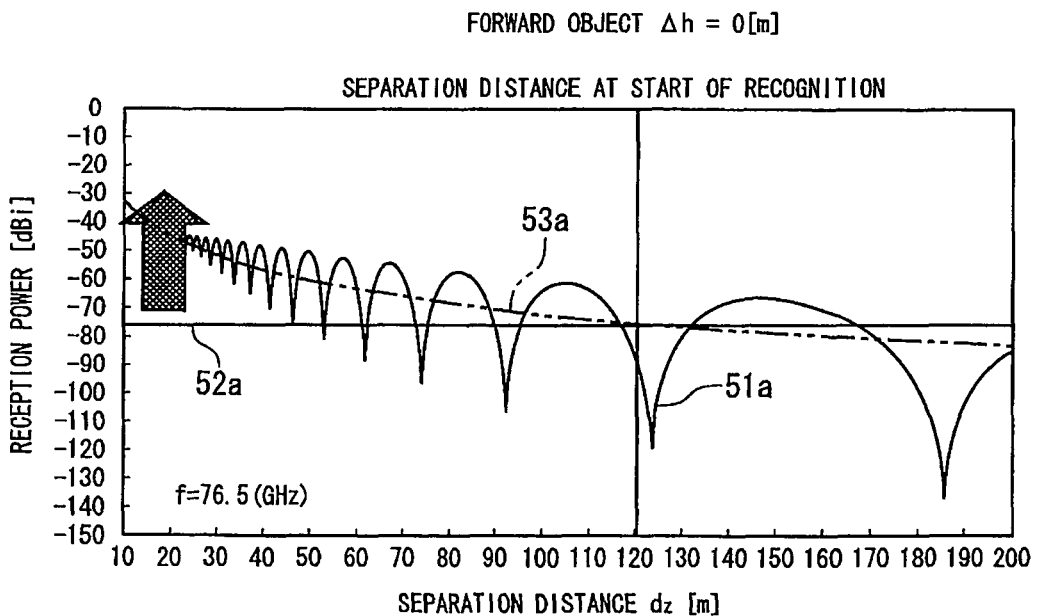

FIGS. 6A and 6B are graphs showing the estimated reception power as a function of separation distance in simulations for an overhead object and a forward object, respectively. The horizontal axis shows the separation distance $d_z$ (vehicle to detected object horizontal separation distance) along the z axis (antenna optical axis) of FIG. 5. The vertical axis shows the reception power P ($d_z$). The antenna characteristics in the simulation computation are a half power beam width for the main lobe of 4 degrees, and side lobe reception power relative to the main lobe reception power of −35 dB.

Explanation first follows regarding the estimated reception power for a simulation of an overhead object. The height difference Δh (=h2−h1) between radar apparatus optical axis height h1 and the object refection point height h2 is 4.15 m, wherein the radar installation here is 1 m. The overhead object is presumed to be a high span bridge made from steel, with a Radar Cross Section (RCS) of 30 dB. This value, accordingly, gives a RCS sufficiently wider than that of a vehicle traveling in front, described later.

FIG. 6A illustrates estimated reception power as a function of separation distance in a simulation of an overhead object. In FIG. 6A, the reception power curve 51a estimated by simulation is expressed as a function of reception power against separation distance taking into consideration the phase difference between the transmission wave and the reception wave. When the separation distance $d_z$ to the object is closer than 200 m the reception power curve 51a has points that exceed a detection threshold value 52a. A free-space propagation curve 53a illustrates a theoretical function of reception power against separation distance considering spatial attenuation.

Next, reception power estimated by simulation for a forward object (on-the-optical-axis object) is described. Height difference Δh (=h2−h1) is set at 0 m. In this example the object's height h2 and the radar installation height h1 are both set at 1 m. The RCS for the forward object envisages it being a vehicle traveling in front and is set at 0 dB. This RCS is an amount expressing the degree of scattering by a target of electromagnetic waves when reflection is made with the radar incident direction and the direction of radar reflection at 180 degrees to each other.

FIG. 6B illustrates estimated reception power as a function of separation distance in a simulation of a forward object (on-the-optical-axis object). In FIG. 63, the reception power curve 51b estimated by simulation expresses the reception power as a function of separation distance by taking into consideration the phase difference between the transmission wave and the reception wave. When the separation distance $d_z$ to the object gets closer than 160 m the reception power curve 51b has points that exceed a detection threshold value 52b. A free-space propagation curve 53b illustrates a theoretical reception power as a function of separation distance considering spatial attenuation.

Compare the reception power curve 51a of FIG. 6A and the reception power curve 51b of FIG. 6B. In the range in which the separation distance $d_z$ is 80 m or greater, the reception power curve 51a exceeds the detection threshold value 52a for substantially all portions of the curve, due to the large RCS of the overhead object. In contrast, for the forward object, only about half of the reception power curve 51b exceeds the detection threshold value 52b due to the forward object having a smaller RCS than the RCS of the overhead object.

Consequently, a radar apparatus detects the overhead object whatever the separation distance to the object. It is difficult to determine whether an object is an overhead object or a forward object (on-the-optical-axis object) merely from the magnitude of the reception power. The paths traced out by the reception power contain plural elements, as shown in FIG. 6A and FIG. 6B. Furthermore, in an actual usage environment of a radar, due to external noise due to multipath interference and internal circuit noise being added at random to the reception power, this results in an extremely complicated non-linear line function being observed. A radar needs to rapidly and accurately extract from such a complicated tracing several characteristics for use in distinguishing.

In order to address this issue, the determination section 29 employs one of the following methods to distinguish an overhead object.

First Embodiment

Figure 7:
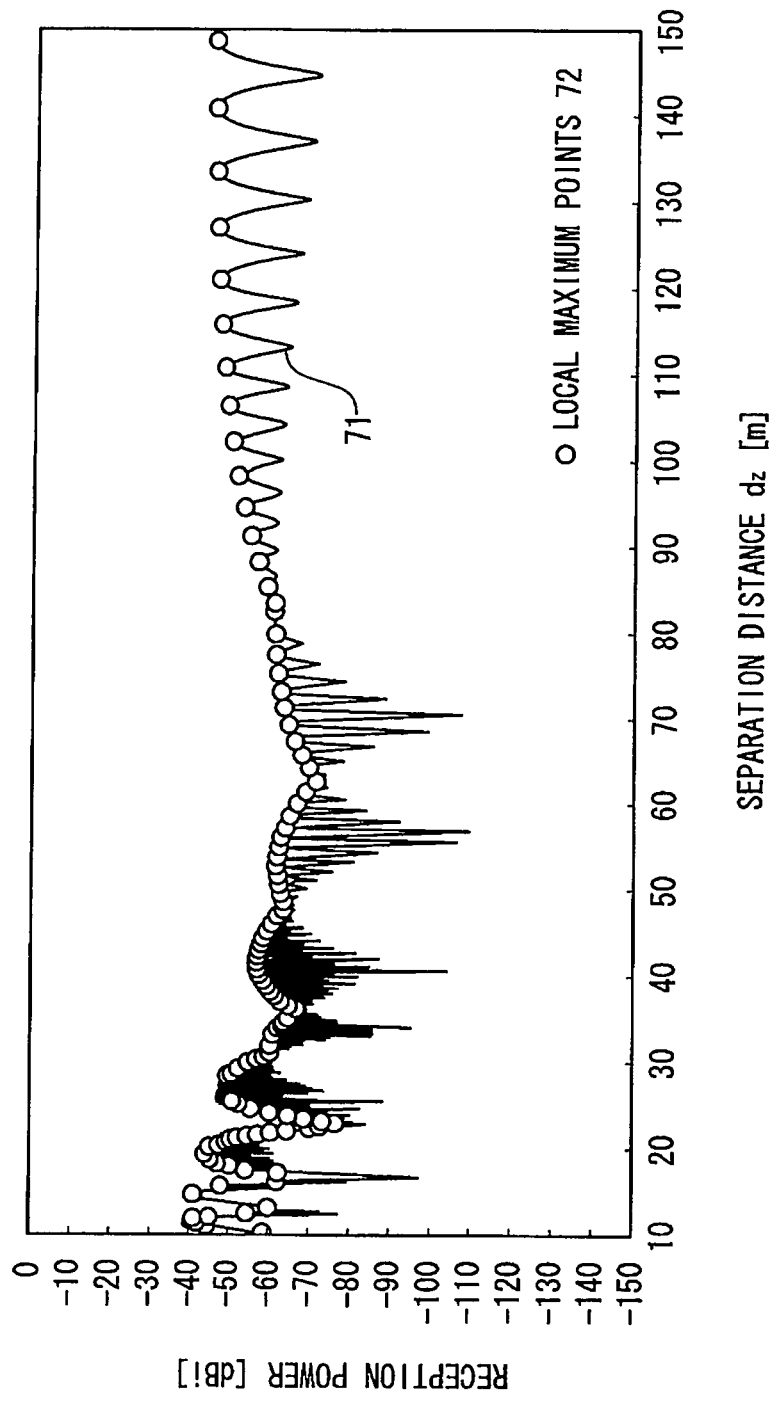
FIG. 7 illustrates reception power from an overhead object against to-object separation distance and local maximum points of reception power.

Explanation first follows regarding an overhead object distinguishing method of a first embodiment. FIG. 7 illustrates reception power of an overhead object against separation distance to the object and local maximum values points thereon. Local maximum points 72 of a reception power curve 71 are shown with white circles in FIG. 7.

The determination section 29 extracts local maximum values by taking the reception power curve of the propagation characteristics of the electromagnetic wave, and comparing reception power sampled at each separation distance with reception power sampled at previous and following separation distances. Specifically, the determination section 29 extracts reception power P ($d_{z,n}$) as a local maximum values point when both P ($d_{z,n-1}$)<P ($d_{z,n}$) and P ($d_{z,n+1}$)<P ($d_{z,n}$). Herein n is a positive integer representing an increment of separation distance at which reception power is computed.

Local maximum value extraction is an effective means to capture the electromagnetic wave propagation characteristics for the following 3 reasons. The first reason is that the local maximum values can have values exceeding the detection threshold value even for large separation distances, and hence analysis processing can be commenced as far away as possible.

The second reason is that the largest reception power from reception powers at separation distances close to a specific separation distance can be obtained, and hence the Signal to Noise (SN) ratio can be increased. By adopting such an approach a configuration less susceptible to affects of interference, such as from noise, can be achieved.

The third reason is the point that since stable observations of reception power can be achieved, the resulting electromagnetic wave propagation characteristics do not depend to any great extent on the capability of the measurement instrument.

Figure 8:
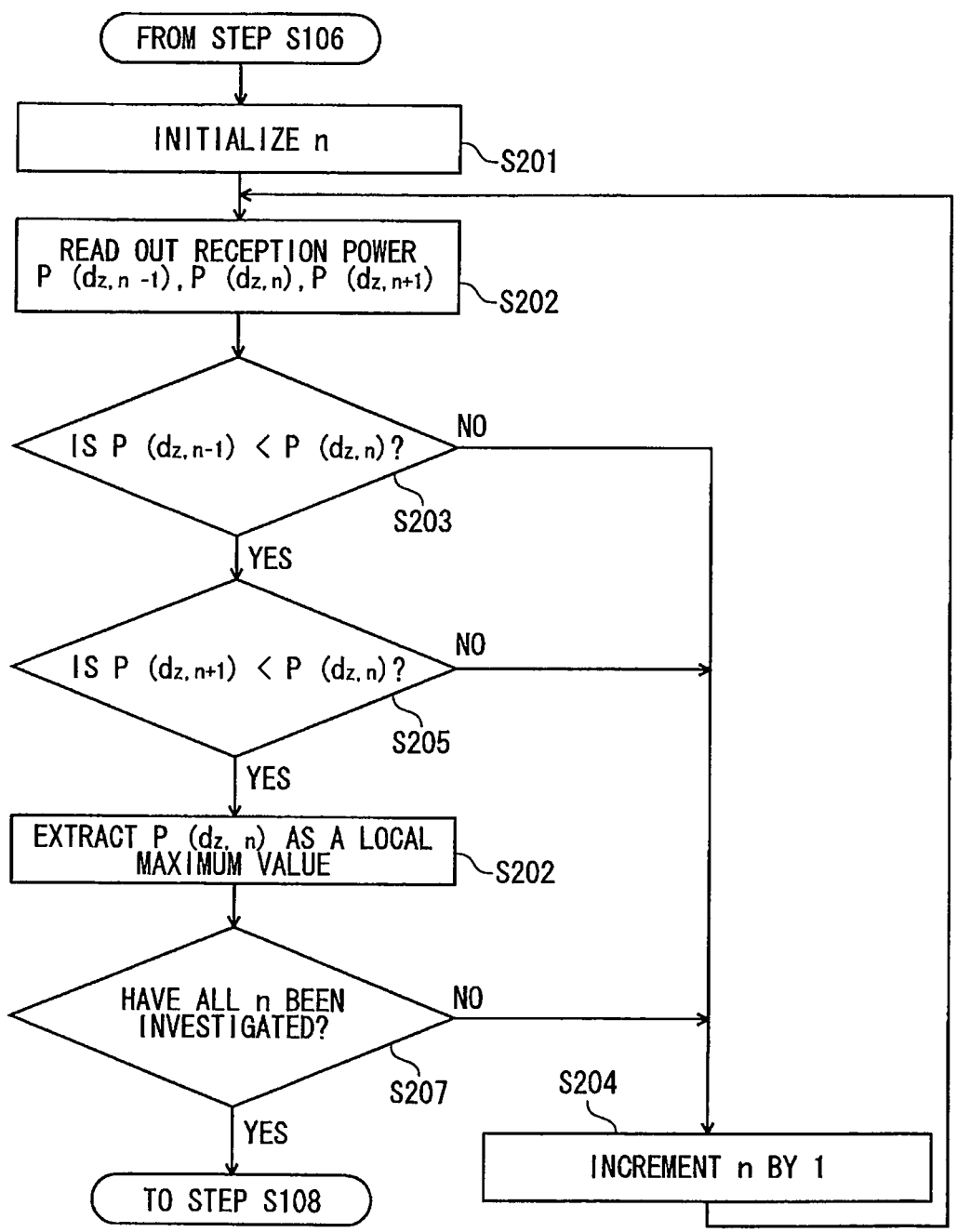
FIG. 8 illustrates local maximum point extraction processing.

Next, the procedure by which the local maximum points, in the same cycle as the cycles for computing the reception power by the reception power calculator 22, are extracted by the representative point extractor 28 is described. FIG. 8 illustrates local maximum points extraction processing. The representative point extractor 28 first initializes n (wherein n takes integer values of 2 or more) to 2 (step S201). The representative point extractor 28 then reads out the reception power P ($d_{z,n-1}$) for the cycle two previous to the current cycle, the reception power P ($d_{z,n}$) for the cycle one previous to the current cycle, and the reception power P ($d_{z,n+1}$) for the current cycle (step S202). $d_{z,n}$ represents the separation distance corresponding to the $n^{th}$ sampling of the reception power, and the greater the number of n, the smaller the value of $d_{z,n}$.

The representative point extractor 28 then compares P ($d_{z,n-1}$) and P ($d_{z,n}$) (step S203). When P ($d_{z,n-1}$) is the same as or greater than the P ($d_{z,n}$) (step S203: NO), the representative point extractor 28 increments n by 1 (step S204) and processing then returns to step S202.

However, when P ($d_{z,n-1}$) is smaller than P ($d_{z,n}$) (step S203: YES), the representative point extractor 28 compares P ($d_{z,n+1}$) and P ($d_{z,n}$) (step S205).

When P ($d_{z,n+1}$) is the same as or greater than P ($d_{z,n}$) (step S205: NO), the representative point extractor 28 increments n by 1 (step S204) and processing then returns to step S202.

However, when P ($d_{z,n+1}$) is smaller than P ($d_{z,n}$) (step S205: YES), the representative point extractor 28 extracts the P ($d_{z,n}$) as a local maximum value (step S206).

When the representative point extractor 28 not yet completed investigation for all values of n (step S207: NO), the representative point extractor 28 increments n by 1 (step S204) and processing then returns to step S202.

However, the representative point extractor 28 ends local maximum value extraction processing when all values of n have been investigated. This completes the processing in FIG. 8.

The representative point extractor 28 may extract local minimum values rather than local maximum values. If this approach is adopted then the reception power curve against separation distance has sharper peaks in the vicinity of the local minimum values than in comparison to the vicinity of the local maximum values, and so more accurate detection can be made for the separation distance exhibiting local minimum values.

Configuration may be made in such cases such that the representative point extractor 28 extracts P ($d_{z,n}$) for instances when both P ($d_{z,n-1}$)>P ($d_{z,n}$) and P ($d_{z,n+1}$)>P ($d_{z,n}$).

Next, in order to illustrate an example of the number of local maximum values, the height difference of a forward object (on-the-optical-axis object) and an overhead object is redefined. Generally the radar installation height h1 is 1 m. The height difference Δh for the forward object is thus 0 m.

Figure 9:
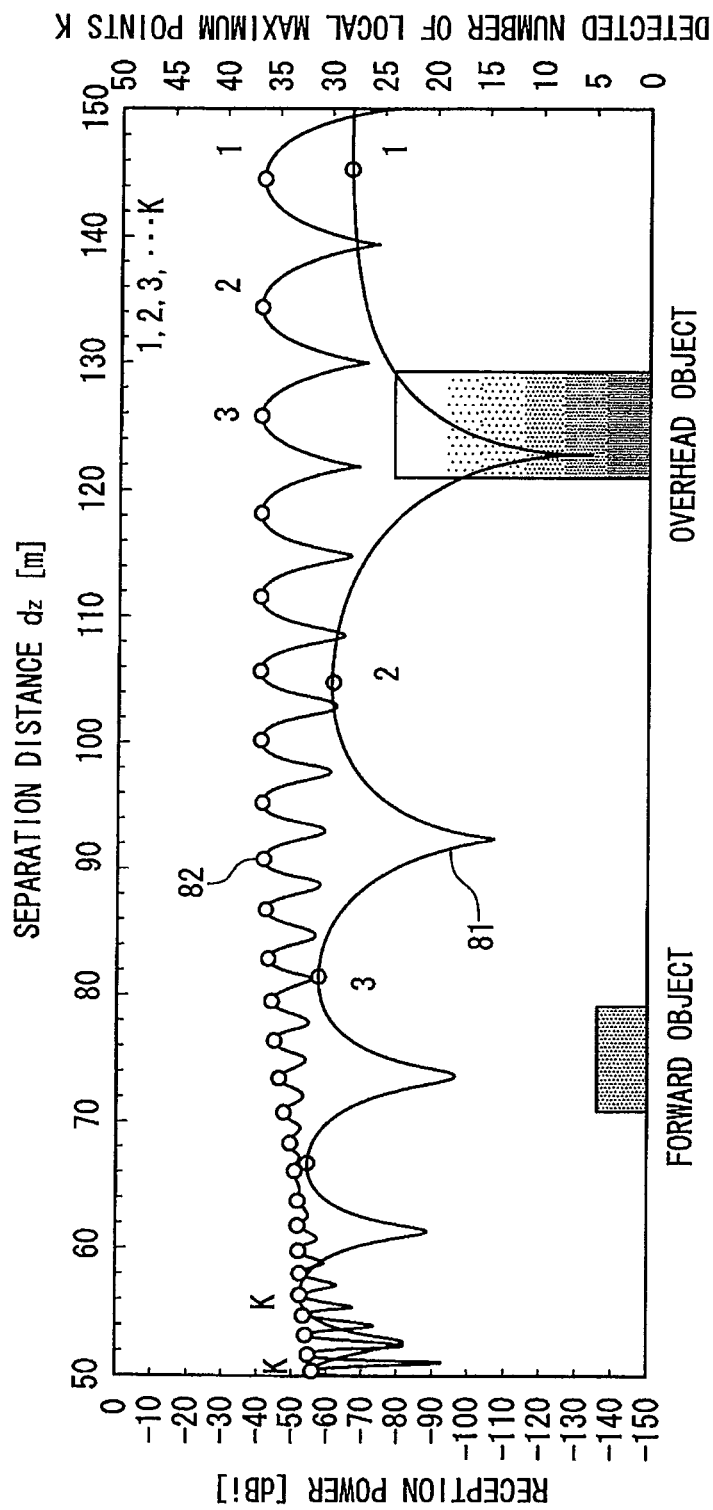
FIG. 9 illustrates local maximum points of reception power expressed on a reception power curve against separation distance from an object and the number of local maximum points.

Generally the height clearance from the road surface to ensure safe passage of vehicles is 4.5 m or greater. Accordingly, the minimum value for the height of an overhead object is set at this height, 4.5 m, giving a height difference Δh of 3.5 m. FIG. 9 illustrates an example in which respective reception power local maximum points and numbers for these local maximum points are computed for respective objects under the above conditions.

FIG. 9 illustrates local maximum points of reception power represented on a reception power curve against separation distance from an object, and numbers of these local maximum points. The local maximum values for a forward object (on-the-optical-axis object) are shown by white circles on a reception power curve 81 in FIG. 9. The local maximum values for an overhead object are shown by white circles on a reception power curve 82.

There is a greater detected number of local maximum values K for the overhead object than for the forward object. The detected number of local maximum values K here is made by detecting each oscillation in reception power against separation distance as a single detection. Accordingly, the value of the oscillation number of reception power is the same as the value of detected number of local maximum values K. Accordingly, since the detected number of local maximum values K is greater for an overhead object than for a forward object, this means that the number of oscillations of reception power is also greater for an overhead object than for a forward object.

Figure 10:
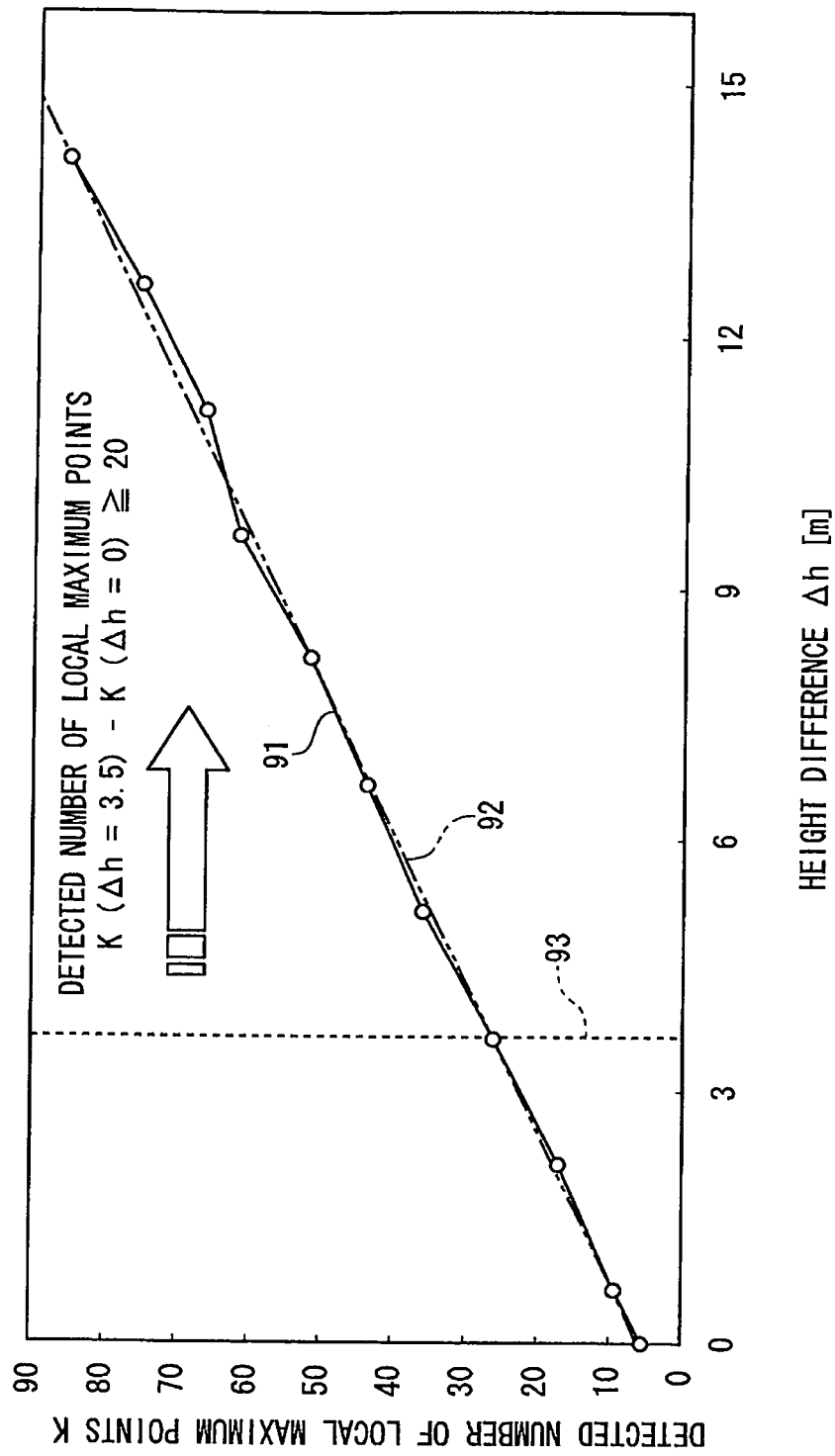
FIG. 10 illustrates number of local maximum values detected against height difference.

FIG. 10 illustrates the number of detected local maximum values against height difference. It can be seen from the detected number of local maximum value curve 91 computed in the simulation that the detected number of local maximum points increases in a straight line with respect to the height difference Δh. Namely, a relationship is exhibited in which the higher the height of an overhead object the greater the detected number of local maximum points. The detected number of local maximum value curve 91 can be approximated to the straight line of a straight line approximation 92.

From the position where a straight line 93, at height difference Δh of 3.5 m, crosses the detected number of local maximum value curve 91, it can be seen that the detected number of local maximum points K $_{(\Delta h=3.5)}$ when the height difference Δh is 3.5 m is 26. Similarly, the detected number of local maximum points K $_{(\Delta h=0)}$ is 5 when the height difference Δh is 0 m. Hence, the K $_{(\Delta h=3.5)}$−K $_{(\Delta h=0)}$ is ≥20.

Figure 11:
FIG. 11 illustrates a table of detected number of local maximum values K and associated respective height differences $\Delta h$.

FIG. 11 is an explanatory diagram showing a table of the detected number of local maximum values K and the associated height differences Δh. In FIG. 11, table 100 holds the same combinations of extracted detected number of local maximum values K and height differences Δh as the straight line approximation 92 of FIG. 9. Accordingly, the table 100 has a one-to-one correspondence between the detected number of local maximum values K and the height differences Δh.

The memory 21 pre-stores the table 100 of detected number of local maximum values K against height differences Δh. In order to estimate the object's height h2, the determination section 29 extracts the height difference Δh corresponding to the detected number of local maximum values K from the table 100 stored in the memory 21.

Alternatively, the memory 21 holds an equation for the function of straight line approximation 92. In order to estimate the object's height h2, the determination section 29 reads out the equation for this function. The determination section 29 then substitutes the detected number of local maximum values K into the equation of the straight line approximation 92, thereby computing the height difference $\Delta h$.

Figure 12:
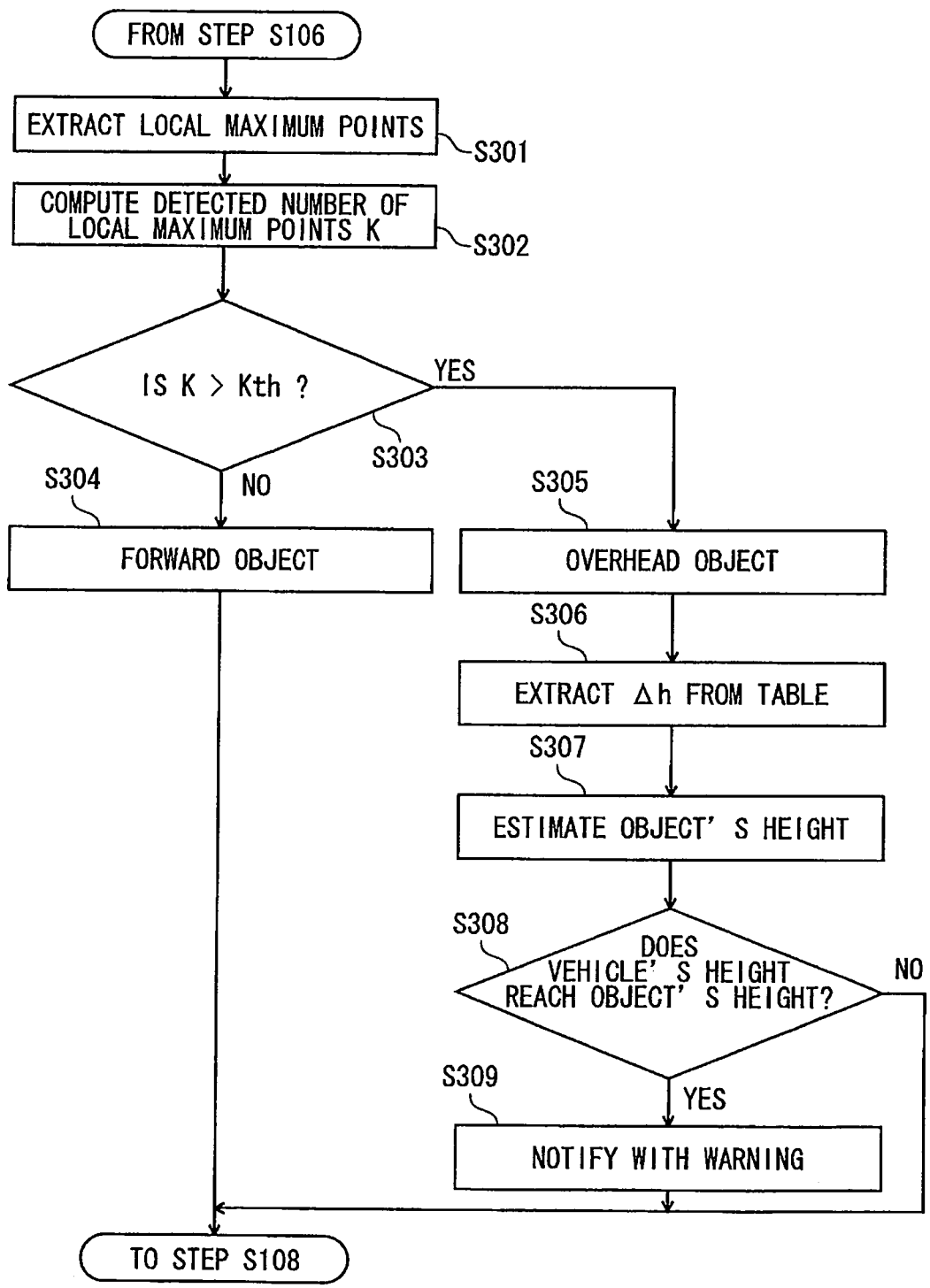
FIG. 12 illustrates overhead object distinguishing processing employing detected number of local maximum values.

FIG. 12 illustrates overhead object distinguishing processing employing the detected number of local maximum values. The processing in FIG. 12 corresponds to step S107 of FIG. 4. The representative point extractor 28 first, with a specific cycle, employs the procedure in FIG. 8 to sequentially extract the local maximum points from the function of reception power against separation distance (step S301). The determination section 29 then computes the detected number of local maximum points K extracted (step S302). When the detected number of local maximum points K is the same as a specific threshold value $K_{th}$ or less (step S303: NO), the determination section 29 determines that the object is a forward object (on-the-optical-axis object).

However, when the detected number of local maximum points K is greater than the specific threshold value $K_{th}$ (step S303: YES), the determination section 29 determines that the object is an overhead object. The determination section 29 then reads out the table 100 held in the memory 21, and extracts the height difference $\Delta h$ corresponding to the detected number of local maximum points K (step S306). The determination section 29 adds the radar apparatus optical axis height h1 to the extracted height difference $\Delta h$, thereby computing the object's height (step S307).

After computing the object's height, the determination section 29 may determine whether or not the vehicle to which the radar apparatus is installed will collide with the object (for example, traffic lights or steel pedestrian high span bridge) (step S308). The determination section 29 reads out the vehicle's height that is previously stored in the memory 21.

When the read-out vehicle's height reaches the thus-computed object's height (step S308: YES), the determination section 29 controls to issue a warning from a speaker, not shown in the drawings (step S309). However, if the read-out vehicle's height is lower than the thus-computed object's height (step S308: NO), the determination section 29 ends processing. This completes the processing in FIG. 12.

By execution of the above, the determination section 29 can determine whether or not the vehicle will impact the object, by comparing the object's height with the vehicle's height. The determination section 29 can hence notify the driver of the vehicle installed with the radar apparatus in advance of the danger of an impending collision between the object and the vehicle itself.

In this embodiment, when the object is determined to be an overhead object, the height difference is extracted from the table 100, and the object's height is estimated. However, the height difference may be computed from the equation of the straight line approximation 92, and the object's height may be estimated therefrom.

In this embodiment, the object's height is estimated only when the object is determined to be an overhead object. However, the object's height may also be estimated when the object is determined to be a forward object. In this case, the object's vehicle type can be estimated from the object's height.

In this embodiment, the determination section 29 controls to issue a warning when the vehicle's height read from the memory 21 reaches the object's height. However, in a case where a load is loaded onto the vehicle so as to protrude upward from a top of the vehicle, the determination section 29 may read out from the memory 21 the load's height (total height), and may control to issue a warning when the load's height reaches the object's height.

The determination section 29 may estimate the vehicle type of the forward object after an object has been determined to be a forward object at step S304. For example, the determination section 29 may estimate the object's height with a method similar to that of step S306 and step S307. The determination section 29 then reads out from the memory 21 the vehicle's height.

When the estimated value of the height h2 of the object is greater than 2 m, the determination section 29 determines the object to be a normal truck. However, the determination section 29 determines that the object is a car when the estimated value of the height h2 of the object is 2 m or less.

According to the first embodiment, because of the relationship that the number of extreme values increases the higher the height of the overhead object, the higher the height of the overhead object the more robustly determination can be made that the object is an overhead object, without being affected of fluctuations in reception power, such as due to spike noise.

Since the height difference between an object and the optical axis of the reception antenna can be derived from the number of extreme values counted, the object's height can be computed from the above height difference. Accordingly, when the object is an overhead object, determination can be made as to whether or not the vehicle itself will collide with the object by comparing the object's height with the vehicle's height. Danger of an impending collision of the object with the vehicle installed with the radar apparatus can be notified in advance to the driver of the vehicle itself. Moreover, when the object is not an overhead object, the object's vehicle type can be estimated from the thus-computed object's height.

Second Embodiment

Figure 13A:
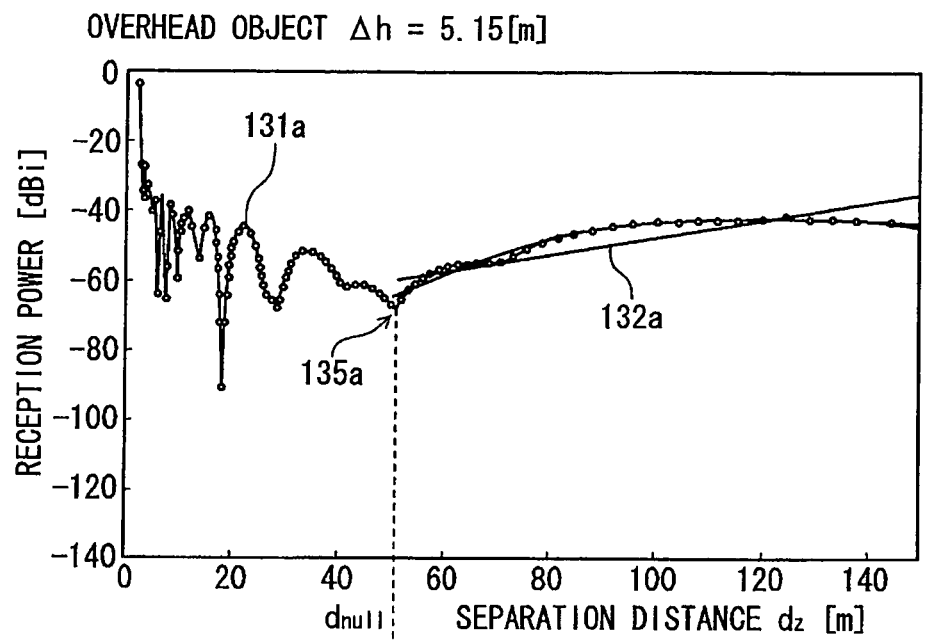
FIG. 13A and FIG. 13B illustrate curves connecting local maximum values on reception power curves against separation distance and straight line approximations to the curves connecting the local maximum values.
Figure 13B:
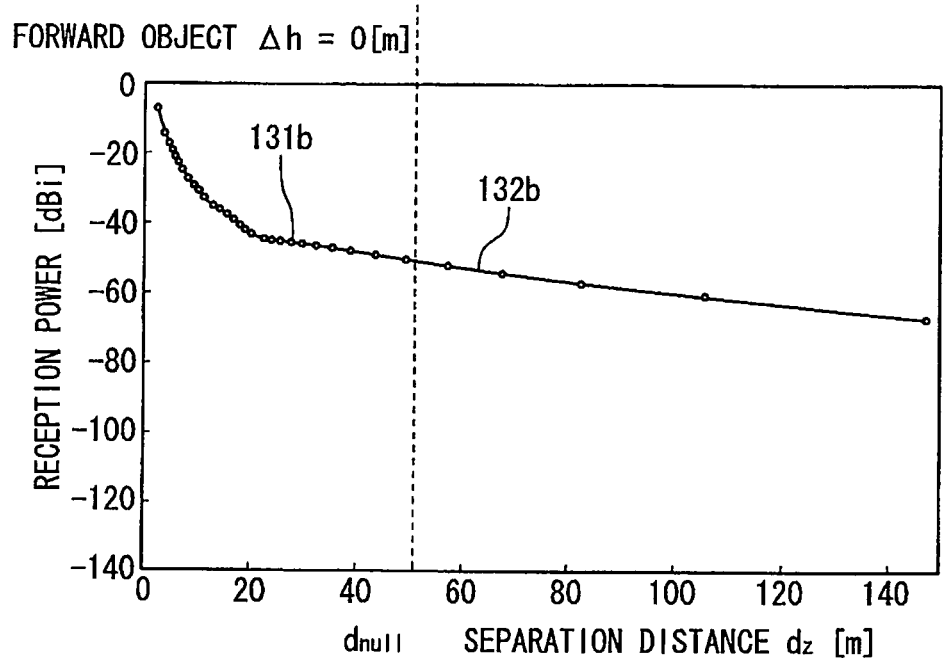

Next, a method for distinguishing an overhead object according to a second embodiment is described. The determination section 29 distinguishes an overhead object with the method of the second embodiment as follows. FIG. 13A and FIG. 13B illustrate curves connecting local maximum values of reception power curves against separation distance (referred to below as local maximum value curve), and straight line approximations to the local maximum value curve.

FIG. 13A illustrates the local maximum value curve of a curve expressing reception power as a function of separation distance for an overhead object illustrated in FIG. 6A. The local maximum value curve 131a of the reception power curve against separation distance in FIG. 13A is computed from reception power on the assumption of an overhead object being present with a height difference $\Delta h$ of 5.15 m, computed by the method described above.

The first order approximation straight line 132a is a first order approximation straight line of the local maximum value curve 131a of reception power against separation distance.

The computation range of the above straight line approximation or above approximation curve is from a separation distance $d_z$ or 150 m up to a separation distance $d_{null}$ at point 135a, which is the first null point of the direct wave. The first null point is the elevation angle where the antenna reception sensitivity in the space between the main lobe and the first side lobe of the antenna becomes 0. The first null point is a point determined by the antenna directionality pattern.

FIG. 13B illustrates a local maximum value curve of a curve expressing reception power as a function of separation distance for a forward object (on-the-optical-axis object), and a straight line approximation of this local maximum value curve. The local maximum value curve 131b of the reception power in FIG. 13B has been computed from reception power with the assumption that there is the forward object present with a height difference Δh of 0 m, computed by the method described above.

The first order approximation straight line 132b is a first order approximation straight line of the reception power local maximum value curve 131b.

The computation range of the above straight line approximation or above approximation curve here is from a separation distance $d_z$ of 150 m up to a separation distance $d_{null}$ at a first null point 135a.

Figure 14:
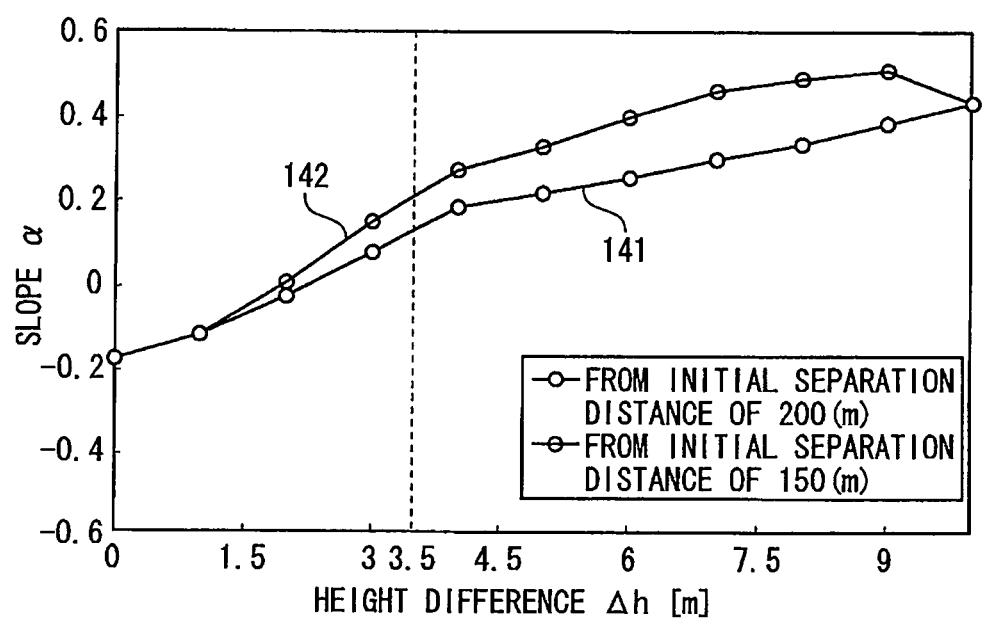
FIG. 14 illustrates relationships between first order coefficients of a first order approximation straight line and height differences.

FIG. 14 illustrates the relationship between a first order coefficient of the first order approximation straight line against height difference. Line 141 is of the relationship between the first order coefficient of the first order approximation straight line and the height difference when the first order approximation straight line has been computed from a separation distance of 200 m. Line 142 is of the relationship between the first order coefficient of the first order approximation straight line and the height difference when the first order approximation straight line has been computed from a separation distance of 150 m.

In both these lines, the sign of the first order coefficient (slope) α switches to positive from when the height difference Δh is about 2 m. Accordingly, when the height difference Δh of an overhead object is 3.5 m or above the sign of the first order coefficient (slope) α is positive. Consequently, the sign of the first order coefficient (slope) α can be utilized in distinguishing of an overhead object.

Figure 15:
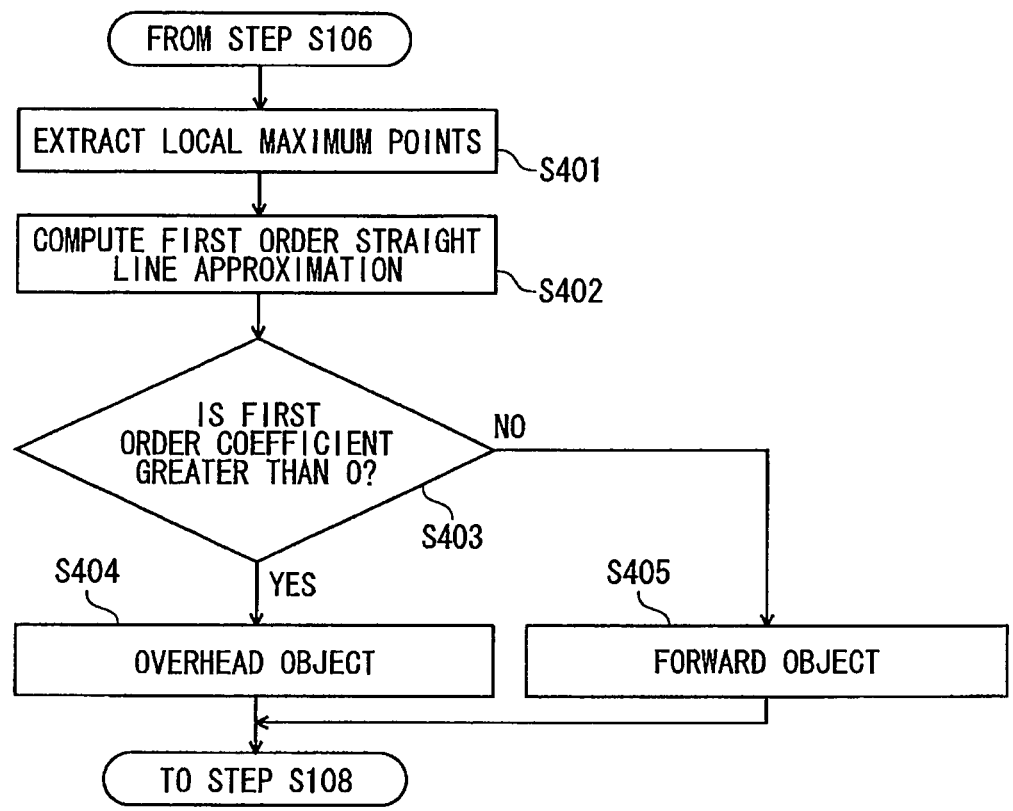
FIG. 15 illustrates overhead object distinguishing processing employing a first order coefficient of a first order function.

FIG. 15 illustrates overhead object distinguishing processing utilizing the first order coefficient of an first order approximation straight line. The processing in FIG. 15 corresponds to step S107 of FIG. 4. The representative point extractor 28 first, at a specific cycle, sequentially extracts local maximum points from the reception power as a function of separation distance with the procedure in FIG. 8 (step S401). The determination section 29 then computes a first order approximation equation to approximate to the relationship of local maximum values to separation distance (step S402).

When the first order coefficient α is greater than 0 (step S403: YES), the determination section 29 determines the object to be an overhead object (step S404).

However, when the first order coefficient α is 0 or less (step S403: NO), the determination section 29 determines the object to be a forward object (step S405). This completes the processing in FIG. 15.

According to the second embodiment, since extreme values of reception power against separation distance can be approximated to a first order function, the object can be determined to be an overhead object when the first order coefficient of the first order function is greater than a specific threshold value. Accordingly, by selection of an appropriate specific threshold value, robust determination can be made of overhead objects, without being affected by fluctuations in reception power, such as due to spike noise.

Third Embodiment

Figure 16A:
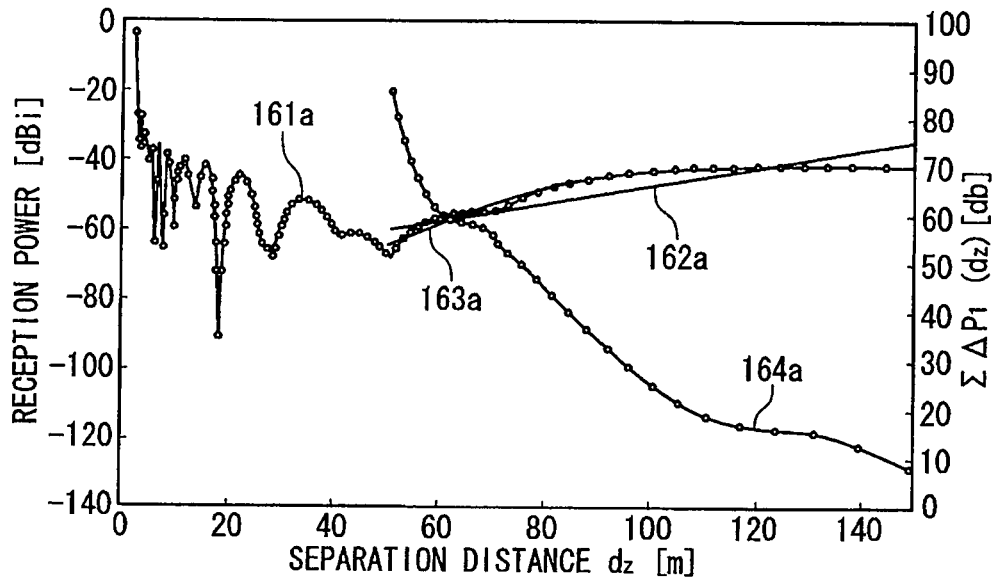
FIG. 16A and FIG. 16B illustrate local maximum value curves, first order approximation straight lines, and third order approximation curves for reception power, and a sum of absolute values of the difference between the power value on the first order approximation straight lines and the power value on the third order approximation curves.
Figure 16B:
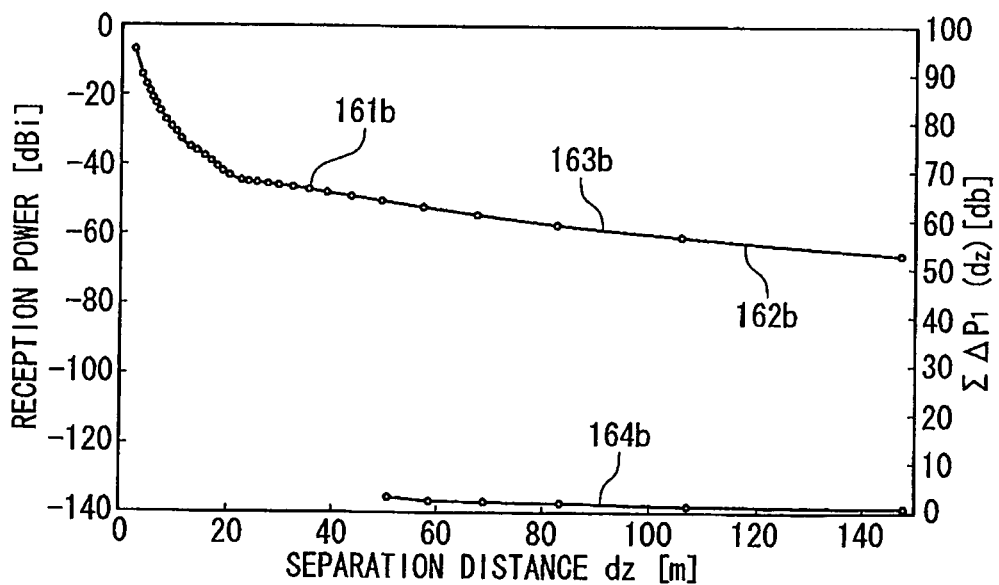

Next, a method for distinguishing an overhead object according to a third embodiment is described. FIG. 16A and FIG. 16B are graphs each showing: a local maximum value curve of reception power against separation distance; a first order approximation straight line of reception power against separation distance; a third order approximation curve of reception power against separation distance; and a curve with respect to separation distance connecting together the cumulative sum with decreasing separation distance of absolute values of the difference between the power value on the first order approximation straight line and the power value on the third order approximation curve at each of the separation distances (sum of difference absolute values), $\Sigma|\Delta P_1 (d_z)|$. In FIG. 16A and FIG. 16B the vertical axis on the left hand side indicates the reception power (dBi) for the local maximum value curve of reception power, the first order approximation straight line and the third order approximation curve. The vertical axis on the right hand side indicates the $\Sigma|\Delta P_1 (d_z)|$ (dB) for the sum of difference absolute values.

FIG. 16A illustrates, for an overhead object having a height difference Δh of 4.15 m: a local maximum value curve 161a of reception power against separation distance; a first order approximation straight line 162a of reception power against separation distance; a third order approximation curve 163a of reception power against separation distance; and a curve 164a with respect to separation distance connecting together the cumulative sum with decreasing separation distance of absolute values of the difference between the power value on the first order approximation straight line 162a and the power value on the third order approximation curve 163a at each of the separation distances (sum of difference absolute values). In FIG. 16A, the sum 164a of difference absolute values increases as the separation distance $d_z$ gets smaller, sloping up to the left hand side.

FIG. 16B illustrates, for a forward object (on-the-optical-axis object) having a height difference Δh of 0 m: a local maximum value curve 161b of reception power against separation distance; a first order approximation straight line 162b of reception power against separation distance; a third order approximation curve 163b of reception power against separation distance; and a curve 164b with respect to separation distance connecting together the cumulative sum with decreasing separation distance of absolute values of the difference between the power value on the first order approximation straight line 162b and the power value on the third order approximation curve 163b at each of the separation distances (sum of difference absolute values). In FIG. 16B, the sum of difference absolute values 164b does not reach the same magnitude as the sum of difference absolute values 164a even when $d_z$ gets smaller.

As seen in FIG. 16A, for the region from a separation distance of an overhead object of 150 m to the separation distance $d_{null}$, there is a good fit of the third order function to the local maximum value curve of reception power since the curve is unaffected by the antenna directionality. However, in the above region, the local maximum value curve of reception power for a forward object can largely be treated as a linear function and so there is a good fit of the first order function to the local maximum value curve of reception power.

Due to the above characteristics, a relationship exists in which a first order approximation straight line has a good fit to the local maximum value curve of reception power for a forward object, however a first order approximation straight line does not have a good fit to the local maximum value curve of reception power for an overhead object. The determination section 29 utilizes this relationship for distinguishing overhead objects.

Specifically, the determination section 29 employs difference $\Delta P (d_z)$, the difference between the power computed from a first order approximation equation at a given separation distance and the power computed by a second order or higher approximation equation at the given separation distance, to distinguish overhead objects.

For overhead object distinguishing, the determination section 29 may utilize the difference in power computed from a first order approximation equation and the power extracted from the local maximum value curve of reception power.

Examples of distinguishing methods employing $\Delta P$ ($d_z$) include the following three methods, in sequence from the method taking the shortest processing time. (1) a method in which an overhead object is determined when $\Delta P$ ($d_z$) exceeds a specific threshold value. (2) a method in which an overhead object is determined when the number of times that $\Delta P$ ($d_z$) exceeds a specific threshold value has surpassed a specific count threshold value. (3) a method in which the area of a section is computed, bounded by a first order approximation equation and by a second or higher approximation equation or by the local maximum value curve of reception power, and a overhead object is determined when the computed area exceeds a specific area threshold value.

There is a tradeoff relationship here between speed of processing and reliability for these overhead object distinguishing methods. A more specific explanation follows, in the above sequence.

In the first method, the determination section 29 computes a power $P_1$ at a predetermined separation distance using a first order approximation equation. The determination section 29 then utilizes either a second order or higher approximation equation or the local maximum value curve of reception power to compute a power $P_3$ at the same separation distance. The determination section 29 then computes either the difference $\Delta P$ between $P_1$ and $P_3$, or the absolute value of the difference $\Delta P$. The determination section 29 then determines an overhead object when the computed difference $\Delta P$ or computed absolute value of difference $\Delta P$ exceeds a specific threshold value.

In the second method, the determination section 29 computes the power $P_1$ ($d_z$) utilizing a first order approximation equation at each of predetermined separation distances $d_z$. The determination section 29 then computes the power $P_3$ ($d_z$) for each of the predetermined separation distances $d_z$ using either a second order or higher approximation equation, or the local maximum value curve of reception power. The determination section 29 then computes differences $\Delta P$ ($d_z$) between the power $P_1$ ($d_z$) and the power $P_3$ ($d_z$) or the absolute values of differences $\Delta P$ ($d_z$). The determination section 29 then counts the number of times the difference $\Delta P$ ($d_z$) or the absolute value of the difference $\Delta P$ ($d_z$) exceeds a predetermined threshold value. The determination section 29 determines an overhead object when the counted number of times surpasses a specific count threshold value.

In the third method, the determination section 29 computes a power $P_1$ ($d_z$) using a first order approximation equation for each of predetermined separation distances $d_z$. The determination section 29 then computes a power $P_3$ ($d_z$) for each of the predetermined separation distances $d_z$ using either a second order or higher approximation equation or the local maximum value curve of reception power. The determination section 29 computes the absolute value of the difference $\Delta P$ ($d_z$) between $P_1$ ($d_z$) and $P_3$ ($d_z$).

The determination section 29 computes sum $\Sigma \Delta P$ ($d_z$), the sum of differences $\Delta P$ ($d_z$), or sum $\Sigma |\Delta P$ ($d_z$)|, the sum of the absolute values of the differences $\Delta P$ ($d_z$). The determination section 29 determines an overhead object when the sum $\Sigma \Delta P$ ($d_z$) or the sum $\Sigma |\Delta P$ ($d_z$)| exceeds a specific sum threshold value.

Next, the sum $\Sigma \Delta P$ ($d_z$) computed by the third method is described. The determination section 29 determines the object to be an overhead object if the sum $\Sigma \Delta P$ ($d_z$) exceeds a specific threshold value. However, the determination section 29 determines the object to be a forward object if the sum $\Sigma \Delta P$ ($d_z$) is the specific threshold value or lower.

The specific threshold value here is determined using the minimum height difference $\Delta h$ required for an object to be distinguished an overhead object, and the elevation angle pattern of antenna sensitivity. The height difference $\Delta h$ is determined here by the radar apparatus optical axis height h1 and the height h2 of the overhead object. Accordingly, the specific threshold value here is determined using the radar apparatus optical axis height h1, the minimum height required for an object to be distinguished as an overhead object, and the elevation angle pattern of antenna sensitivity.

Figure 17:
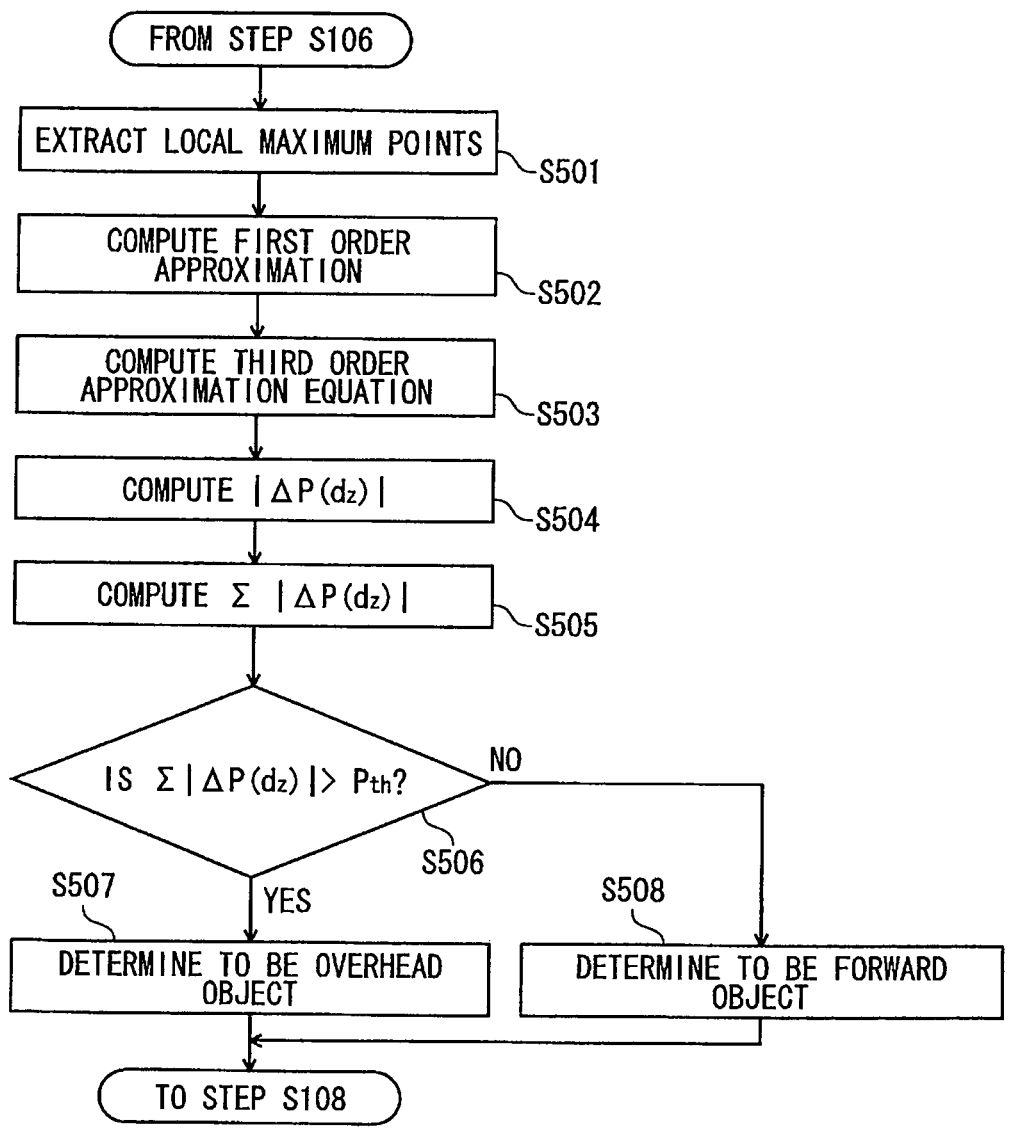
FIG. 17 illustrates overhead object distinguishing processing employing a sum of absolute values of the difference between the power value computed on a first order approximation straight line and the power value computed on a third order approximation curve.

FIG. 17 illustrates overhead object distinguishing processing using a sum of the absolute value of the differences between the power computed from a first order approximation equation and the power computed from a third order approximation equation. The processing in FIG. 17 corresponds to step S107 of FIG. 4.

The representative point extractor 28 first, with a specific cycle, sequentially extracts local maximum points from the reception power as a function of separation distance with the procedure in FIG. 8 (step S501). The determination section 29 then computes a first order approximation straight line that approximates to the relationship of local maximum values to separation distance (step S502).

The determination section 29 then computes a third order approximation curve that approximates to the relationship of the local maximum values to separation distance (step S503). The determination section 29 then computes a power $P_1$ ($d_z$) using this first order approximation equation for each of predetermined separation distances $d_z$. The determination section 29 then computes a power $P_3$ ($d_z$) using the third order approximation equation for each of the predetermined separation distances $d_z$. The determination section 29 computes $|\Delta P$ ($d_z$)|, the absolute values of the differences between $P_1$ ($d_z$) and $P_3$ ($d_z$) (step S504).

When the absolute value difference $|\Delta P$ ($d_z$)| exceeds a specific threshold value $P_{th}$ (step S506: YES), the determination section 29 determines the object to be an overhead object (step S507).

However, when the absolute value difference $|\Delta P$ ($d_z$)| is the same as or less than the specific threshold value $P_{th}$ (step S506: NO), the determination section 29 determines the object to be a forward object (step S508). This concludes the processing in FIG. 17.

According to the third embodiment, since the extreme values of reception power with respect to separation distance can be better approximated to a second order or higher function than to a first order function for an overhead object, for a given separation distance the difference between the values from a first order function and from a second order or higher function becomes large. Hence robust determination can be made as to whether an object is an overhead object without being affected by fluctuations in extreme values of reception power, such as due to spike noise.

In the third embodiment, determination of whether an object is an overhead object or not is made based on the difference of values for a first order function and for a second order or higher function for the same separation distances. However, determination of whether an object is an overhead object or not may be performed based on a difference for the same separation distance of a value for a first order function and either the power of electromagnetic wave received or a local maximum value, this being an example of a representative point.

Fourth Embodiment

Next, a method for distinguishing an overhead object according to a fourth embodiment is described. As described above, reception power P ($d_z$) curves from a local maximum value of reception power in the vicinity of a separation distance of 150 m either to a first null point or a separation distance of 40 m are compared for a forward object (on-the-optical-axis object) and an overhead object as examples of objects.

Figure 18A:
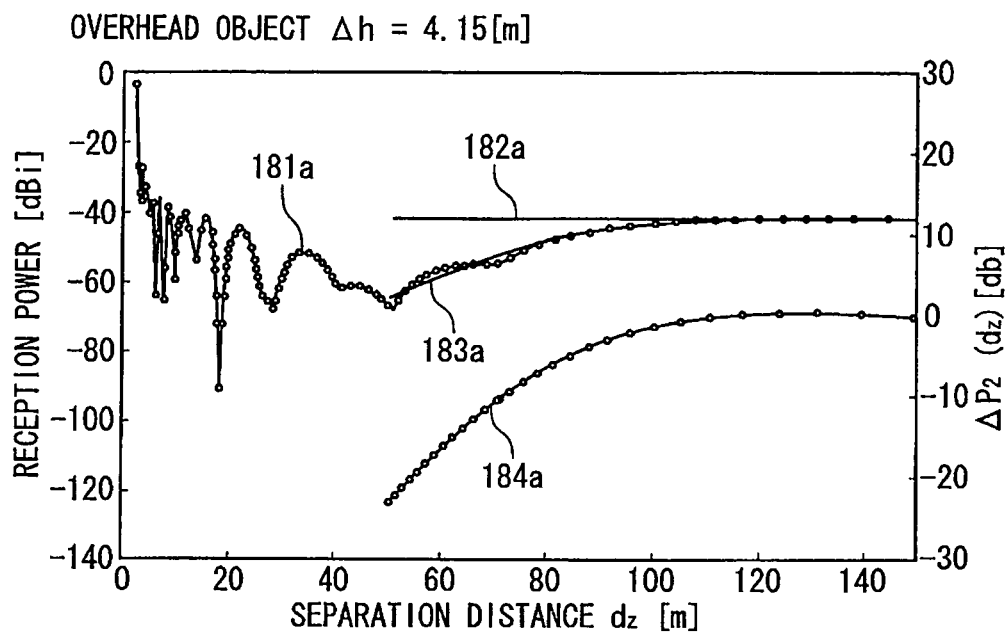
FIG. 18A and FIG. 18B illustrate local maximum value curves for reception power, straight lines representing initial power values, and third order approximation curves to the local maximum value curves, and a sum of absolute values of the difference between the initial power value and the power value on the third order approximation curves.
Figure 18B:
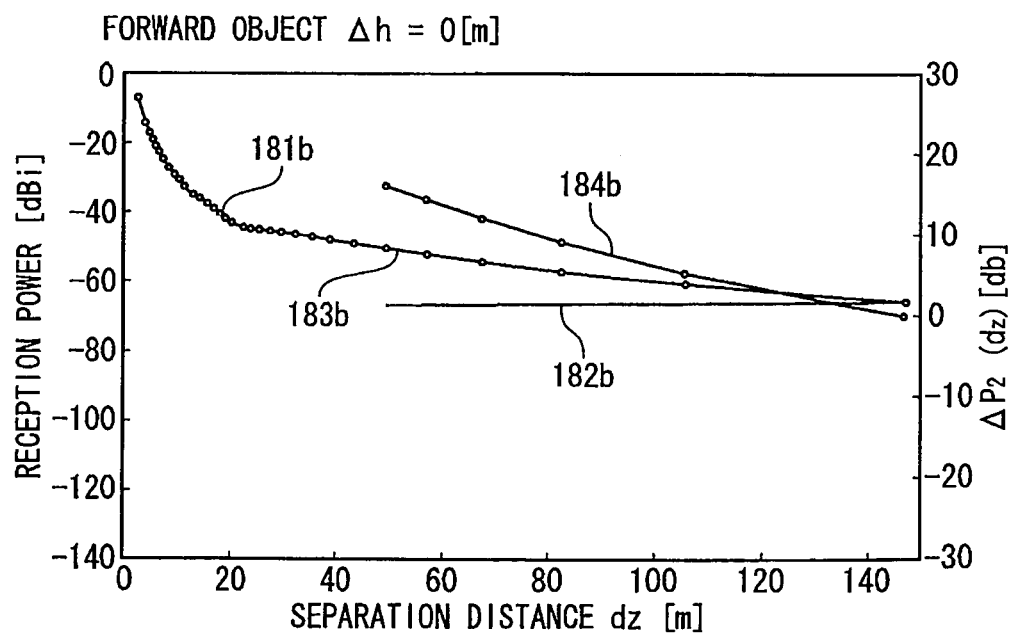

FIGS. 18A and 18B are each graphs illustrating a local maximum value curve for reception power against separation distance, a straight line against separation distance connected to the initial power value, a third order approximation curve of local maximum values of reception power against separation distance, and a curve connecting values (differences) $\Delta P_2$ $(d_z)$ of the power values on the third order approximation curve for each separation distance from which the initial power value thereon has been subtracted. In FIGS. 18A and 18B, the vertical axis on the left hand side indicates the reception power (dBi) of the local maximum value curve of reception power, the initial power value and the third order approximation curve. The vertical axis on the right hand side indicates the above difference $\Delta P_2$ $(d_z)$ (dB).

FIG. 18A is a graph for an overhead object with height difference $\Delta h$ of 4.15 m, illustrating: a local maximum value curve 181a of reception power against separation distance; a straight line 182a connected to the initial power value against separation distance; a third order approximation curve 183a of local maximum values of reception power with respect to separation distance; and a curve 184a with respect to separation distance connecting together values of the power values on the third order approximation curve for each separation distance from which the initial power value has been subtracted.

In FIG. 18A, the reception power P $(d_z)$ curve 181a for an overhead object attenuates with a high order function as the separation distance $d_z$ diminishes. Namely the curve 181a slopes down to the left hand side.

The curve 184a is a cumulative curve on decreasing separation distance $d_z$ of each of the values of the power values on the third order approximation curve 183a from which the initial power value has been subtracted.

FIG. 18B is a graph for a forward object (on-the-optical-axis object) with height difference $\Delta h$ of 0 m, illustrating: a local maximum value curve 181b of reception power against separation distance; a straight line 182b connected to the initial power value against separation distance; a third order approximation curve 183b of local maximum values of reception power against separation distance; and a curve 184b with respect to separation distance connecting together values of the power values on the third order approximation curve for each separation distance from which the initial power value has been subtracted.

In FIG. 18B, the reception power P $(d_z)$ curve 181b for a forward object increases linearly as the $d_z$ decreases. Namely the curve 181b slopes up to the left hand side.

The curve 184b is a cumulative curve on decreasing separation distance $d_z$ of each of the power values on the third order approximation curve 183b from which the value of the initial power value has been subtracted.

Accordingly, when the local maximum values of the reception power values decrease from the initial power value as the separation distance $d_z$ decreases, the determination section 29 can determine the object to be an overhead object.

Specifically, the determination section 29 employs the reception power difference $\Delta P_s$ $(d_z)$, this being the difference between the initial power value $P_s$ and the reception power of either a second order or higher approximation equation or the local maximum value curve of reception power, to distinguish an overhead object.

The distinguishing method employing the $\Delta P_s$ $(d_z)$ may be one of the following 3 methods, in sequence from the method taking the shortest processing time. (1) a method in which an overhead object is determined when the $\Delta P_s$ $(d_z)$ or the absolute value of the $\Delta P_s$ $(d_z)$ is smaller than a specific threshold value. (2) a method in which the number of times the difference $\Delta P_s$ $(d_z)$ at each separation distance is lower than a specific threshold value is counted, and an overhead object is determined when the counted number of times surpasses a specific second count threshold value. (3) a method in which a integral value is computed for a section bounded by the initial power value $P_s$ and either a second order or higher approximation equation or the local maximum value curve of reception power, and an overhead object is determined when the integral value is lower than a specific integral threshold value.

There is a tradeoff relationship here between speed of processing and reliability for these overhead object distinguishing methods. A more specific explanation follows, in the above sequence.

In the first method, the determination section 29 employs either the second order or higher approximation equation or the local maximum value curve of reception power and computes a reception power $P_4$ $(d_z)$ for a predetermined separation distance $d_z$. The determination section 29 then computes a difference $\Delta P_s$ between the initial power value $P_s$ and the reception power $P_4$ $(d_z)$, or the absolute value of the difference $\Delta P_s$, at separation distance $d_z$. The determination section 29 then determines an overhead object when the computed $\Delta P_s$, or absolute value of $\Delta P_s$, is smaller than the specific threshold value.

In the second method, the determination section 29 employs either the second order or higher approximation equation or the local maximum value curve of reception power to compute the power $P_4$ $(d_z)$ at each of predetermined separation distances $d_z$. The determination section 29 then computes differences $\Delta P_s$ $(d_z)$ between the initial power value $P_s$ and $P_4$ $(d_z)$, or the absolute values of the differences $\Delta P_s$ $(d_z)$.

The determination section 29 then counts the number of times the differences $\Delta P_s$ $(d_z)$ are lower than a specific threshold value. The determination section 29 determines an overhead object when the counted number of times surpasses the specific second count threshold value.

The determination section 29 may determine an overhead object in the following manner. The determination section 29 counts the number of times the absolute value of the difference $\Delta P_s$ $(d_z)$ exceeds a specific threshold value. The determination section 29 then determines an overhead object when the counted number of times surpasses a specific second count threshold value.

In the third method, the determination section 29 employs either the second order or higher approximation equation or the local maximum value curve of reception power for each of predetermined separation distances $d_z$ to compute a power $P_4$ $(d_z)$. The determination section 29 then computes the absolute value of the differences $\Delta P_s$ $(d_z)$ between the initial power value $P_s$ and the $P_4$ $(d_z)$.

The determination section 29 then computes the sum $\Sigma \Delta P_s$ $(d_z)$ of the differences $\Delta P_s$ $(d_z)$. The determination section 29 then determines an overhead object when the computed sum $\Sigma \Delta P_s$ $(d_z)$ is lower than a specific second sum threshold value.

The determination section 29 may be configured to determine an overhead object in the following manner. The determination section 29 computes the sum of the absolute values of the differences $\Delta P_s$ $(d_z)$, sum $\Sigma |\Delta P_s$ $(d_z)|$. The determination section 29 then determines an overhead object when the computed sum $\Sigma |\Delta P_s (d_z)|$ exceeds a specific absolute value sum threshold value.

Figure 19:
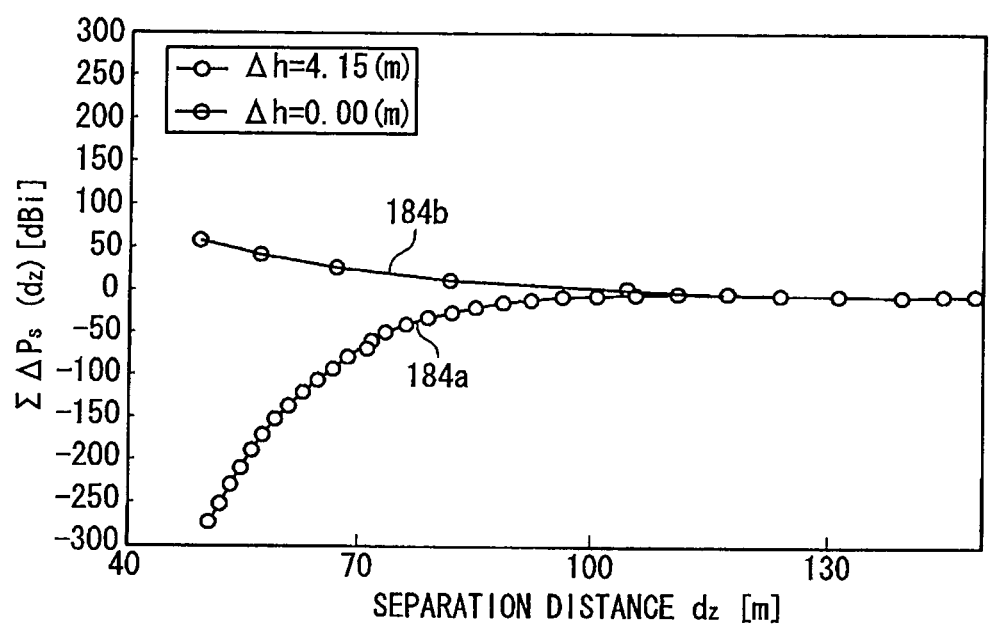
FIG. 19 is a graph for comparing sums of differences between the initial power values and the local maximum values of reception power values for an overhead object and a forward object.

Next, the sum $\Sigma \Delta P_s (d_z)$ computed in the third method is described. FIG. 19 is a graph for comparing the sums of the difference between the initial power values and the local maximum values of the reception power values for an overhead object and for a forward object (on-the-optical-axis object). The curve 184*a* represents the sum of the differences between the initial power values and the local maximum values of the reception power values for an overhead object, and shows a monotonic decrease as the separation distance $d_z$ decreases below 100 m.

However, the curve 184*b* represents the sum of the differences between the initial power values and the local maximum values of the reception power values for a forward object, and shows a monotonic increase in sum from 0 as the separation distance $d_z$ decreases below 100 m.

Accordingly, the determination section 29 can distinguish an overhead object by setting a specific threshold value. The specific threshold value is determined using the minimum height difference Δh required for an object to be distinguished as an overhead object, and the elevation angle pattern of antenna sensitivity. The height difference Δh is determined here from the radar apparatus optical axis height h1 and the height h2 of the overhead object. Accordingly, the specific threshold value is determined using the radar apparatus optical axis height h1, the minimum height for an object to be distinguished as an overhead object, and the elevation angle pattern of antenna sensitivity.

Figure 20:
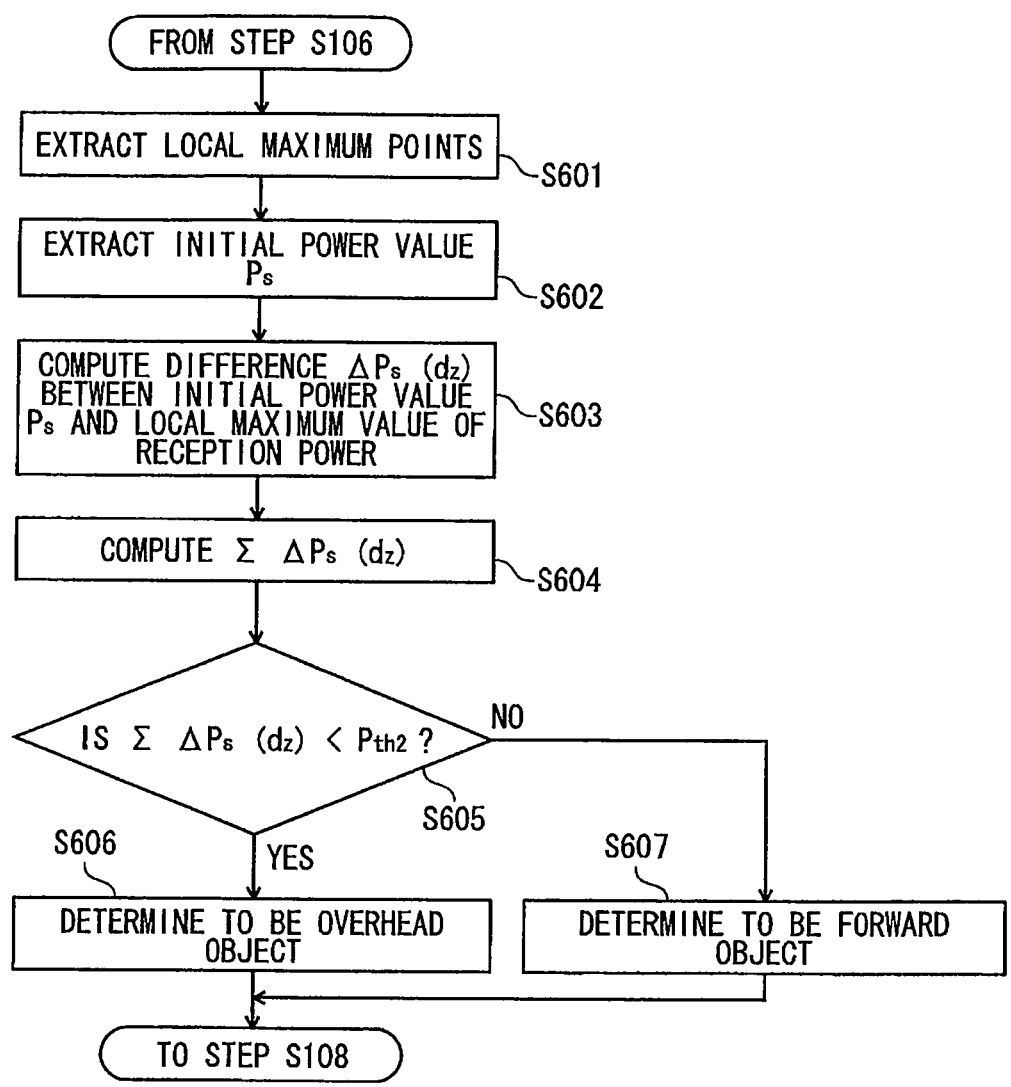
FIG. 20 illustrates overhead object distinguishing processing employing a sum of the difference between an initial power value and the power value on a third order approximation curve.

FIG. 20 illustrates overhead object distinguishing processing employing the sum of differences between the initial power value and a power computed from an third order approximation equation. The processing in FIG. 20 corresponds to step S107 of FIG. 4.

The representative point extractor 28 first, with a specific cycle, successively extracts local maximum points from the reception power as a function of separation distance by the procedure in FIG. 8 (step S601). The determination section 29 then extracts as the initial power value $P_s$ the local maximum value in the vicinity of a separation distance of 150 m (step S602).

The determination section 29 then computes the difference $\Delta P_s (d_z)$ for each of the separation distances $d_z$ between the initial power value $P_s$ and the local maximum values of reception power (step S603). The determination section 29 then cumulates the differences $\Delta P_s (d_z)$ computed for each of the separation distances $d_z$ across a specific separation distance range (for example, from 150 m to the separation distance corresponding to the first null point), and computes the sum $\Sigma \Delta P_s (d_z)$ (step S604).

When the computed sum $\Sigma \Delta P_s (d_z)$ is smaller than a specific threshold value $P_{th2}$ (step S605: YES), the determination section 29 determines the object to be an overhead object (step S606).

However, when the computed sum $\Sigma \Delta P_s (d_z)$ is the same as or greater than the specific threshold value $P_{th2}$ (step S605: NO), the determination section 29 determines the object to be a forward object (step S607). This completes the processing in FIG. 20.

According to the fourth embodiment, the difference can be computed at specific separation distances between a value with a second order or higher approximation equation and the initial power value. Whereas the extreme values increase from the initial value as the separation distance decreases when the object is a forward object present on the optical axis of the reception antenna, when the object is an overhead object, the extreme values decrease from the initial value as the separation distance decreases. Accordingly, robust determination as to whether or not an object is an overhead object can be made based on the difference between the value of the second order or higher approximation equation and the initial value, without being affected by fluctuations in extreme values of reception power, such as due to spike noise.

In the fourth embodiment, differences are computed between the value of a second order or higher approximation equation at specific separation distances and the initial power value. However, differences may be computed between the power at a representative point at specific separation distances and the initial power value.

The initial power value of the fourth embodiment is also simply an example, and the power at a representative point at a predetermined separation distance may be employed.

Fifth Embodiment

Next, a method for overhead object distinguishing according to a fifth embodiment is described. In the above fourth embodiment the initial power value was taken as a reference value, and the difference between this reference value and the local maximum values of the reception power employed for overhead object distinguishing.

In the fifth embodiment, in order to clearly differentiate between an overhead object and a forward object (on-the-optical-axis object), a theoretical value of reception power for free space propagation is computed from a radar equation, and this is employed as the reference value.

The radar equation is represented by the following Equation (1).

$$P_{ff,s} = \frac{P_t G_t G_r \sigma \lambda^2}{(4\pi)^3 r_1^4} \quad (1)$$

wherein: $P_{ff,s}$ is a reception power value during free space propagation, $P_t$ is a transmission power value, $G_t$ is the transmission antenna gain, $G_r$ is the reception antenna gain, σ is the RCS, λ is the wavelength of the radar. The RCS is computed according to Equation (2), shown below.

The free-space propagation curve 53*a* of FIG. 6A is determined according to Equation (1). The main variable here is only separation distance $r_1$. More precisely, while λ also fluctuates due to the Doppler effect this is within a range that can be ignored in the conditions for computing the free-space propagation curve 53*a*.

Since $P_t$, $G_t$ and $G_r$ are constants determined by the conditions of radar use, they are not related to the conditions of travel. The theoretical path with respect to separation distance of the reception power value $P_{ff,s}$ during free space propagation (namely the free space propagation loss curve) is a curve of fixed profile. This path moves along the reception power value axis (vertical axis) according to changes in RCS σ with traveling environment conditions (reflection conditions).

The determination section 29 computes an initial value of a local maximum value of reception power (for example a local maximum value of reception power in the vicinity of a separation distance of 150 m). The RCS σ is computed according to the following Equation (2).

$$\sigma = \frac{P'_{ff,s}(4\pi)^3 r_1^4}{P_t G_t G_r \lambda^2} * \frac{1}{P^{\wedge [12-L_{\theta 1}/10]}} \quad (2)$$

wherein: $P'_{f,s}$ is the estimated attenuated power value, and $L_{\theta 1}$ is the attenuation amount of the indirect wave component. The estimated attenuated power value $P'_{f,s}$ is an estimated value of reception power to be observed at separation distances from an object, estimated by considering the attenuation in amplitude due to attenuation of the indirect wave component. The determination section 29 employs the local maximum values on the curve representing the reception power as a function of separation distance to compute the RCS σ.

The local maximum values on the curve representing the reception power as a function of separation distance are formed by reinforcement of reception power where the phases of the direct wave and the indirect wave are aligned with each other. Accordingly, since these local maximum values are not readily affected by spike noise or the like, the RCS σ can be estimated with good precision when the estimated attenuated power value $P'_{f,s}$ is employed.

As long as the antenna specification is previously known, since the theoretical value of amplitude attenuation amount against separation distance $r_1$ can be computed, a theoretical value of amplitude attenuation amount against observed separation distances of an object may be employed for the $P'_{f,s}$.

The determination section 29 substitutes the initial value of local maximum value of reception power in the estimated attenuated power value $P'_{f,s}$ and computes RCS σ. The determination section 29 then computes a predicted free space loss value (estimated value of power), the estimated value of reception power value $P_{f,s}$ during free space propagation, by substituting the computed RCS σ into the Radar Equation (1).

When the object is a forward object, the reception antenna can receive the direct wave component of the electromagnetic wave reflected from the object with the main lobe. Consequently, the reception power value $P_{f,s}$ during free space propagation and the reception power value actually observed are values close to each other.

However, when the object is an overhead object, due to the affect of antenna directionality characteristics, the reception power value $P_{f,s}$ during free space propagation, computed according to the same method as described above, and the reception power value actually observed are completely different values.

The determination section 29 can accordingly employ any difference between the reception power value $P_{f,s}$ during free space propagation and the reception power value actually observed to determine whether or not the object is an overhead object.

Consequently, the determination section 29 distinguishes an overhead object by employing difference $\Delta P_{ff}(d_z)$ between the reception power value $P_{f,s}$ during free space propagation and the local maximum value of reception power.

More specifically, the determination section 29 extracts the first local maximum value of reception power (for example the local maximum value of reception power in the vicinity of a separation distance of 150 m) as the initial value. This local maximum value of reception power is a value with which the estimated attenuated power value $P'_{f,s}$ can be estimated with good precision.

In order to raise the precision of estimation even higher, the amount by which reception power is reduced due to the attenuation of the indirect wave component may be taken into consideration. As long as the antenna specification is previously known, since the theoretical value of the reduction amount in reception power with separation distance $d_z$ can be computed, this theoretical value may be applied as the estimated attenuated power value $P'_{f,s}$.

Figure 21A:
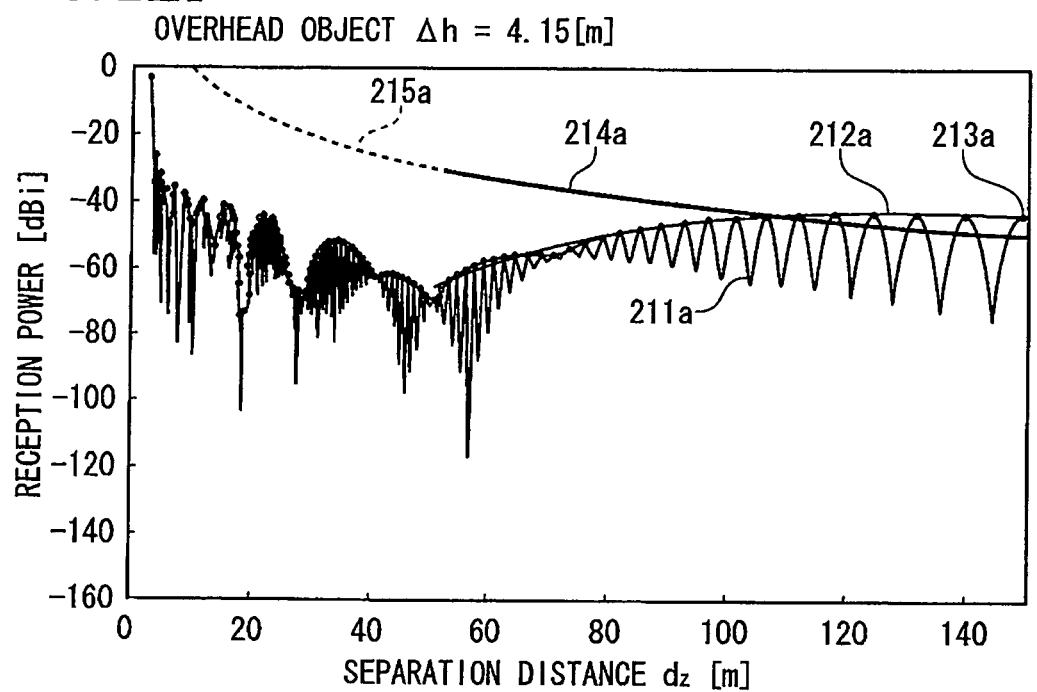
FIG. 21A and FIG. 21B are graphs for comparing predicted free space propagation curves and theoretical free space propagation loss curves.
Figure 21B:
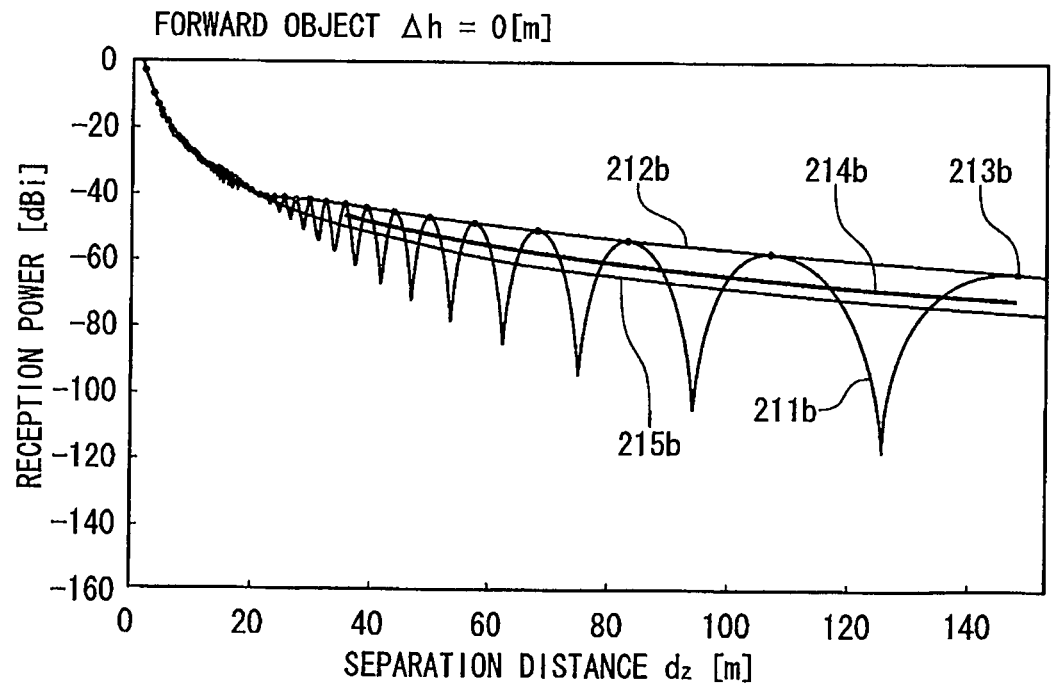

FIGS. 21A and 21B are graphs for comparing the predicted free space propagation curve and the theoretical value of free space propagation loss curve. FIG. 21A is a graph for comparing the predicted free space propagation curve and the theoretical free space propagation loss curve for an overhead object having a height difference Δh of 4.15 m. In FIG. 21A the curve 211a represents the reception power values against separation distance, and the curve 212a is a curve representing the local maximum values of the reception power values against separation distance.

Predicted free space propagation curve 214a shows values as computed estimated attenuated power values $P'_{f,s}$ from the local maximum value 213a of reception power value close to separation distance of 150 m to which a reduction of 6 dB has been applied in consideration of reflectance loss. The predicted free space propagation curve 214a has a good fit to the free space propagation loss curve 215a.

FIG. 21B is a graph for comparing the predicted free space propagation curve and the theoretical free space propagation loss curve for a forward object having a height difference Δh of 0 m. In FIG. 21B the curve 211b represents the reception power values against separation distance, and the curve 212b represents a curve of the local maximum values of these reception power values against separation distance.

Predicted free space propagation curve 214b shows values as computed estimated attenuated power values $P'_{f,s}$ from the local maximum value 213b of reception power value close to separation distance of 150 m to which a reduction of 6 dB has been applied in consideration of reflectance loss. The predicted free space propagation curve 214b is a curve taking larger power values than the free space propagation loss curve 215b.

Figure 22:
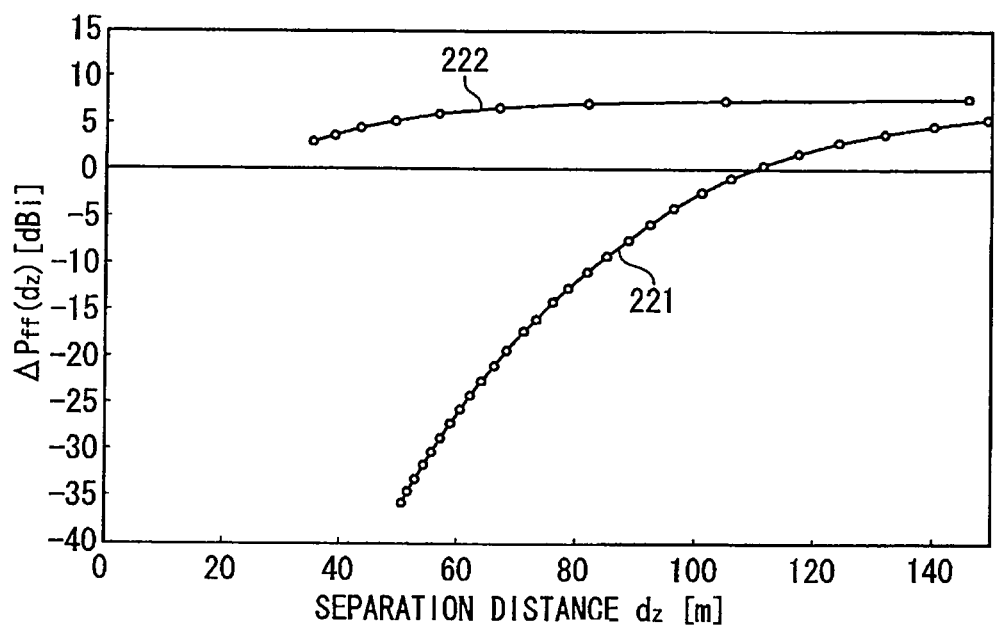
FIG. 22 illustrates, against separation distance $d_z$, differences between predicted free space propagation loss curves (estimated values of power) and local maximum values of reception power.

FIG. 22 illustrates, against separation distance, the differences between predicted free space loss values (estimated power values) and local maximum values of reception power. In FIG. 22 it can be seen that when the object is an overhead object, the difference between points on the predicted free space propagation curve and the local maximum values of reception power, shown by curve 221, decreases monotonically as the separation distance to the object $d_z$ decreases. For separation distances to the object of less than 100 m the difference value is less than 0.

When the object is a forward object, the difference between points on the predicted free space propagation curve and the local maximum values of reception power, shown by curve 222, also decreases monotonically as the separation distance to the object $d_z$ decreases. However, the difference values are 0 or above in the range from separation distances of 40 m to 150 m.

Accordingly, the determination section 29 determines the object to be an overhead object when, in a specific separation distance range (for example a range of separation distances from 40 m to 100 m), the difference between a point on the predicted free space propagation curve and the local maximum values of reception power is smaller than 0.

Figure 23:
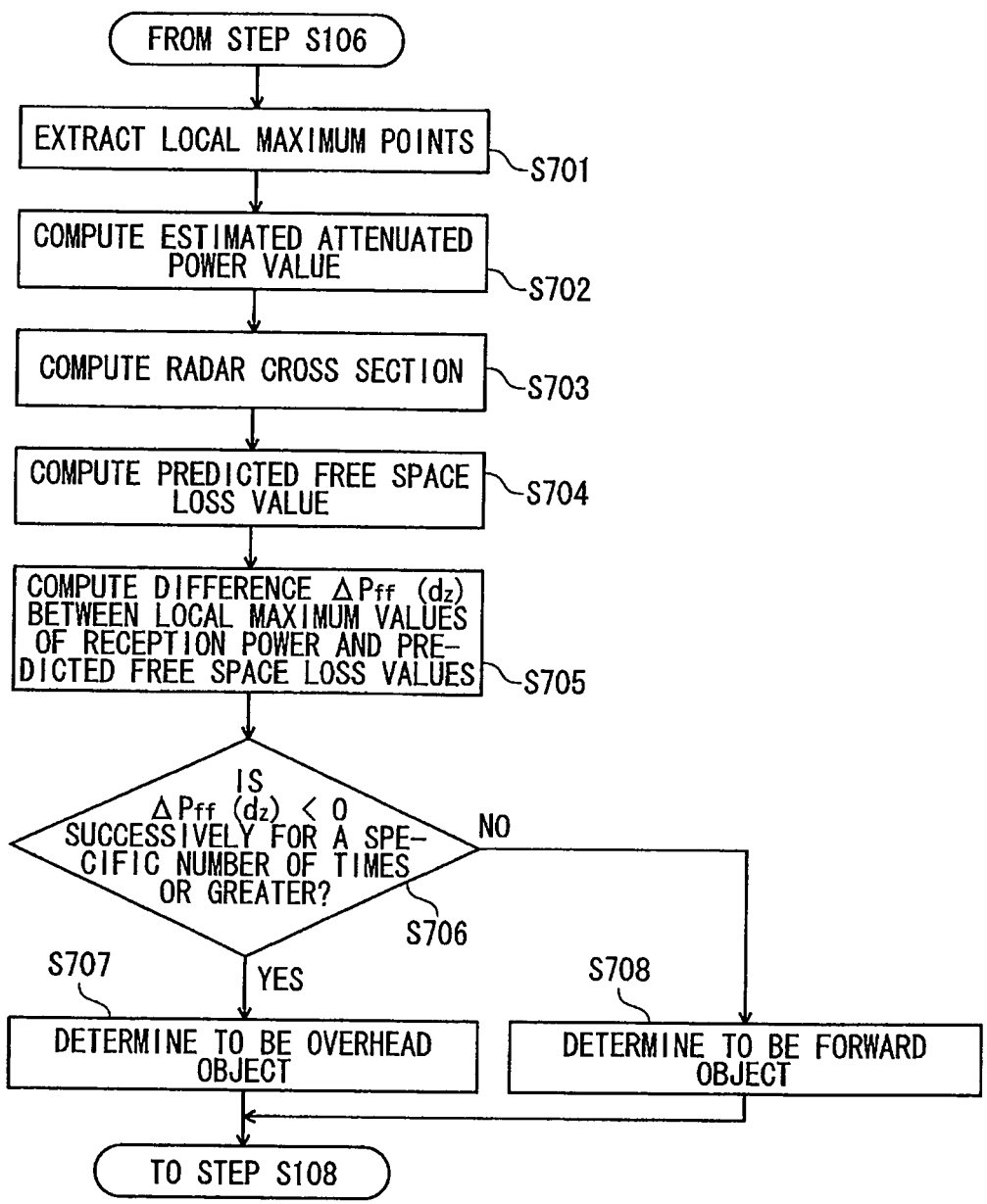
FIG. 23 illustrates overhead object distinguishing processing employing differences between predicted free space propagation loss curves (estimated values of power) and local maximum values of reception power.

FIG. 23 illustrates overhead object distinguishing processing employing the difference between the predicted free space loss values (estimated power values) and the local maximum values of reception power. The processing in FIG. 23 corresponds to step S107 of FIG. 4.

The representative point extractor 28 first, with a specific cycle, sequentially extracts local maximum points from the reception power as a function of separation distance by the procedure in FIG. 8 (step S701). The determination section 29 then extracts a local maximum value of reception power close to a specific separation distance (for example a separation distance of 150 m). The determination section 29 then computes power values as the estimated attenuated power value $P'_{f\!f,s}$ as values from this local maximum value from which a specific value (for example 6 dB) is subtracted in consideration of the electromagnetic wave reflectance loss (step S702).

The determination section 29 then substitutes the computed estimated attenuated power values $P'_{f\!f,s}$ into Equation (2) to compute RCS σ (step S703). The determination section 29 then substitutes the computed RCS σ into Equation (1) to compute a predicted free space loss value (estimated power value) (step S704). The determination section 29 then computes for each separation distance a difference $\Delta P_{f\!f}(d_z)$ between the local maximum value of reception power and the predicted free space loss value (estimated power value) (step S705).

When the computed difference $\Delta P_{f\!f}(d_z)$ for each of the separation distances is less than 0 successively for a specific number of times or greater (step S706: YES), the determination section 29 determines the object to be an overhead object (step S707). However, when the computed difference $\Delta P_{f\!f}(d_z)$ for each of the separation distances is 0 or greater successively for a specific number of times or greater (step S706: NO) the determination section 29 determines the object to be a forward object (step S707). This completes the processing in FIG. 23.

According to the fifth embodiment, a difference between an extreme value and estimated power value at specific separation distances can be computed. The extreme value is greater than the estimated power value for a forward object, however the extreme value is smaller than the estimated power value for an overhead object. Consequently, robust determination of whether or not an object is an overhead object can be made based on the differences between the extreme values and the estimated power values, without being affected by fluctuations in reception power, such as due to spike noise.

In the fifth embodiment, a difference between an extreme value and estimated power value is computed at specific separation distances during overhead object determination. However, the difference between power received and the estimated power value at specific separation distances may be computed, or the difference between the power at a representative point and the estimated value at specific separation distances may be computed.

Sixth Embodiment

Figure 24A:
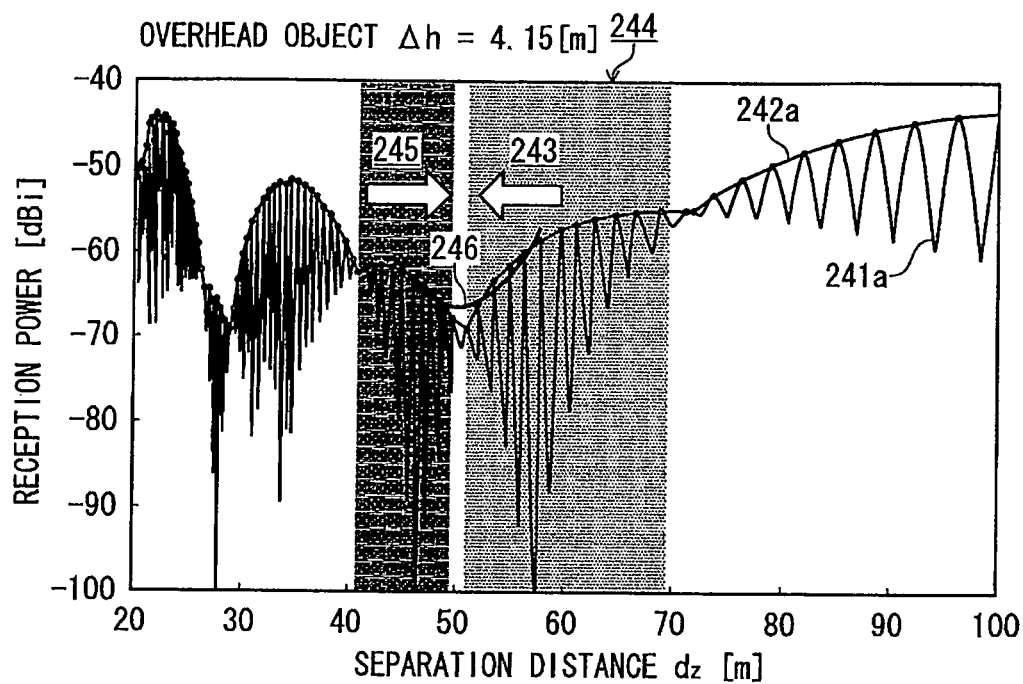
FIG. 24A and FIG. 24B illustrate an overhead object distinguishing method employing a first null point of the direct wave component.
Figure 24B:
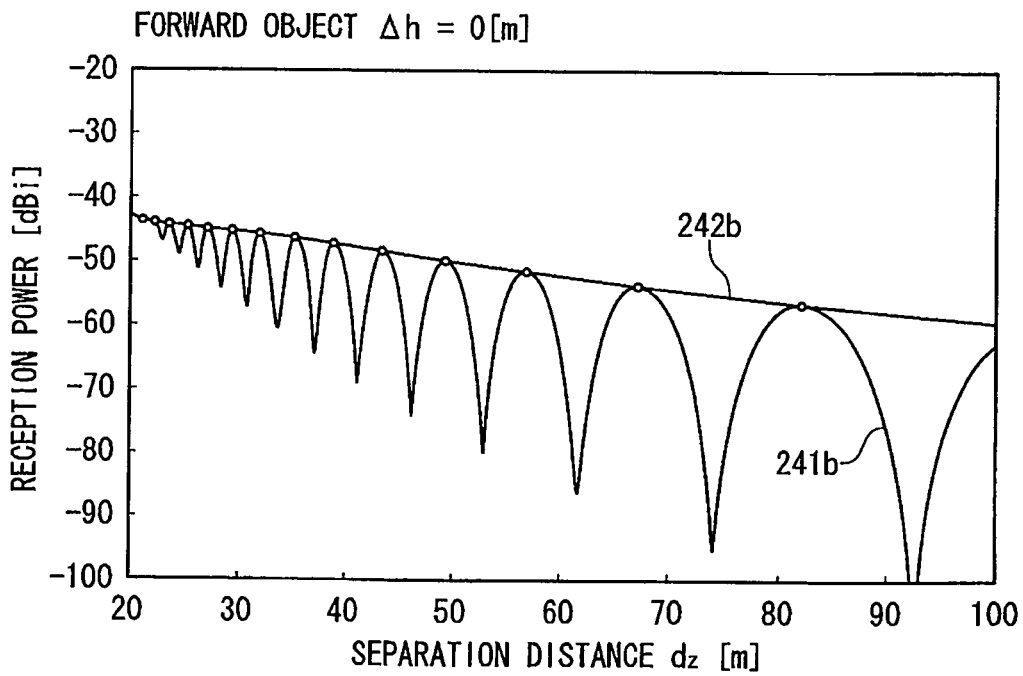

Next, a method for distinguishing an overhead object of a sixth embodiment is described. FIGS. 24A and 24B are graphs to explain a method of overhead object distinguishing employing a first null point of a direct wave component. FIG. 24A illustrates the reception power as a function of separation distance for an overhead object with a height difference Δh of 4.15 m. The reception power local maximum value curve 242a in FIG. 24A is a smooth curve connecting together the local maximum values of the reception power curve 241a.

In a range 243, range 244 and range 245, the path of the reception power local maximum value curve 242a traces out a bowl shape centered on the range 244. This path is formed for the following 3 reasons.

The first reason is that, in the separation distance in the range 243, due to the arrival angle of the direct wave getting greater as the separation distance decreases, attenuation occurs to the main lobe of the antenna sensitivity to direct wave reception in the attenuation of the local maximum values of reception power as the separation distance decreases.

The second reason that the reception power local maximum value curve 242a takes a minimum value in the range 244 is that at this separation distance, the arrival angle of the direct wave corresponds to the elevation angle of the first null point of the antenna, and antenna sensitivity for direct wave reception is hence at its smallest. The third reason that the local maximum values of reception power rises in the range 245 as the separation distance decreases is that, due to the arrival angle of the direct wave increasing as the separation distance decreases, a rise occurs in the antenna sensitivity to direct wave reception in the first side lobe.

A quadratic approximation curve 246 shows a good fit to the path of the reception power local maximum value curve 242a in the range 243, the range 244 and the range 245. Accordingly, within the range 243, the range 244 and the range 245 the reception power local maximum value curve 242a can be approximated with a quadratic approximation curve having a minimum value in the vicinity of the range 244.

FIG. 24B illustrates the reception power against separation distance for a forward object (on-the-optical-axis object) with a height difference Δh of 0 m. In FIG. 24B the reception power local maximum value curve 242b is a smooth curve connecting together the local maximum values of the reception power curve 241b.

In contrast to with an overhead object, the reception power local maximum value curve 242b for the forward object does not trace out a bowl shaped path since there is no change in the antenna directionality and the arrival angle of the direct wave.

Accordingly, the determination section 29 determines the object to be an overhead object when the reception power local maximum value curve traces out a bowl shaped path.

More specifically, the determination section 29 computes reception power local maximum values $P_{max}$ from the reception power.

The determination section 29 then extracts from computed reception power local maximum values $P_{max,\,i}$ (where i is a positive integer count from the furthers separation distance side), and extracts a minimum value $P_{max,\,m}$ observed for the reception power local maximum values $P_{max,\,i}$ in a specific separation distance range (for example a range from a separation distance of 40 m to 60 m).

The determination section 29 then determines the object to be an overhead object when the following Equation (3) and Equation (4) are both satisfied.

$$P_{max,m-s}>P_{max,m-2}>P_{max,m-1}>P_{max,m} \quad (3)$$

$$P_{max,m+s}>P_{max,m+2}>P_{max,m+1}>P_{max,m} \quad (4)$$

However, the determination section 29 determines the object to be a forward object when one or both of the above equations is not satisfied.

The determination section 29 thereby can distinguish an overhead object when a succession of magnitude relationships are satisfied. When the antenna state changes according to height difference Δh is previously known, the determination section 29 estimates the height difference Δh by comparing the observed separation distance at the smallest value $P_{max,\,m}$ of the reception power local maximum values to a theoretical value of the separation distance of the range 244.

Figure 25:
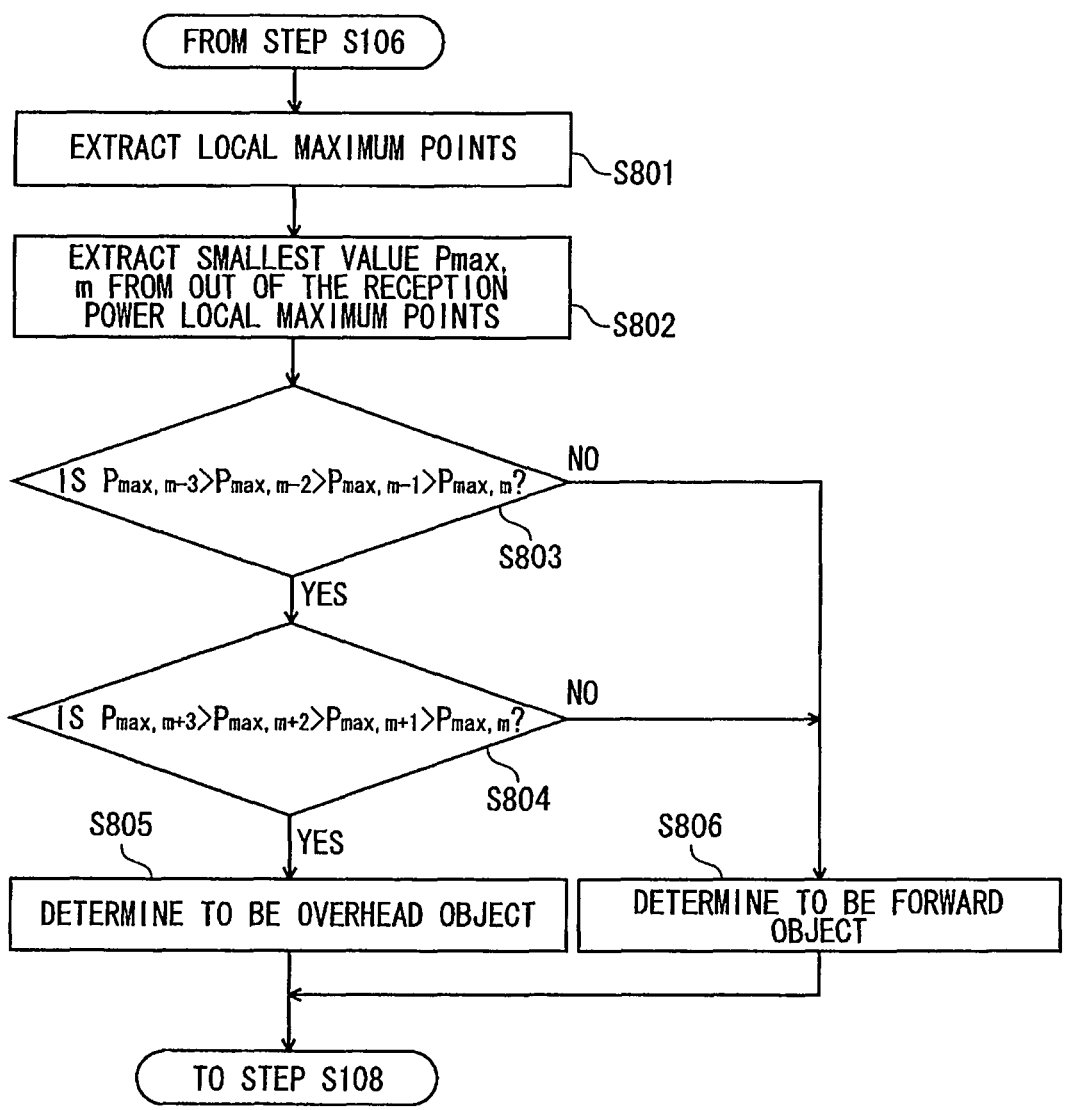
FIG. 25 illustrates overhead object distinguishing processing by distinguishing whether or not there is a local minimum value present in the change of local maximum values of reception power against separation distance.

FIG. 25 illustrates overhead object distinguishing processing by distinguishing whether or not there is a local minimum value present in the change of the local maximum values of reception power against separation distance. The processing in FIG. 25 corresponds to step S107 of FIG. 4.

The representative point extractor 28 first, with a specific cycle, successively computes the local maximum values $P_{max,\,i}$ in the reception power as a function of separation distance according to the procedure in FIG. 8 (step S801). When the separation distance to the object detected by the separation distance detector 24 is closet than the specific separation distance (for example a separation distance of less than 45 m), the determination section 29 extracts the smallest value of $P_{max,\,m}$ from out of the reception power local maximum values $P_{max,\,i}$ (step S802).

The determination section 29 then determines whether or not Equation (3) is satisfied (step S803). When Equation (3) is not satisfied (step S803: NO), the determination section 29 determines the object to be a forward object (step S806). However, when the Equation (3) is satisfied (step S803: YES), the determination section 29 determines whether or not the Equation (4) is satisfied (step S804).

When Equation (4) is not satisfied (step S804: NO), the determination section 29 determines the object to be a forward object (step S806). However, when Equation (4) is satisfied (step S804: YES), the determination section 29 determines the object to be an overhead object (step S805). This completes the processing in FIG. 25.

According to the sixth embodiment, the object can be determined as an overhead object when the path traced by a representative value against separation distance forms a downward facing dip in a predetermined specific separation distance range. In contrast to the function of extreme values against separation distance for a forward object which adopt a shape without a local minimum of the extreme values, for an overhead object the function of extreme values against separation distance adopts a shape having a local minimum value. Consequently, determination as to whether the object is an overhead object can be made based on whether or not there is a minimum value exhibited in the function of extreme value against separation distance.

In the sixth embodiment, an object is determined as an overhead object when the path traced by a representative value against separation distance forms a downward facing dip in a predetermined specific separation distance range. However, an object may be determined as an overhead object when a function of extreme values against separation distance exhibits a local minimum value in a predetermined specific separation distance range.

Seventh Embodiment

Next, a method of distinguishing an overhead object according to a seventh embodiment is described. In, the sixth embodiment, the distinguishing precision when extracting a smallest value from within the local maximum values of reception power may deteriorate due to the two following causes. The first cause is a fluctuation in local maximum values of reception power, such as due to a noise spike. The second cause is missing the acquisition of reception power values due to a low sampling frequency by the radar apparatus. Explanation follows regarding the method for overhead object distinguishing according to the seventh embodiment, improved to address these issues.

The determination section 29 employs several reception power local maximum values $P_{max}$ in the range 243 and the range 245 to compute a quadratic approximation equation centered on the range 244 by a least square method. Such a quadratic approximation can be expressed by the following Equation (5).

$$P_{max}(d_z) = ad_z^2 + bd_z + c \quad (5)$$

wherein: $P_{max}(d_z)$ is a local maximum value of reception power at a separation distance $d_z$, a is a second order coefficient, b is a first order coefficient, and c is a constant. Equation (5) is rearranged into following Equation (6) in order to compute a separation distance $d_{lm}$ where there is local minimum value for the reception power local maximum values $P_{max}(d_z)$.

$$P_{max}(d_z) = a\left(d_z - \frac{-b}{2a}\right)^2 + \frac{4ac - b^2}{4a} \quad (6)$$

Accordingly, the separation distance $d_{lm}$ where the reception power local maximum values Pmax (dz) exhibits a local minimum value is represented by the following Equation (7).

$$d_{lm} = \frac{-b}{2a} \quad (7)$$

The determination section 29 employs Equation (7) to compute the separation distance $d_{lm}$ where there is a local minimum value for the reception power local maximum values $P_{max}(d_z)$. The determination section 29 then determines the object to be an overhead object when the separation distance $d_{lm}$ computed from Equation (7) is in the range from a separation distance of 40 m to a separation distance of 150 m.

According to the seventh embodiment, the above issue relating to possible deterioration of distinguishing precision when computing a smallest value from among the local maximum values of reception power can be solved by approximation to a quadratic function.

More specifically, even when there are fluctuations in the local maximum values of reception power, such as due to spike noise, the relationship of local maximum values of reception power to separation distance can be approximated to a quadratic function. A smallest value within the local maximum values of reception power can thereby be robustly extracted even when there are fluctuations in the local maximum values of reception power, such as due to spike noise.

The function of local maximum values of reception power against separation distance can be approximated to a quadratic function even in cases when acquisition of reception power values is sometimes missed due to low sampling frequency by the radar apparatus. Accordingly, a smallest value from among the local maximum values of reception power can thereby be robustly extracted even when acquisition of reception power values is sometimes missed.

Figure 26:
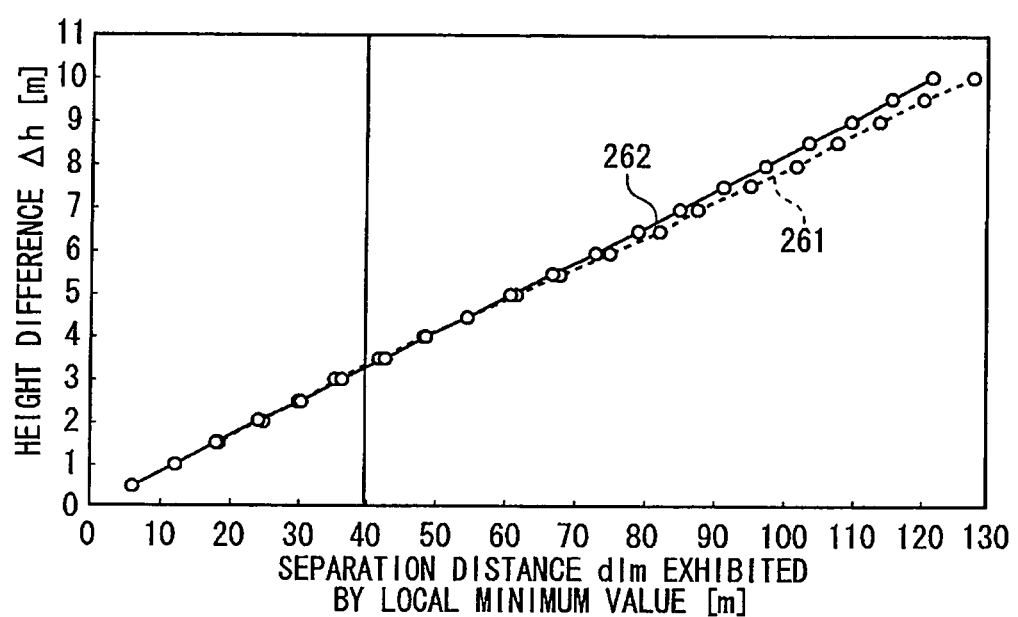
FIG. 26 is a graph for comparing separation distance where a local maximum value is exhibited computed according to a quadratic approximation equation for each height difference $\Delta h$ and a theoretical value of separation distance corresponding to the first null point computed for each height difference $\Delta h$.

FIG. 26 is a graph for comparing the separation distance exhibited by the local minimum value computed by a quadratic approximation equation for each height difference $\Delta h$ and the theoretical value of separation distance corresponding to the first null point computed for each height difference $\Delta h$. In FIG. 26, curve 261 is a smooth curve connecting together the separation distances of the local minimum values computed by the quadratic approximation equation for each of the height differences $\Delta h$. Curve 262 is a smooth curve connecting together the theoretical values of separation distance corresponding to the first null point.

In FIG. 26, the height difference $\Delta h$ of the curve 262 changes linearly with respect to the theoretical value of separation distance corresponding to the first null point. There is a good fit of the curve 261 to the curve 262. Consequently, by employing the relationship between the theoretical value of separation distance corresponding to the first null point and the height difference $\Delta h$, the height difference $\Delta h$ can be estimated from the separation distance of a local minimum value computed by a quadratic approximation equation.

FIG. 27 illustrates a table of associated theoretical values of separation distance corresponding to the first null point and height differences $\Delta h$. Table 270 in FIG. 27 shows a one-to-one association of theoretical values of separation distance corresponding to the first null point and height differences $\Delta h$.

The memory 21 stores the table 270 with separation distances $d_{lm}$ exhibited by the local minimum values and height differences $\Delta h$.

The determination section 29 accordingly extracts from the table 270 stored in the memory 21 the height difference $\Delta h$ corresponding to the local minimum value computed by the quadratic approximation equation. The determination section 29 can thereby estimate the height difference $\Delta h$ of the object.

Figure 28:
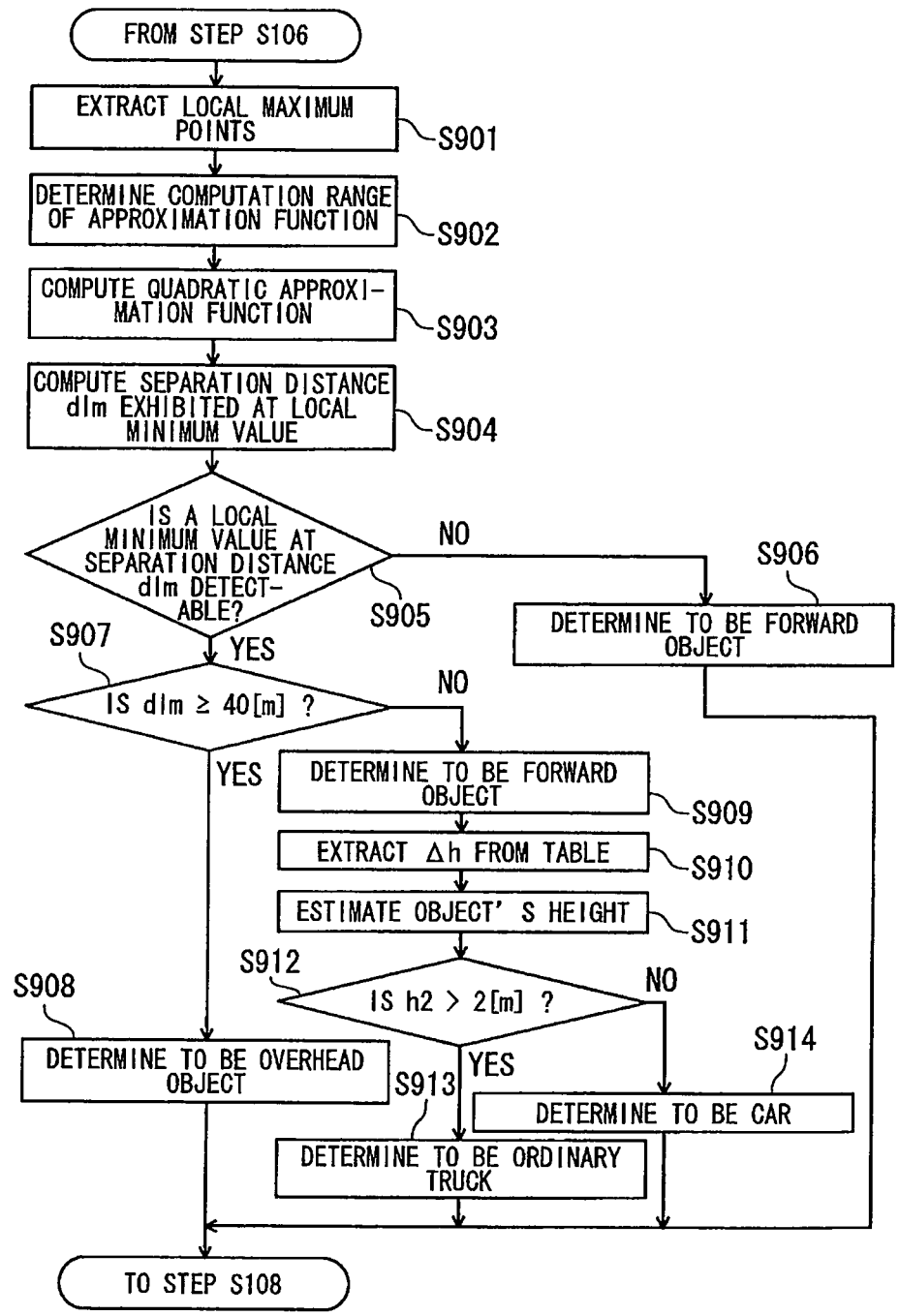
FIG. 28 illustrates overhead object distinguishing processing employing the separation distance exhibited at the location of a local minimum value computed according to a quadratic approximation equation.

FIG. 28 illustrates overhead object distinguishing processing employing the separation distance exhibited by a local minimum value computed by a quadratic approximation equation. The processing in FIG. 28 corresponds to step S107 of FIG. 4.

The representative point extractor 28 first, with a specific cycle, sequentially extracts reception power local maximum values $P_{max, i}$ from the reception power as a function of separation distance by the procedure in FIG. 8 (step S901). When the separation distance to the object detected by the separation distance detector 24 is closer than a specific separation distance (for example when closer than a separation distance of 45 m), the determination section 29 determines a separation distance range from the curve of local maximum values of reception power against separation distance for computing a quadratic approximation function (step S902).

The determination section 29 then computes a quadratic approximation function of local maximum values power values against separation distance using a least square method over the computed separation distance range (step S903). The determination section 29 then uses Equation (7) to compute the separation distance $d_{lm}$ exhibited by a local minimum value from the computed quadratic approximation function (step S904).

When the determination section 29 cannot detect a separation distance $d_{lm}$ exhibited by a local minimum value (step S905: NO), the determination section 29 determines the object to be a forward object (step S906).

However, when the determination section 29 can detect a separation distance $d_{lm}$ exhibited by a local minimum value (step S905: YES), the determination section 29 compares the separation distance $d_{lm}$ exhibited by the local minimum value to a separation distance 40 m (step S907).

When the separation distance $d_{lm}$ exhibited by the local minimum value is 40 m or greater (step S907: YES), the determination section 29 determines the object to be an overhead object since the height difference $\Delta h$ from the table 270 is 3.5 m or greater (step S908).

However, when the separation distance $d_{lm}$ exhibited by the local minimum value is less than 40 m (step S907: NO), since the height difference $\Delta h$ read from the table 270 is less than 3.5 m, the determination section 29 determines the object to be a forward object (step S909).

The determination section 29 extracts the height difference $\Delta h$ corresponding to the separation distance $d_{lm}$ exhibited by the local minimum value from the table 270 stored in the memory 21 (step S910). The determination section 29 adds the radar apparatus optical axis height h1 to the computed height difference $\Delta h$ to compute an estimated value of height h2 of the object (step S911).

When the estimated value of the height h2 of the object is greater than 2 m (step S912: YES), the determination section 29 determines the object to be an ordinary truck (step S913). However, when the estimated value of the height h2 of the object is 2 m or less (step S912: NO), the determination section 29 determines the object to be a car (step S914). This completes the processing in FIG. 28.

In the embodiment, the height difference is extracted from the table 270 and the object's height is estimated, when the object is determined to be a forward object (on-the-optical-axis object). However, height difference may be extracted from the table 270 and the object's height may be estimated, when the object is determined to be an overhead object.

Determination may be made as to whether or not the vehicle itself will collide with the object, after an object is determined to be an overhead object at step S908. For example, the determination section 29 may estimate the object's height with a similar method to that of step 910 and step 911, and then reads out the vehicle's height from the memory 21. When the read-out vehicle's height reaches the thus-computed object's height, the determination section 29 performs control to issue a warning from a speaker (not shown).

The determination section 29 can thereby notify the driver of the vehicle in advance of an impending collision between the object and the vehicle mounted with the radar apparatus.

In the seventh embodiment the height difference $\Delta h$ is extracted from the table 270 stored in the memory 21. However, the height difference $\Delta h$ may be computed by the following method.

The memory 21 pre-stores a table associating elevation angles $\theta$ of the first null point, from the elevation angle pattern in antenna sensitivity, with separation distances $d_{lm}$ exhibited by a local minimum value. The determination section 29 extracts the first null elevation angle $\theta$ corresponding to the separation distance $d_{lm}$ exhibited by a local minimum value from this table stored in the memory 21. The determination section 29 then computes the height difference $\Delta h$ by multiplying the separation distance $d_{lm}$ exhibited by the local minimum value with $\tan \theta$.

According to the seventh embodiment, local maximum values as a function of separation distance in the specific separation distance range are approximated with a quadratic function, and the separation distance exhibited by a local minimum value of the quadratic function is computed, such that determination can be made as to whether or not the object is an overhead object on the basis of this separation distance. Accordingly, robust determination can be made of whether or not an object is an overhead object, without being affected by fluctuations in reception power, such as due to spike noise, or being affected by missing acquisition of reception power values due to low sampling frequency by the radar apparatus.

Since the difference in height corresponding to the separation distance exhibited by a local minimum value can be extracted from the memory, this height difference can be employed for computing the object's height. Accordingly, when the object is an overhead object, determination can be made as to whether or not the vehicle itself will impact the object by comparing the object's height with the vehicle's height. The driver of the vehicle itself can thereby be notified in advance of the danger of an impending collision between the object and the vehicle to which the radar apparatus is installed. In cases when the object is not an overhead object, the object's vehicle type can be estimated from the thus-computed object's height.

In the seventh embodiment, the powers at specific separation distances of plural representative points against separation distance are approximated to a quadratic function, the separation distance exhibited by the local minimum value of the quadratic function is computed, and determination is made as to whether or not the object is an overhead object based on the separation distance exhibited by the local minimum value. However, the object may be determined to be an overhead object when the separation distance exhibited by the local minimum value of the quadratic function is computed and the separation distance exhibited by the measured local minimum value is the nearest local maximum value within a range of specific separation distances.

The object may be determined to be the overhead object when the curve connecting in sequence plural representative points in a specific range of separation distance has a local minimum value.

The determination section 29 can determine whether or not the object is an overhead object by employing the methods described above in the first embodiment to the seventh embodiment. Determination of an overhead object may also be made when the conditions of 2 or more of the methods in the first embodiment to the seventh embodiment are satisfied.

For example, an object may be determined to be an overhead object when both the number of local maximum values on the reception power curve against separation distance exceeds the specific threshold value, as illustrated in the first embodiment, and also the coefficient of the first order approximation equation of local maximum values of the reception power curve against separation distance is greater than 0, as illustrated in the second embodiment.

Increased precision in determination as to whether or not the object is an overhead object can thereby be achieved.

In the above embodiments, the reception power calculator 22 computes the reception power as a function with respect to the detected separation distance. However, the reception power calculator 22 may compute the power of received electromagnetic waves as a function with respect to time, or the power of received electromagnetic waves may be computed as a function of number of times acquired when electromagnetic waves are acquired at specific time intervals or separation distance intervals.

For example, if the object is stationary, the separation distance between the radar and the object diminishes with the passage of time. Accordingly, the determination section 29 can determine whether or not the object is an overhead object even in cases where the reception power is expressed as a function of time.

The ADC (reception wave acquisition section) 7 may count the number of times an electromagnetic wave is received at specific time intervals (number of samples), and the reception power calculator 22 computes the power of the electromagnetic wave received as a function of this number of times.

In the above embodiments, the ADC (reception wave acquisition section) 7 converts the mixed reception wave into a digital signal at a specific sampling frequency. However, another reception wave acquisition section may acquire the electromagnetic wave received with a reception antenna at a specific time interval. In such cases, the reception power calculator 22 may compute the reception power of the received electromagnetic waves as a function of acquisition number of times.

In the above embodiment, the local maximum values appearing on the curve representing changes in reception power against separation distance are employed. Configuration may be made employing local minimum values appearing on the curve representing changes in reception power against separation distance. The reception power curve before and after local minimum values changes more steeply with respect to separation distance than the reception power curve before and after local maximum values, so the separation distance at the extreme values in reception power can be computed more accurately when local minimum values are employed than when local maximum values are employed.

While an electronic scanning radar apparatus is exemplified in the above embodiments, a mechanically operated radar apparatus can be used. When a mechanical operated radar apparatus is used, the change in reception power with respect to separation distance is equivalent to the change in reception power with respect to separation distance when an electronic scanning radar apparatus is used.

The function of the signal processor 20 in the above embodiments may be realized by a computer, wholly or partially. A computer program for realizing such functionality may be stored on a computer readable storage medium, and the stored computer program may be read into a computer system and executed. In this specification, a "computer system" includes Operating System (OS) and hardware of peripheral equipment, a "computer readable storage medium" includes portable storage media such as a flexible disk, magneto-optic disk, optical disk and a memory card, as well as a storage device such as a hard disk installed in a computer system, and "computer readable storage medium" includes media that hold programs dynamically for a short period of time, such as communication lines when a program is transmitted via a communication line (telecommunication line) or a network (the Internet). In such cases programs may be held for a given period of time, such as in volatile memory in a computer system formed from a server and client. The above computer programs may realize a portion of the above functionality, and such functionality may be realized by combination with a computer program pre-stored on the computer system.

Eighth Embodiment

Figure 29:
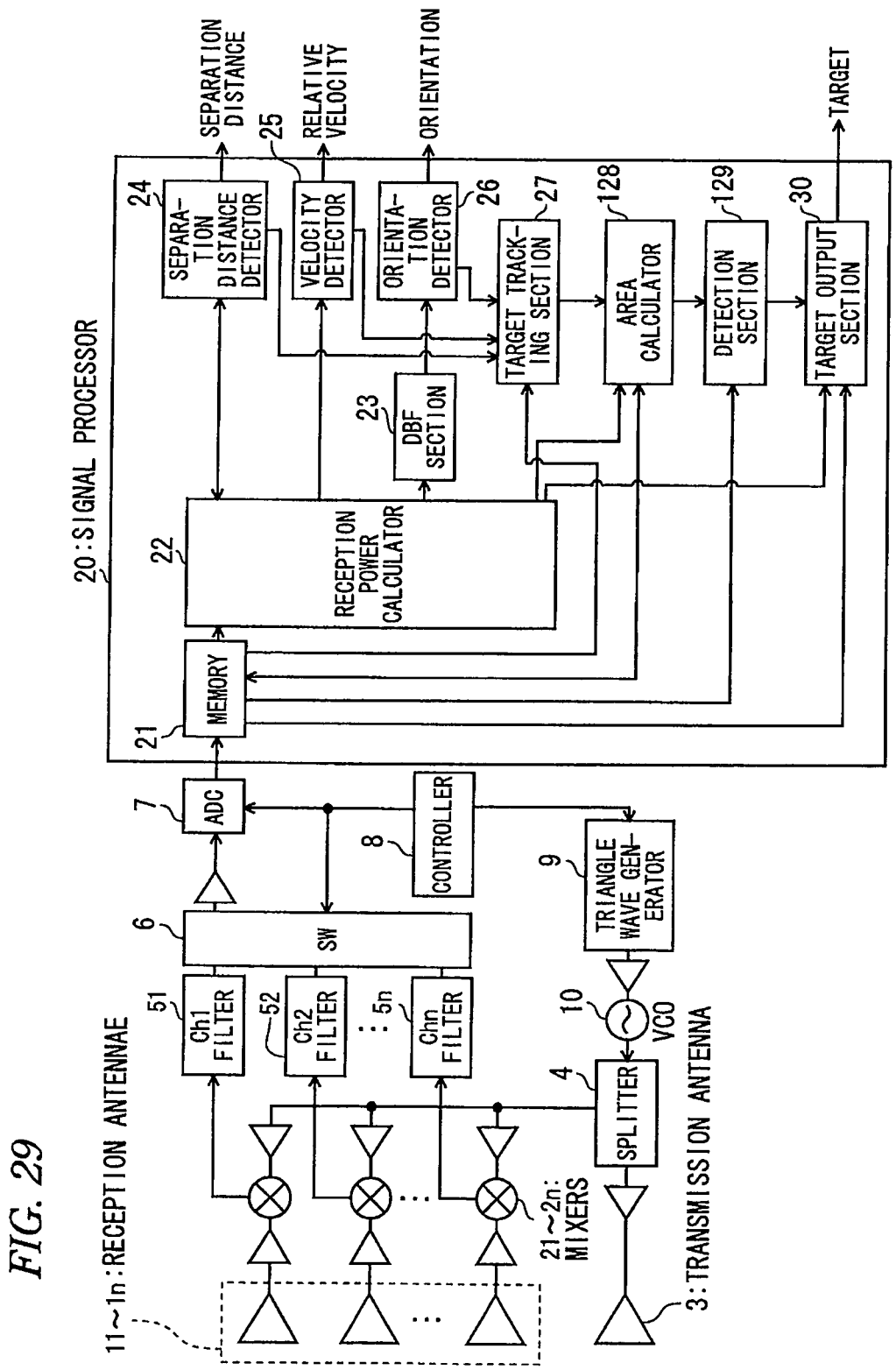
FIG. 29 illustrates a functional configuration of an electronic scanning radar apparatus according to an eighth embodiment.

Next, an electronic scanning radar apparatus (FMCW milliwave radar) according to an eight embodiment is described, with reference to the drawings. FIG. 29 illustrates a functional configuration of the electronic scanning radar apparatus according to the embodiment. The substantially same portions as those of the above embodiments are designated by the same reference numerals, and an explanation thereof will be omitted.

As shown in FIG. 29, an electronic scanning radar apparatus according to the eighth embodiment is different from the electronic scanning radar apparatus according to the first to seventh embodiments in the configuration of the signal processor 20.

In the eighth embodiment, the signal processor 20 includes an area calculator 128 and a detection section 129 instead of the representative point extractor 28 and the determination section 29

Next, an operation of the electronic scanning radar apparatus of the eighth embodiment is described, with reference to FIG. 29.

Operations related to the area calculator 128 and the detection section 129 are mainly described.

In the eighth embodiment, as in the first to seventh embodiment, the reception power computation section 22 determines whether there is an object present by detecting whether or not there is a signal level, from out of the signal levels for each of the beat frequencies, that exceeds a predetermined threshold value.

When a qualifying signal level peak is detected, the reception power computation section 22 outputs the beat frequencies of the peak value (both for the up-shifting portions and the down-shifting portions of the beat signal) as an object frequency to the separation distance detector 24 and the velocity detector 25. The reception power computation section 22 outputs the frequency modulation width $\Delta f$ to the separation distance detector 24, and the central frequency $f_0$ to the velocity detector 25.

The reception power calculator 22 also computes the square of the peak value of the signal level for the down-shifting portions as the reception power.

Then, the reception power calculator 22 outputs the reception power to the area calculator 128 as a function of the separation distance to the object that is input from the separation distance detector 24.

When a qualifying peak in the signal level is not detected, the reception power calculator 22 outputs data to the target output section 30 indicating that there are no target candidates.

In the eighth embodiment, the target tracking section 27 determines whether the object detected 1 cycle previously and the object detected this time are the same object or not, as in the first to seventh embodiments When it is determined that the object detected 1 cycle previously and the object detected this time are the same object, the target tracking section 27 increments the number of times of target tracking processing for the object read from the memory 21 by 1. When this is not the case, the target tracking section 27 interprets this as detection of a new object. The target tracking section 27 also stores the separation distance, relative velocity and orientation of object this time and the number of times of target tracking processing for this object in the memory 21. The target tracking section 27 outputs an identification number for the object to the detection section 129.

The area calculator 128 acquires the power of the received electromagnetic wave from the reception power calculator 22 as a function of detected separation distance.

The area calculator 128 computes the area in a specific separation distance segment of a region defined within boundaries of a curve representing this function and a straight line determined based on the average value of the power of the received electromagnetic waves.

The area calculator 128 adds this area to the sum of area computed up till now, and after adding saves the sum of the area in the memory 21.

The detection section 129 reads the sum of the area after addition from the memory 21, and uses a low height object distinguishing algorithm, described later, to distinguish whether or not the object is a normal object with accompanying danger of collision, or a low height object not expected to impede travel. The detection section 129 outputs the determination result to the target output section 30. Accordingly, speed can be reduced to avoid collision and/or a warning can be issued to the driver when the object is a normal object with accompanying danger of collision.

When the object is a normal object, the target output section 30 outputs an identification number for this object as a target. When the target output section 30 has acquired the distinguishing results of plural objects from the detection section 129 and all of them are normal objects, the target output section 30 then outputs the identification number of an object in the path of the vehicle as the target.

When the target output section 30 has acquired the determination results of plural objects, all of them are normal objects and two or more of the objects are in the path of the vehicle, the target output section 30 outputs as a target the identification number of the object read from the memory 21 having the highest number of times of target tracking processing. However, when the object is a low height object, or when data is input from the reception power calculator 22 indicating that there are no target candidates, the target output section 30 outputs data indicating no targets.

Simulation Results of Radar Detection of Low Height Objects

Figure 30:
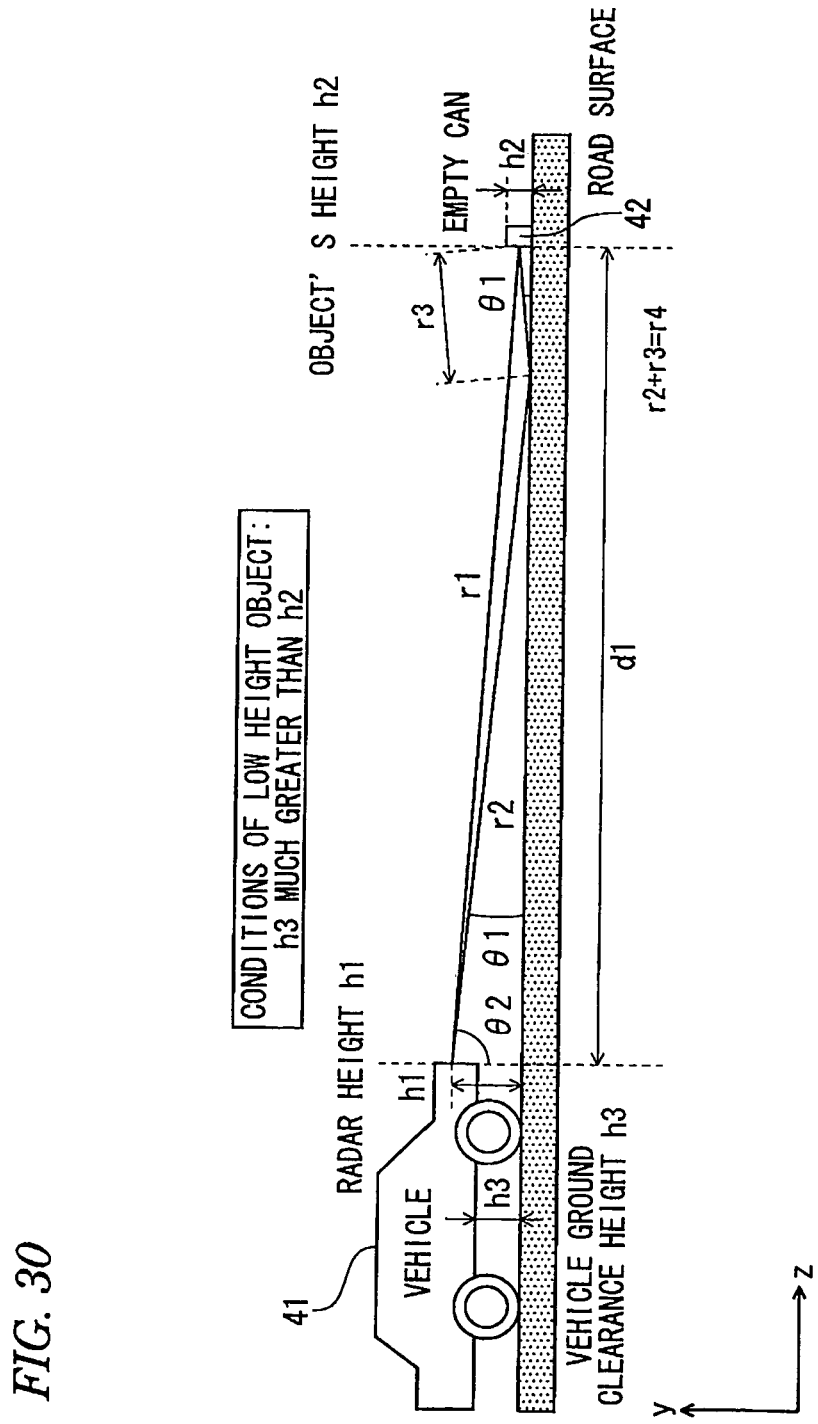
FIG. 30 illustrates a traveling condition model in which there is an empty can present in front of a vehicle.

Prior to explaining the simulation results of radar detection of low height objects explanation will first, be given regarding the simulation conditions. FIG. 30 is a model of traveling conditions in which an empty can 42 is envisaged to be present on a yz-plane directly in front of a vehicle 41. d1 is the direct separation distance from the vehicle 41 of the empty can 42, an example of a low height object, r1 is the direct wave propagation path of an electromagnetic wave to the object, and r2 and r3 form an indirect wave propagation path of an electromagnetic wave to the object. h1 is the height of the vehicle mounted radar, h2 is the height of the empty can, and h3 is the vehicle ground clearance height.

Figure 31:
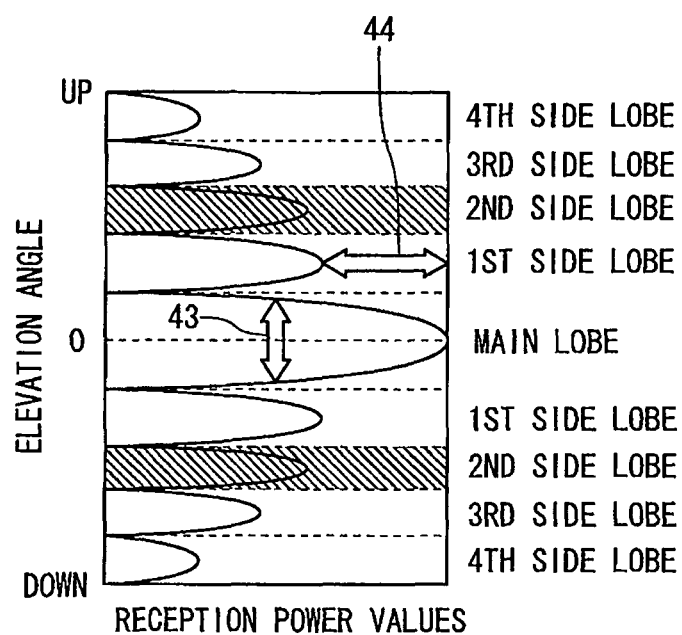
FIG. 31 illustrates a relationship between radar reception power and elevation angle.

As shown in FIG. 31, with respect to the antenna characteristics, the half power beam width 43 is set at 4 degrees, and the level of the side lobe reception power relative to the main lobe reception power (referred to below as the side lobe level) 44 is set at −45 dB.

Next, the simulation conditions when a normal object with accompanying danger of vehicle collision is present in front of a vehicle is described. The simulation conditions are as set out below. The vehicle mounted radar of FIG. 30 employs milliwave band electromagnetic waves and the radar installation height h1 is set at 0.55 m. Since the propagating waves of the radar have high straight-line performance the reflecting surface height h2 of the object is set at 0.55 m, the same height as radar installation height h1. The Radar Cross Section (RCS) is set at 0 dB.

Figure 32A:
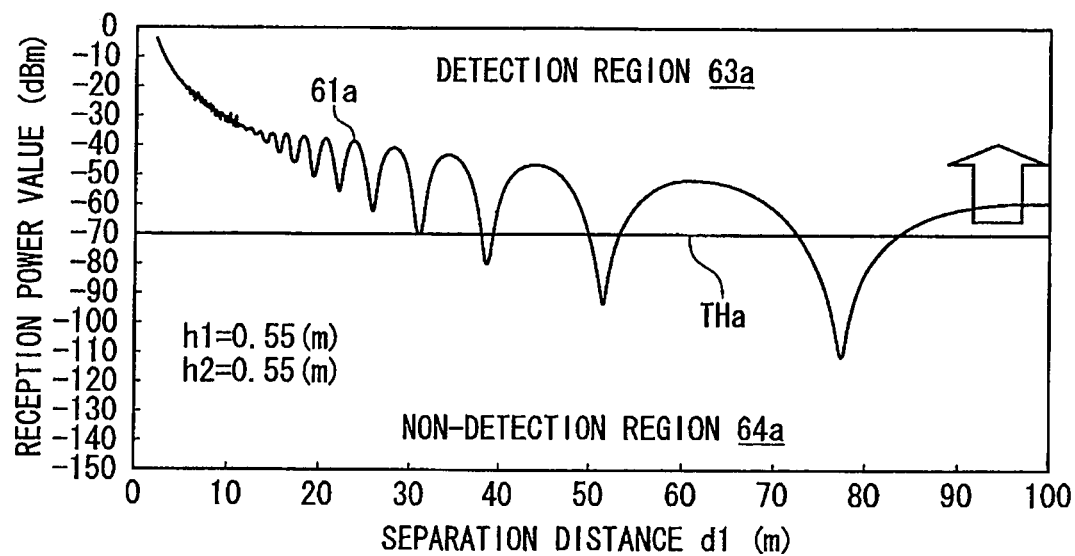
FIG. 32A illustrates separation distance characteristics of reception power for a normal object.

FIG. 32A illustrates a simulation result showing the characteristics of radar reception power with separation distance when there is a normal object with accompanying danger of vehicle collision present in front of the vehicle. The horizontal axis represents the direct separation distance d1 between the vehicle and the object, as shown in FIG. 30, and the vertical axis shows the reception power, calculated so as to be 0 dBm when the reception power is 1 mW.

The detection threshold value THa is −70 dBm, and while the radar can detect reception waves in the region of the detection threshold value THa and above (detection region 63*a*), the radar cannot detect reception waves in the region below the detection threshold value THa (the non-detection region 64*a*). For a normal object a reception power curve 61*a* changes steeply according to the direct separation distance d1.

Next, simulation conditions when there is a low height object with no danger of vehicle collision present in front of the vehicle is described. The simulation conditions are as set out below. The vehicle mounted radar of FIG. 30 employs milliwave band electromagnetic waves and the radar installation height h1 is set at 0.55 m. The reflecting surface height h2 of the object from the road surface is set at 0.1 m. Envisaging an object such as an empty can, the RCS is set at −10 dB, a value sufficiently smaller than was the case in FIG. 32A.

Figure 32B:
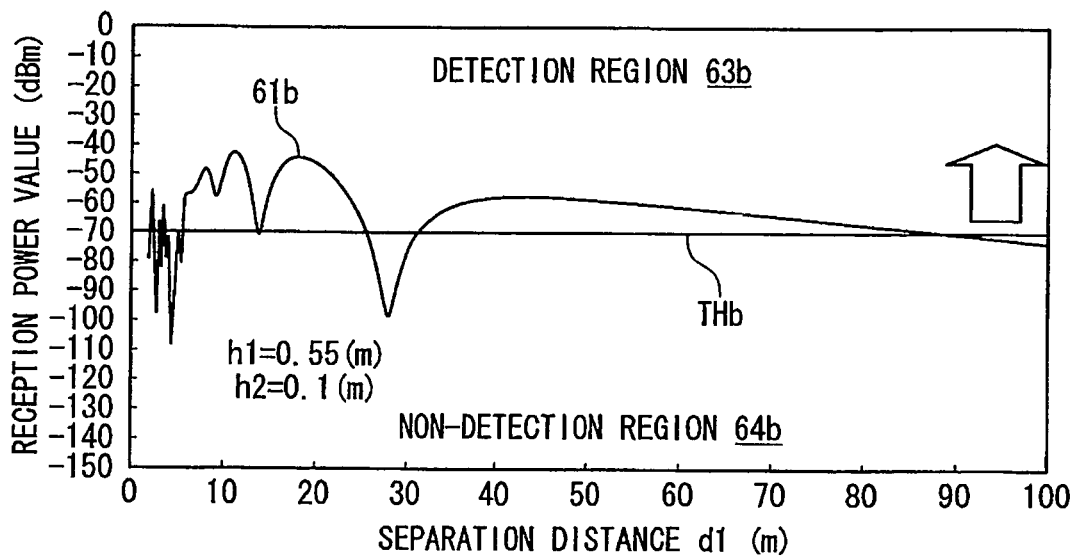
FIG. 32B illustrates separation distance characteristics of reception power for a low height object.

FIG. 32B illustrates a simulation result showing the characteristics of radar reception power with separation distance when there is a low height object with no danger of vehicle collision in front of the vehicle. The horizontal axis represents the direct separation distance d1 between the vehicle and the object, as shown in FIG. 30, and the vertical axis shows the reception power, calculated so as to be 0 dBm when the reception power is 1 mW.

The detection threshold value THb is −70 dBm, and while the radar can detect reception waves in the region of the detection threshold value THb and above (detection region 63*b*), the radar cannot detect reception waves in the region below the detection threshold value THb (non-detection region 64*b*). For a low height object, a reception power curve 61*b* shows less movement according to the direct separation distance d1 than for the case of the reception power curve 61*a* for the normal object.

It can be seen from the results of FIG. 32A and FIG. 32B that if all objects exceeding the threshold value are classified as collision danger objects then at a direct separation distance d1 of 90 m or less, the radar would identify both the above types of object as being objects with danger of collision, with the result that impact reduction control would be implemented when not actually required. Accordingly, in order not to perform impact reduction control when not actually required, the detection section 129 employs an algorithm, explained below, to distinguish between low height objects not expected to impede travel and normal object with accompanying danger of collision.

Principles of Low Height Object Distinguishing Algorithm

Next, the principles of the low height object distinguishing algorithm of the area calculator 128 and the detection section 129 is described.

As shown in FIG. 30, the electromagnetic waves emitted from the radar arrive at a reflection point, this being the object, via two routes, a direct wave propagation path r1 and an indirect wave propagation path (the combined paths of r2 and r3, abbreviated to r4 below). The electromagnetic waves from the two paths combine at this point. The combined wave is then re-emitted back from the reflection point, propagating on the same path r1 and path r4, and recombining at the vehicle mounted radar.

Due to combination of the two propagating waves from the different paths, "reinforcing locations" and "canceling out locations" occur in the reception power, with these changing according to the direct separation distance d1 between the radar and the object. With such a phenomenon, the height h1 of the radar and the height h2 of the object, as shown in the FIG. 30, become the main determinants of the number of the reinforcing locations and canceling out locations occurring (referred to below as number of occurrences).

More specifically, at the arrival point a phase difference between the direct wave and the indirect wave is observed to occur due to the difference in length of the indirect wave propagating path r4 with respect to the direct wave propagating path r1. The "reinforcing locations" and the "canceling out locations" occur in the reception power characteristics due to the two waves with such a phase difference being combined.

As the separation distance d1 changes, the amount of change in the path difference between the direct wave and the indirect wave is greater for the normal object than for the low height object.

The greater the change in the path difference $\Delta r$ (wherein $\Delta r = r4 - r1$) according to the separation distance d1, the greater the phase difference changes, and hence this results in the amount of change in the phase difference between the direct wave and the indirect wave when the separation distance d1 changes being greater for the normal object than for the low height object.

The greater the number of occurrences of reinforcing and canceling out locations in a given interval along the separation distance, the smaller the resulting separation distance between adjacent reinforcing and canceling out locations (referred to below as bandwidth).

Figure 33A:
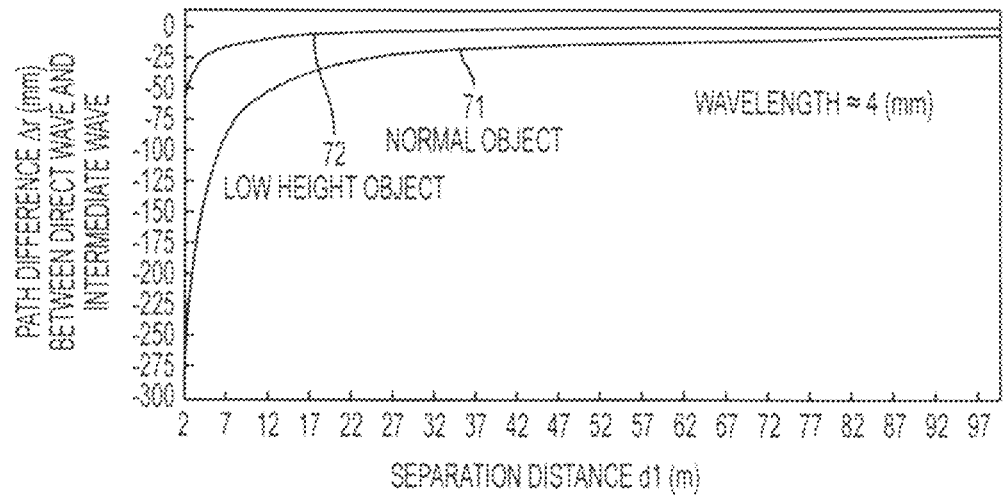
FIG. 33A illustrates separation distance characteristics of path differences between a direct path and an indirect path.
Figure 33B:
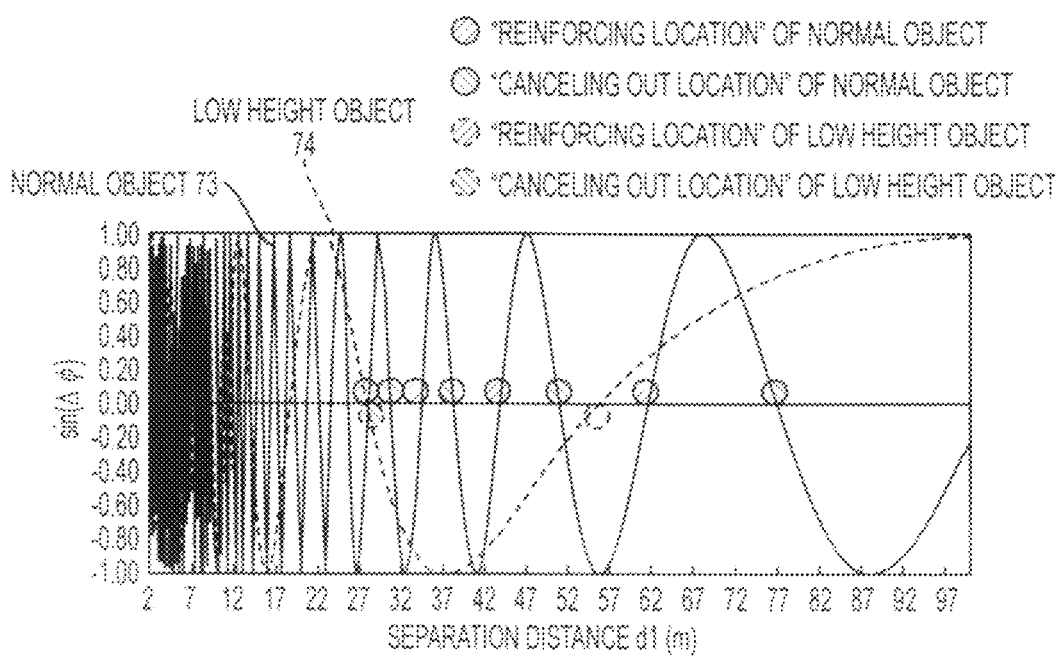
FIG. 33B illustrates separation distance characteristics of sine values of phase difference.

In order to illustrate a specific example of the number of occurrences of the "reinforcing locations" and the "canceling out locations" and bandwidth, FIGS. 33A and 33B illustrate graphs for comparing between the propagation path difference $\Delta r$ and phase difference $\Delta\phi$ for a "normal object" and a "low height object", under the same conditions as FIGS. 32A and 32B. In FIG. 33A the magnitude of $\Delta r$ is much greater for the "normal object" than for the "low height object". The amount of change of the phase difference $\Delta\phi$ is naturally also much greater for the "normal object" that for the "low height object".

Consequently, as shown in FIG. 33B, the resulting amount of change of sin $(\Delta\phi)$ as the separation distance changes is much greater for the "normal object" than for the "low height object". The number of occurrences of the "reinforcing locations" and the "canceling out locations" are determined by the amount of change of $\Delta r$ as the separation distance changes, namely the amount of change of the phase difference $\Delta\phi$ as the separation distance changes.

In particular, d1 for the range in which a vehicle mounted radar is mainly used is from about 30 m up to a maximum value for d1 of a hundred or several tens of meters. Over such a range "reinforcing locations" and "canceling out locations" occur a number of times when a normal object is hit, with a bandwidth of several meters to several tens of meters. However, for a low height object, "reinforcing locations" and "canceling out locations" only occur once each, with a bandwidth of several tens of meters to several hundreds of meters. It can be seen that there are significant differences in the above. The operation principle of the low height object distinguishing algorithm of the present invention utilizes such differences between number of occurrences and bandwidths for distinguishing.

Low Height Object Distinguishing Algorithm

Next, the low height object distinguishing algorithm is described. For distinguishing between a normal object and a low height object, the area of a region defined by boundaries of the reception power curve and a straight line at a value on the vertical axis of the segment average of the reception power are employed.

Figure 34:
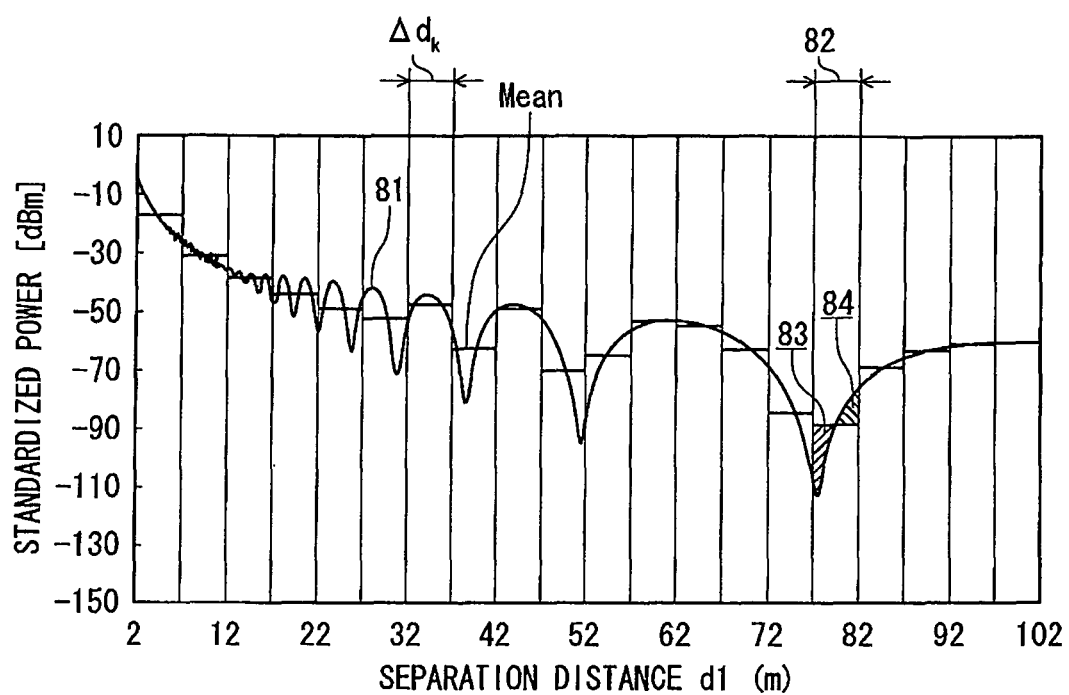
FIG. 34 illustrates a standardized value of the reception power for a given segment when detecting for a low height object.

First, as shown in FIG. 34, the area calculator 128 divides the separation distance d1 between the radar and the object into arbitrary number of N individual segments $(\Delta d_1, \ldots, \Delta d_N)$. For example, the area calculator 128 could divide into segments at intervals of separation distance 5 m.

The area calculator 128 then computes in each of these segments the area of the region defined by boundaries of the reception power curve 81 and the straight line at a value on the vertical axis of the segment average of the reception power. Specifically, for example, in the section 82 the area calculator 128 computes the sum of the areas of the region 83 and the region 84.

As shown in FIG. 34, the area calculator 128 computes the average power Mean in each of the sections, and then computes a power value (referred to below as standardized power) of the reception power for each of the sections from which the average power has been subtracted. For example, with reception power P $(\Delta d_{k,i})$ (where i takes integer values from 1 to n) at n points in a segment $\Delta d_k$ (where k takes integer values from 1 to N), the standardized power p $(\Delta d_{k,i})$ in dB is given by subtraction in decibel notation (and by division for linear values), as shown in the following Equation (8).

$$p(\Delta d_{k,i}) = P(\Delta d_{k,i}) - \left(\frac{\sum_{i=1}^{n} P(\Delta d_{k,i})}{n}\right) \quad (8)$$

Figure 35:
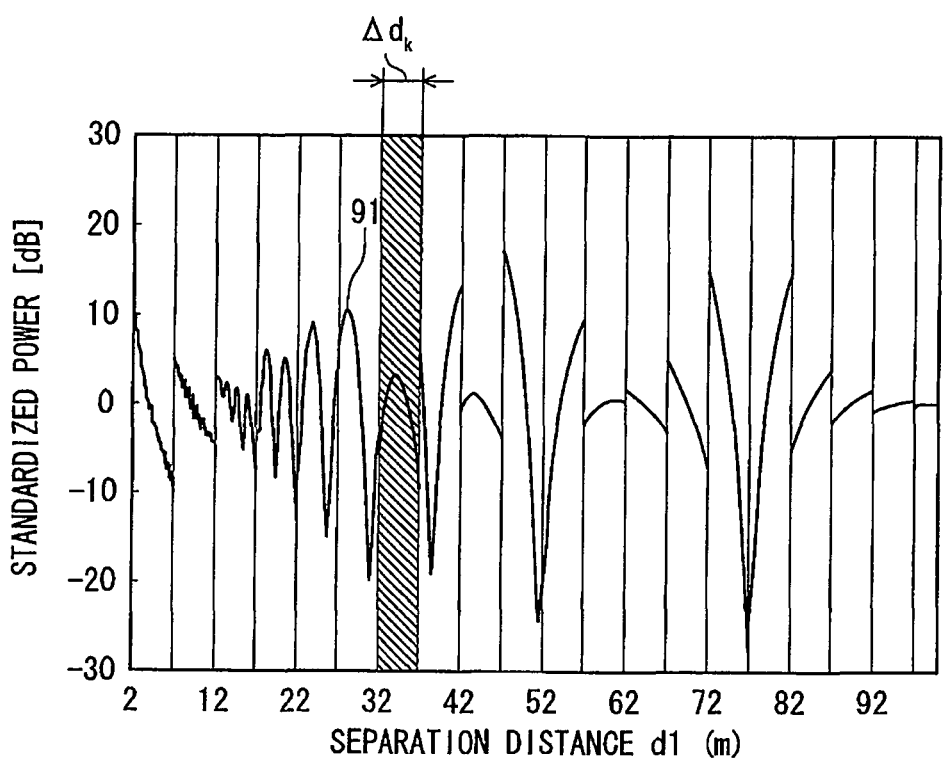
FIG. 35 illustrates separation distance characteristics of standardized power.
Figure 36A:
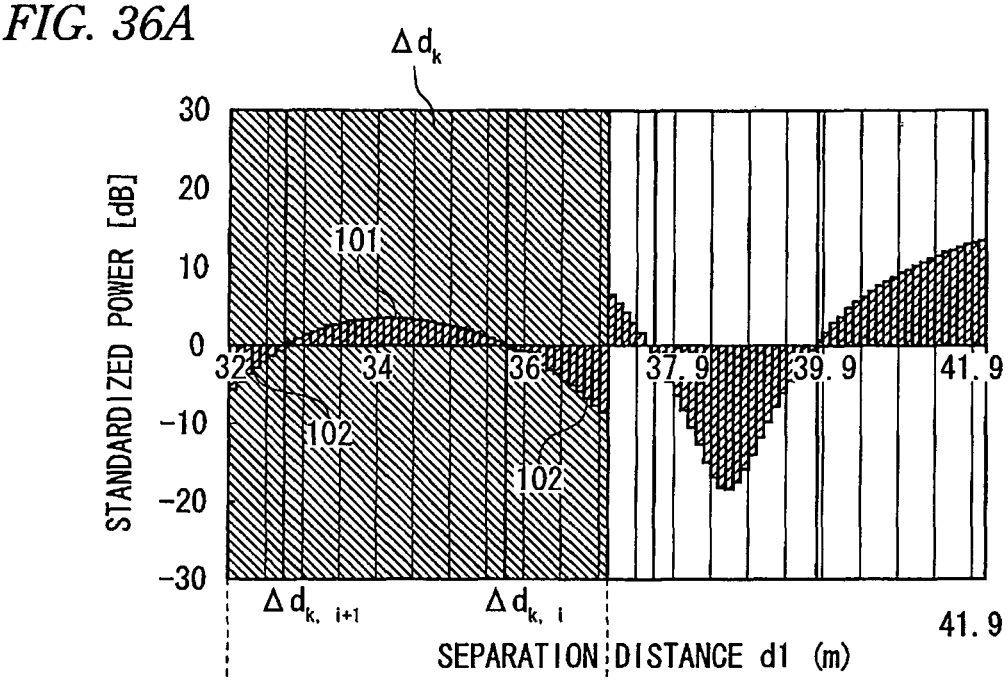
FIGS. 36A and 36B illustrate deriving closed sections and computing the area of closed sections.

FIG. 35 shows the characteristics of the standardized power with separation distance. As can be seen from FIG. 35, the standardized power curve 91 intersects the 0 dB line. In FIG. 36A, focusing on the segment $\Delta d_k$, there is a positive region 101 and negative regions 102 for the standardized power.

Figure 36B:
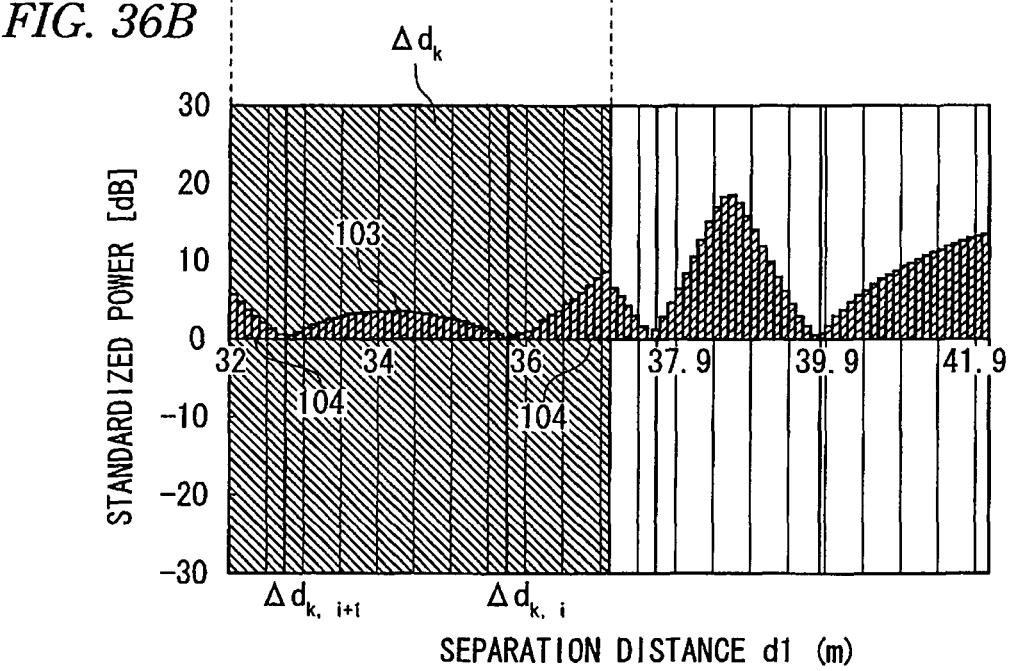

As shown in FIG. 36B, the area calculator 128 computes the absolute value of the standardized power |p ($\Delta d_{k,i}$)|, and determines closed sections (the shaded regions in FIG. 36B, for example regions 103 and 104) for the absolute value of the standardized power in order to execute integration within a segment.

Figure 37:
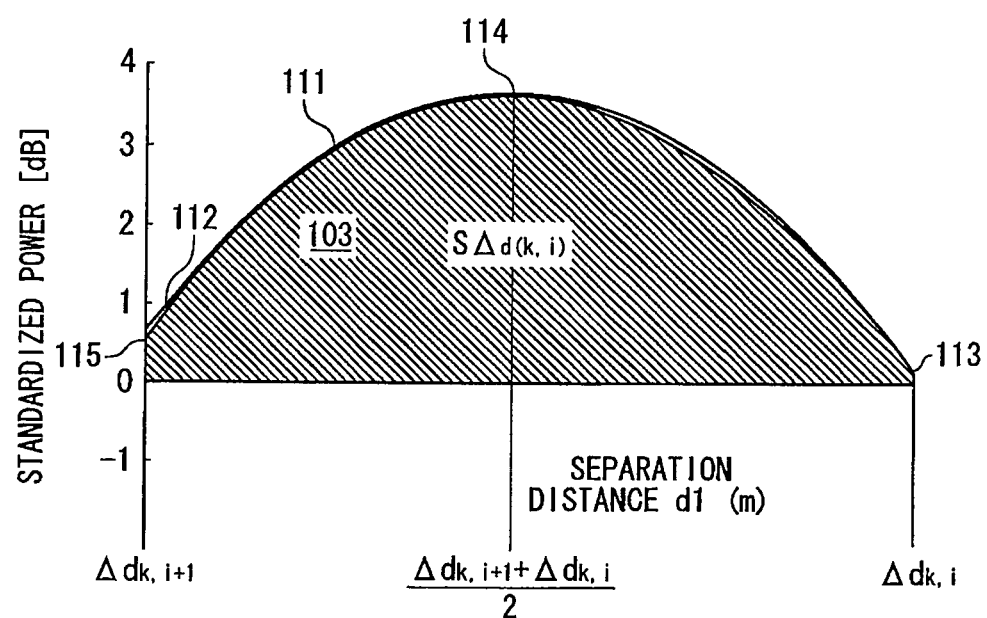
FIG. 37 illustrates an example of computing the area of a closed section.

FIG. 37 is an expanded diagram of region 103 of FIG. 30B. The absolute value 111 of the standardized power can be closely approximated to quadratic function 112. The area calculator 128 employs Simpson's rule to compute an approximate area for the region 103 of FIG. 37.

Specifically, by applying Simpson's rule, an approximation for the area $s_{\Delta d\ (k,\ i)}$ of the region 103 can be made by employing the standardized power p (d1) at the respective separation distances d1 at each of: the end point 113 (d1= $\Delta d_{k,i}$); the end point 115 (d1=$\Delta d_{k,i+1}$); and their midpoint 114 (d1=($\Delta d_{k,i}$+$\Delta d_{k,i+1}$)/2). Accordingly, the area calculator 128 computes an approximation for the area of the region 103 according to the following Equation (9) using only the above 3 coordinates.

$$s_{\Delta d(k,i)} = \frac{\Delta d_{k,i} - \Delta d_{k,i+1}}{6}\left[p(\Delta d_{k,i+1}) + 4p\left(\frac{\Delta d_{k,i+1} + \Delta d_{k,i}}{2}\right) + p(\Delta d_{k,i})\right] \quad (9)$$

The area calculator 128 repeats cycles of the above processing, sequentially adds the computed area $s_{\Delta d\ (k,\ i)}$ to the reception power integral value S, and thereby computes the reception power integral value S. The processing described above is represented by the following Equation (10).

$$S = \sum_{k=1}^{N} \sum_{i=1}^{n} s_{\Delta d(k,i)} \quad (10)$$

The area calculator 128 stores the sequentially revised reception power integral value S in the memory 21.

Figure 38A:
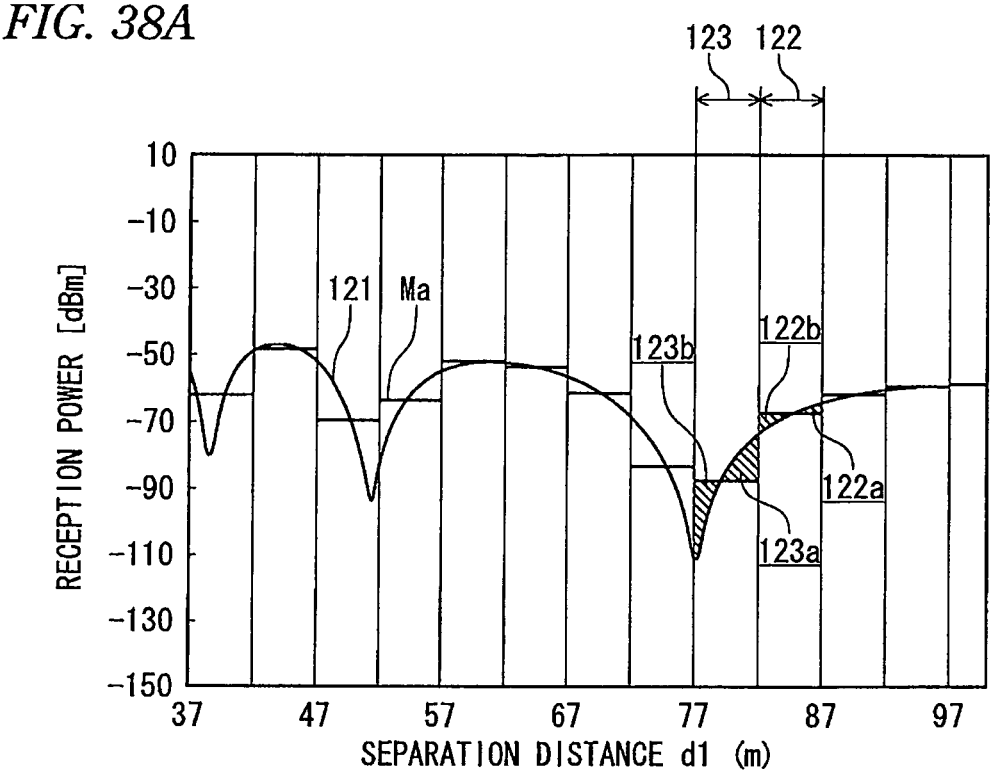
FIGS. 38A and 38B are diagrams for comparing the reception power curve and segment average values for a normal object, and the reception power curve and segment average values for a low height object.

FIG. 38A shows the reception power 121 and segment average values Ma for a normal object. The steeper the changes in slope of the reception power for the normal object in a segment, the greater the area of the region defined by the reception power curve 121 for the normal object and the straight line of the average value Ma for the segment.

An specific example follows of the above. For example, compare the area computed in the segment 122 and the area computed in the segment 123. The area computed in the segment 122 is the sum of the area of the region 122a and the area of the region 122b. However, the area computed for the section 123 is the sum of the area of the region 123a and the area of the region 123b.

It is clear from FIG. 38A that since the length of the region 123a in the vertical direction is greater than that of the region 122a, the area of the region 123a is greater than the area of the region 122a. Similarly, since the length of the region 123b in the vertical direction is greater than that of the region 122b, the area of the region 123b is also greater than the area of the region 122b.

Hence, in segments where there are steep fluctuations in reception power, since the width of change in the reception power is large, the computed area is also large.

Figure 38B:
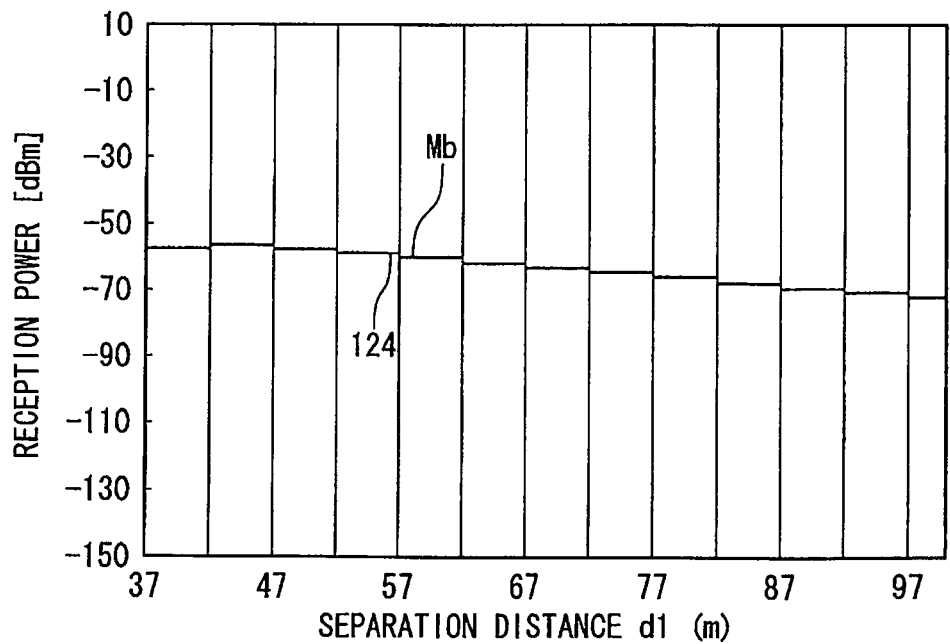

However, FIG. 38B shows reception power 124 and segment average values Mb for a low height object. Since the reception power for the low height object shows smooth fluctuations for all of the segments and there are no steep fluctuations, there is only a small area for the region defined by the curve of the reception power 124 for the low height object and the segment average value Mb, whichever of the segments is considered.

Consequently, when comparing the sum of the areas of the regions defined by the reception power curve for the normal object and the segment average values Ma against the sum of the areas of the regions defined by the reception power curve for the low height object and the segment average values Mb, the sum of the areas is greater for the regions defined by the reception power curve for the normal object and the segment average values Ma.

The number of occurrences is hence represented by the above index, the areas of the regions defined by the reception power curve of a normal object and the segment average values.

In the above embodiment, the area is computed with the separation distance on the horizontal axis. However, the area may be computed with time substituted on the horizontal axis.

In the above embodiment, the straight line of the value on the vertical axis of the segment average value of the reception power is employed for one of the boundaries when computing the area, however another straight line at a specific value on the vertical axis may be employed for this boundary line. For example, the straight line at the minimum segment value on the vertical axis, the straight line at the maximum segment value on the vertical axis, or a straight line at the central segment value on the vertical axis may be employed as this straight line.

Figure 39A:
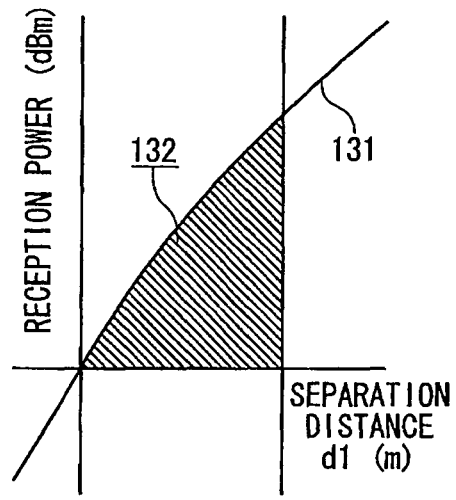
FIGS. 39A, 39B and 39C are diagrams for comparing between areas of standardized power for a normal object and standardized power for a low height object.

This can be demonstrated by, for example, comparing a normal object and a low height object using the area of the region defined by boundaries of the reception power curve and the straight line at the minimum segment value on the vertical axis for a given segment. FIG. 39A shows the area of reception power 131 for a normal object in a given section as region 132.

Figure 39B:
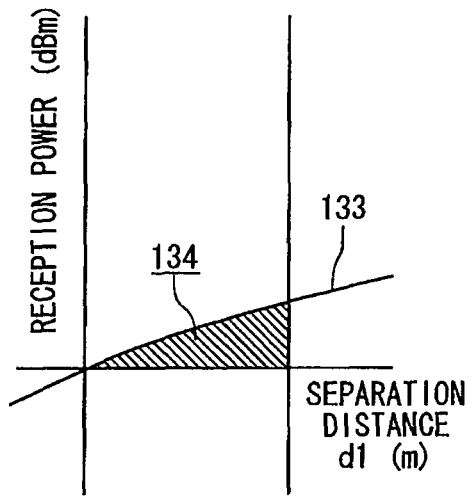

However, FIG. 39B shows the area of reception power 133 for a low height object in a given section as region 134. The amount of change of the standardized power for the normal object is greater than the amount of change of the standardized power for the low height object, hence the area of the region 132 is greater that the area of the region 134.

Consequently, the number of occurrences is represented by the index of the area of the region defined by boundaries of the reception power curve and the straight line at the minimum segment value on the vertical axis. For similar reasons, the area of a region defined by boundaries of the reception power curve and a straight line at another specific value on the vertical axis (such as, for example, the maximum segment value or the central segment value) is also an index reflecting the number of occurrences.

While in the above embodiment, the straight line at the value on the vertical axis of the segment average value of reception power is employed as one of the boundaries when computing area, configuration may be made with a curved line for this boundary. For example, a free space loss curve may be employed. This can be demonstrated by, for example, comparing a normal object and a low height object of the area in a given segments of regions defined by boundaries of the reception power curve and a free space loss curve.

Figure 39C:
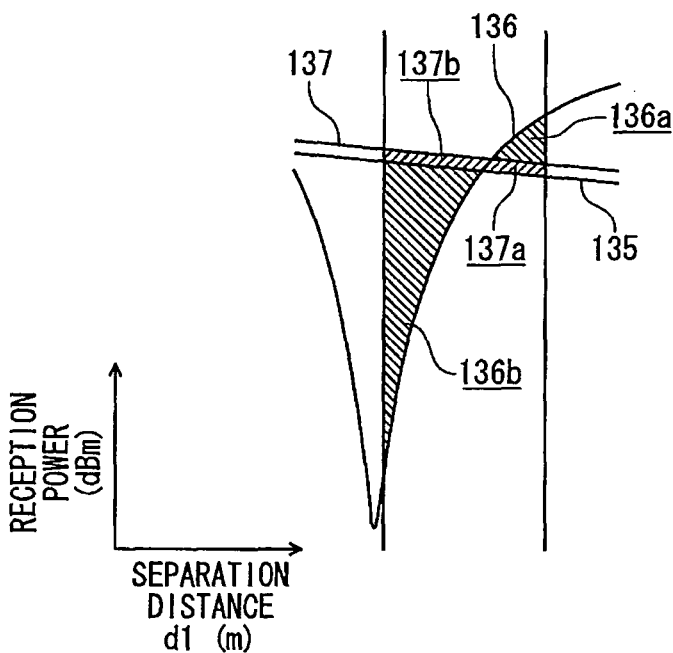

In FIG. 39C, for a normal object, the area in a given segment of the region defined by boundaries of reception power curve 136 and free space loss curve 135 is given by the sum of the area of the region 136a and the area of the region 136b. However, for a low height object, the area in a given segment of the region defined by boundaries of the reception power curve 137 and the free space loss curve 135 is given by the sum of the area of the region 137a and the area of the region 137b.

It can be clearly seen from FIG. 39C that the computed area for the normal object is greater than the computed area for the low height object. Accordingly, a curved may be employed as a boundary when computing area.

Curved lines for the boundary are not limited to free space loss curves, and any curved line approximation for reception power characteristics from an object using a mathematical least square method may be employed. The line of the boundary may be a specific line (including straight lines and curved lines) sloping down to the right.

Accordingly, a predetermined specific line, including straight lines and curved lines, is used for a boundary when computing the area.

Integration Range During Low height object Distinguishing Processing

Figure 40:
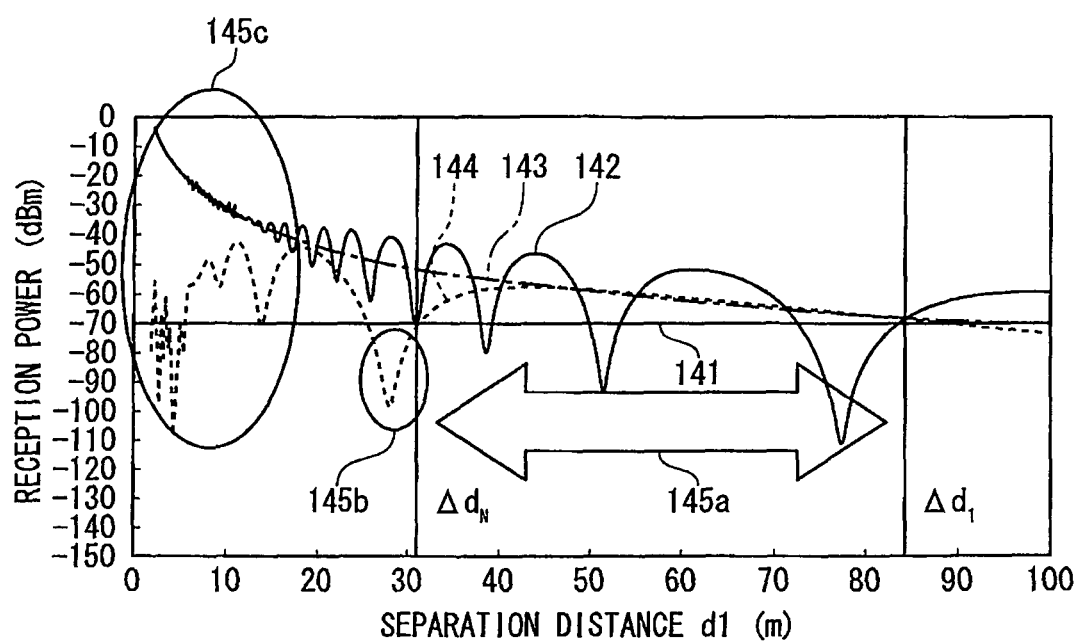
FIG. 40 illustrates a method for specifying the range for integration of absolute values of standardized power.

Next, with reference to FIG. 40, the specification of the integration range to increase the efficiency and enhance the precision of low height object distinguishing processing is described. FIG. 40 shows a detection threshold value 141, a reception power curve 142 for a normal object, a theoretical reception power curve of free space propagation loss 143, a reception power curve 144 for a low height object, an integration range 145a from $\Delta d_1$ to $\Delta d_N$, a widest ranged canceling out location 145b, and a near region 145c.

The low height object has a low return power value due to the narrow RCS. In order to suppress computational load as much as possible, the area calculator 128 determines the start point as a position where exceeding a predetermined threshold value is anticipated. For example, in FIG. 40 the integration start position is at $\Delta d_1$.

The area calculator 128 references the result computed for the highest conceivable height for a low height object, and determines the end point to be a position further away than the widest ranged canceling out location present at the greatest separation distance in the range of the radar field.

For example, the integration end position in FIG. 40 is taken as $\Delta d_N$. Accordingly, the area calculator 128 computes the area of the standardized power as the integration range 145a from $\Delta d_1$ to $\Delta d_N$.

Since significant antenna directionality starts to occur in the near region 145c, at a separation distance of 20 m or less, large fluctuations occur in the condition of the propagation characteristic, and hence this region is excluded from the integration section.

Low height object Distinguishing Processing Integration Results

Figure 41A:
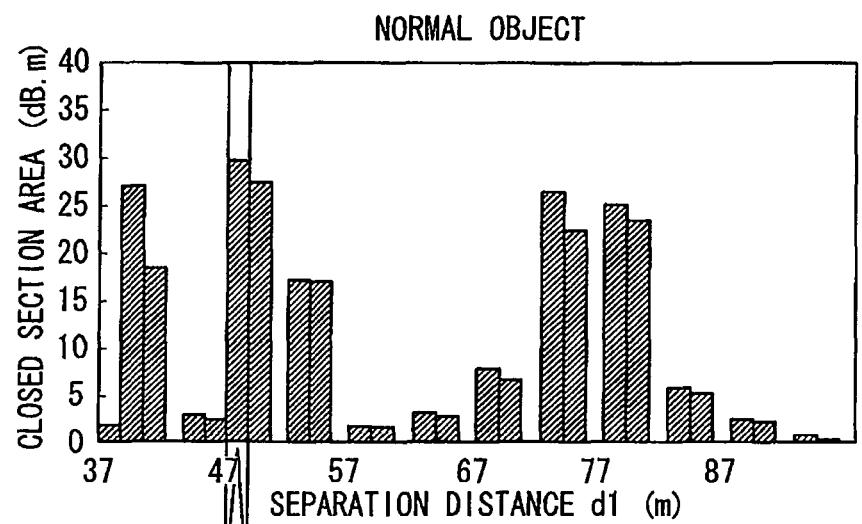
FIG. 41A and FIG. 41B illustrate separation distance characteristics of integral values for each segment.
Figure 41B:
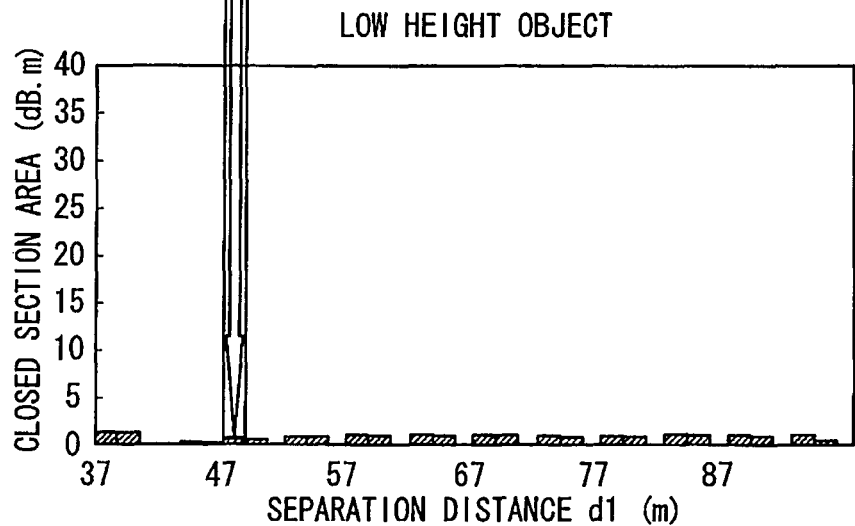

FIG. 41A and FIG. 41B show an example of integration results from low height object distinguishing processing. Looking at the section indicated by the arrows where separation distance d1 is close to 47 m, it can be seen that a sufficiently large difference (up to a multiple of 10 to 30 time) arises from numerical comparison of a single closed segment alone.

The area calculator 128 successively adds the sum of the segment areas to the sum of the segment areas, and stores the added-to sum of the segment areas in the memory 21. The detection section 129 reads out the sum of the segment areas from the memory 21 and determines that the object is a normal object when the sum of the segment integral value exceeds a specific threshold value, and outputs this distinguishing result to the target output section 30.

Accordingly, by distinguishing using the sum of the segment integral values, since differences between a normal object and a low height object show up as large differences, high precision distinguishing can be achieved with plenty of leeway.

The object may be determined to be a normal object when any of the segment integral values exceeds a specific threshold value.

When this approach is adopted, since determination can be made prior to computing all of the segment integral values, determination of a normal object can be made even when there is a greater separation distance between the radar and the object. As a result, vehicle deceleration and/or object avoidance action can then be performed with even more time leeway.

The detection section 129 may determine that the object is a normal object when the number of times the segment integral values exceed a specific threshold value exceeds a predetermined number of times.

When this approach is adopted, since determination can be made prior to computing all of the segment integral values, determination of a normal object can be made even when there is a greater separation distance between the radar and the object. As a result, vehicle deceleration and/or object avoidance action can then be performed with even more time leeway.

Figure 42:
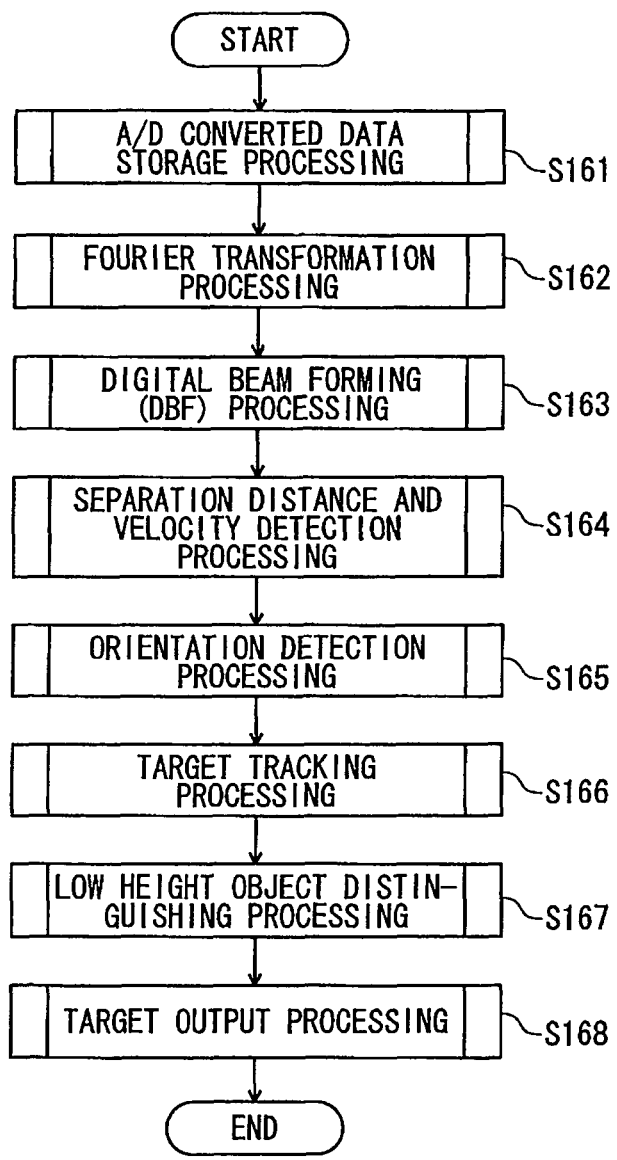
FIG. 42 illustrates a target extraction processing.

Next, target extraction processing is described, with reference to FIG. 42. The signal processor 20 stores A/D converted beat signals for each of the channels corresponding to each of the reception antennae $1_1$ to $1_n$ in the memory 21 (step S161). The reception power calculator 22 then performs Fourier transformation on the beat signals for each of the channels corresponding to each of the reception antennae $1_1$ to $1_n$, and computes signal levels (step S162).

The reception power calculator 22 outputs values Fourier transformed in the time direction for each of the antennae to the DBF section 23. The reception power calculator 22 also outputs to the separation distance detector 24 the frequency modulation width $\Delta f$, and the object frequencies in the up-shifting portions and the object frequencies in the down-shifting portions. The reception power calculator 22 also outputs to the velocity detector 25 the central frequency $f_0$ and the object frequencies in the up-shifting portions and the object frequencies in the down-shifting portions. The reception power calculator 22 also outputs to the area calculator 128 the reception power as a function of separation distance. When the intensity of a reception wave cannot be detected then the reception power calculator 22 outputs to the target output section 30 data representing that there are no target candidates.

The DBF section 23 then performs further Fourier transformation in the antenna array direction on the values input from the reception power calculator 22 for each antenna that were Fourier transformed in the time direction, calculates spatial complex numbers for each angle channel corresponding to the angular resolution, and outputs the result for each of the beat frequencies to the orientation detector 26 (step S163).

The separation distance detector 24 then computes the separation distance from the frequency modulation width $\Delta f$ and the object frequencies in the up-shifting portions and the object frequencies in the down-shifting portions that have been input from the reception power calculator 22 (step S164). The velocity detector 25 computes the relative velocity from the central frequency and the object frequencies in the up-shifting portions and the object frequencies in the down-shifting portions that have been input from the reception power calculator 22 (step S169).

The orientation detector 26 then outputs to the target tracking section 27 the angle exhibited by the value having the greatest amplitude from the computed spatial complex numbers for each of the computed beat frequencies, as an orientation where an object is present (step S165).

The target tracking section 27 then determines that the object detected this time is the same as the object detected 1 cycle previously when the absolute values of differences, between the respective values of the separation distance, relative velocity and orientation of the object computed this time and the respective values of the separation distance, relative velocity and orientation of the object computed 1 cycle previously and read from the memory 21, are each smaller than respective determined values for each value type. The target tracking section 27 refreshes the values of the separation distance, relative velocity and orientation of the object in the memory 21 and outputs an identification number of the object to the area calculator 128 (step S166).

The area calculator 128 then acquires the reception power, this being the function with respect to the separation distance output from the reception power calculator 22. The area calculator 128 computes in a specific separation distance segment the area of the region defined by boundaries of curve representing this function and a straight line determined based on the average value of the power of the electromagnetic wave received. The area calculator 128 sequentially adds the segment area to the sum of segment areas computed up to that point in time, and stores the post addition sum of the segment areas in the memory 21.

The detection section 129 reads out the sum of the segment areas from the memory 21, determines whether or not the object is a low height object based on the sum of areas, and outputs to the target output section 30 data representing whether the object is a low height object or a normal object (step S167).

When the object is a normal object the target output section 30 then outputs the identification number of this object as a target (step S168). When the target output section 30 has acquired the determination results of plural objects and all of these objects are normal object, the target output section 30 then outputs as a target the identification number of an object in the path of the vehicle.

When the target output section 30 has acquired determination results for plural objects and all of the objects are normal objects, with two or more of these objects being in the path of the vehicle, the target output section 30 then outputs as a target the identification number of the object read from the memory 21 with the greatest number of times of target tracking processing. This completes the processing in FIG. 42.

Figure 43:
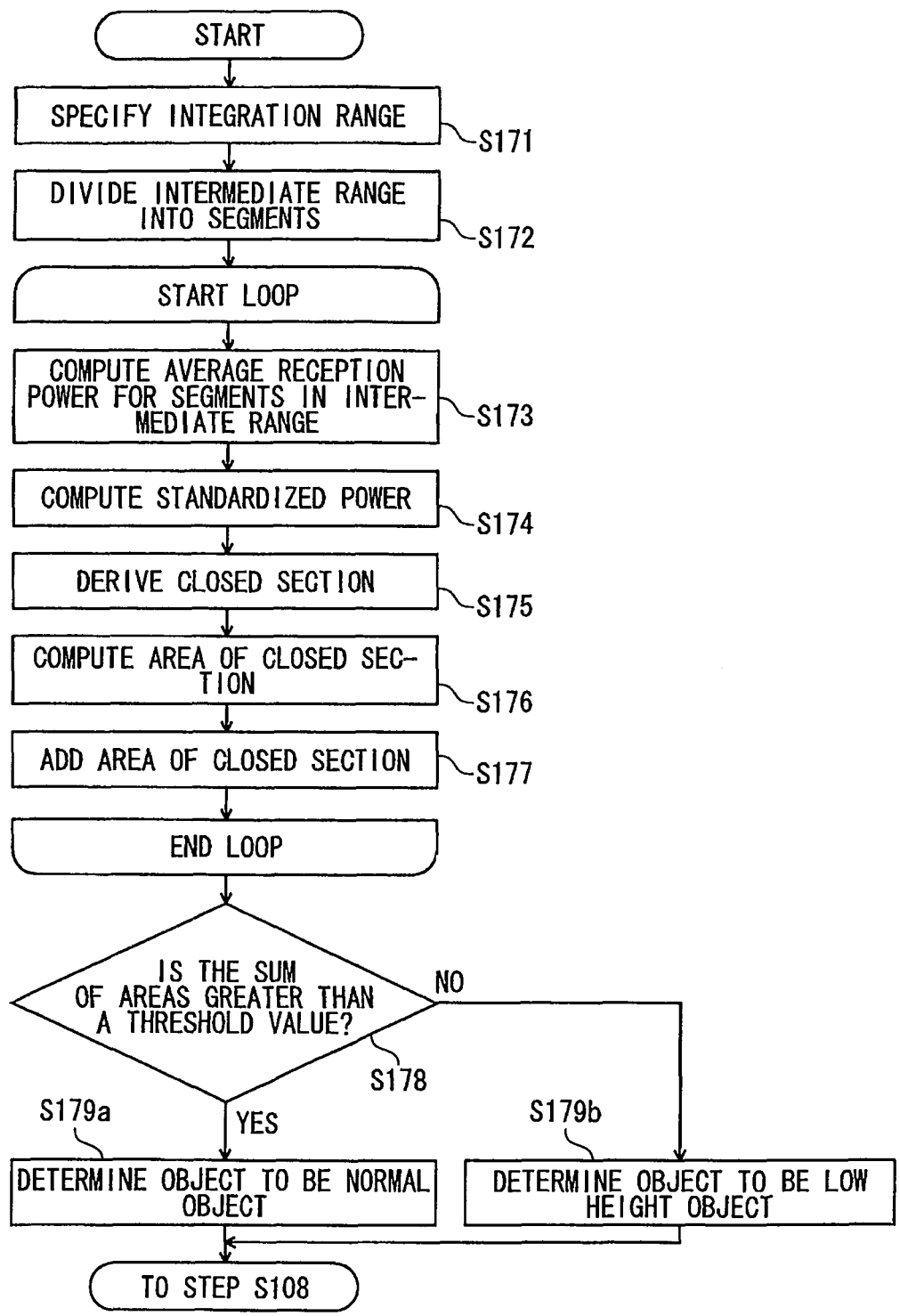
FIG. 43 illustrates low height object distinguishing processing.

Next, details of the low height object distinguishing processing in the area calculator 128 and the detection section 129 is described, with reference to FIG. 43.

First, the area calculator 128 specifies the integration range with respect to the separation distance d1 between the radar and the object (step S171). The area calculator 128 then divides up the separation distance d1 between the radar and the object into an arbitrary number of segments (step S172).

The following step 173 to step 177 are then performed repeatedly as long as the separation distance d1 between the radar and the object is within the integration range specified at step 171.

The area calculator 128 first computes the average of the reception power in a segment (referred to below as average reception power) (step S173). The area calculator 128 then computes the standardized power by subtracting the average reception power from the reception power in the segment (step S174).

The area calculator 128 then takes the absolute value of the standardized power, and derives closed sections enclosed by the curve of the absolute values of the standardized power and the axis of separation distance d1 (step S175). The area calculator 128 then computes the area of the derived closed sections (step S176). The area calculator 128 then reads out from the memory 21 the sum of areas computed in the loop up to now, adds the computed area to the sum of the areas computed up till now, and stores the post addition sum of areas in the memory 21 (step S177). Looping is ended when the area calculator 128 has completed adding the computed areas for all of the segments to the sum of areas.

When the sum of the computed areas is greater than a specific threshold value (step S178: YES), the detection section 129 determines that the detected object is a normal object (step S179a), and outputs data indicating that the object is a normal object to the target output section 30.

However, when the sum of the computed areas does not exceed the specific threshold value (step S178: NO), the detection section 129 determines that the detected object is a low height object (step S179b), and outputs data indicating that the object is a low height object to the target output section 30. This completes the processing in FIG. 43.

While the reception power is computed as a function with respect to the separation distance in the present embodiment, it may be computed as a function with respect to time. For example, if the object is stationary, the separation distance between the radar and the object diminishes with the passage of time. Accordingly, if the reception power is expressed as a function of time, the sum of the area of the region defined with the reception power curve from a low height object as one of the boundaries will be less than the sum of the area of the region defined by the reception power curve from a normal object as one of the boundaries. Accordingly, the detection section 129 can determine whether or not the object is a low height object according to such a difference in the sum of areas.

While an electronic scanning radar apparatus is exemplified in the embodiment, a mechanically operated radar apparatus may be used. When a mechanical operated radar apparatus us used, the change in reception power with respect to separation distance is equivalent to the change in reception power with respect to separation distance when a electronic scanning radar apparatus is used.

The invention is not limited to the above embodiments, and the embodiments can be modified within a scope of the invention.

The invention claimed is:

1. A radar apparatus comprising:
 a transmission antenna configured to transmit an electromagnetic wave;
 a reception antenna configured to receive an electromagnetic wave when the transmitted electromagnetic wave has been reflected by an object;
 a reception wave acquisition section configured to acquire the received electromagnetic wave at specific intervals in time;
 a reception power calculator configured to compute power of the received electromagnetic wave as a function of an acquisition time number by the reception wave acquisition section;
 a representative point extractor configured to extract plural representative points from the function; and
 a determination section configured to determine whether the object is an overhead object positioned higher than an optical axis of the reception antenna based on the representative points.

2. The apparatus of claim 1,
wherein the representative point extractor extracts points where the function exhibits extreme values, and
wherein the determination section determines whether the object is an overhead object based on the extreme values.

3. The apparatus of claim 2, wherein the determination section counts a number of the extreme values, and determines the object to be an overhead object when the number of the extreme values exceeds a specific threshold value.

4. The apparatus of claim 3, comprising:
a memory configured to store the number of extreme values associated with respective differences in height between the object and the optical axis of the reception antenna, and
wherein the determination section extracts from the memory a height difference corresponding to the number of extreme values counted.

5. The apparatus of claim 1,
wherein the determination section computes an approximation function that approximates a relationship of the acquisition time number and power at the representative points, and determines whether the object is an overhead object based on the approximation function.

6. The apparatus of claim 5,
wherein the determination section approximates the relationship of the acquisition time number and the power at the representative points with a first order function, and determines the object to be an overhead object when a first order coefficient of the first order function exceeds a specific threshold value.

7. The apparatus of claim 5,
wherein the determination section approximates the relationship of the acquisition time number and the power at the representative points with a first order function, computes a difference at a specific acquisition time number between a value of the first order function and either the power of the received electromagnetic wave or the power at the representative point, and determines the object to be an overhead object based on the difference.

8. The apparatus of claim 5,
wherein the determination section approximates the relationship of the acquisition time number and power at the representative points with a first order function, approximates the relationship of the acquisition time number and power at the representative points with a second order or higher function, computes a difference at a specific acquisition time number between a value of the first order function and a value of the second order or higher function, and determines the object to be an overhead object based on the difference.

9. The apparatus of claim 1,
wherein the determination section determines whether the object is an overhead object based on power at a representative point at a predetermined acquisition time number.

10. The apparatus of claim 9,
wherein the determination section computes a difference between the power at the representative point at the predetermined acquisition time number and the power at the representative point at a specific acquisition time number, and determines whether the object is an overhead object based on the difference.

11. The apparatus of claim 9,
wherein the determination section approximates a relationship of the acquisition time number and power at the representative points with a second order or higher function, computes the power at the representative point at the predetermined acquisition time number and the value of the second order or higher function at a specific acquisition time number, and determines whether the object is a overhead object based on the difference.

12. The apparatus of claim 1,
wherein the determination section computes a radar cross section of the object based on power at the representative points, computes an estimated power value of the received electromagnetic wave for a specific acquisition time number based on the radar cross section, and determines the object to be an overhead object based on the estimated power value.

13. The apparatus of claim 12,
wherein the determination section computes a difference between the estimated power value at the specific acquisition time number and power at a representative point of the acquisition time number, and determines the object to be an overhead object based on the difference.

14. The apparatus of claim 12,
wherein the determination section computes an approximation function approximating a relationship of the acquisition time number and power at the representative points, computes a difference between the estimated power value and the value the approximation function at a specific acquisition time number, and determines the object to be an overhead object based on the difference.

15. The apparatus of claim 1,
wherein the representative point extractor extracts the plural representative points from the power of received electromagnetic wave in a specific range of acquisition time numbers, and
wherein the determination section determines whether the object is an overhead object based on the plural representative points at the specific acquisition time numbers.

16. The apparatus of claim 15,
wherein the determination section determines the object to be an overhead object when a downward pointing dip is present in a path traced by the plural representative points against acquisition time number at the specific acquisition time numbers.

17. The apparatus of claim 15,
wherein the determination section determines the object to be an overhead object when there is a local minimum value in a curve connecting together in acquisition time number sequence the plural representative points at the specific acquisition time numbers.

18. The apparatus of claim 15,
wherein the determination section approximates the power at the plural representative points against acquisition time number with a quadratic function at the specific acquisition time numbers, computes the acquisition time number exhibited by a local minimum value or smallest value of the quadratic function, and determines whether the object is an overhead object based on the acquisition time number exhibited at the local minimum value or the smallest value.

19. The apparatus of claim 18, comprising:
a memory configured to store the acquisition time numbers associated with respective height differences between the object and the optical axis of the reception antenna, and
wherein the determination section extracts from the memory a height difference corresponding with the acquisition time number exhibited by the local minimum value or the smallest value.

20. A computer program to cause a computer to execute processing, the processing comprising:
- acquiring an electromagnetic wave received by a reception antenna at specific intervals in time;
- computing power of the received electromagnetic wave as a function of an acquisition time number;
- extracting plural representative points from the function; and
- determining whether the object is an overhead object positioned higher than an optical axis of the reception antenna based on the representative points.

21. A radar apparatus comprising:
- a transmission antenna configured to transmit an electromagnetic wave;
- a reception antenna configured to receive an electromagnetic wave when the transmitted electromagnetic wave has been reflected by an object;
- a separation distance detector configured to detect separation distance to the object based on the received electromagnetic wave;
- a reception power calculator configured to compute power of the received electromagnetic wave as a function of the detected separation distance;
- an area calculator configured to compute area of a region in a specific separation distance segment defined by a curve representing the function as one boundary; and
- a detection section configured to determine whether the object is a low height object based on the computed area.

22. The apparatus of claim 21, wherein the detection section computes the area based on intensity of the reception wave only when the separation distance is within a specific range.

23. A radar apparatus comprising:
- a transmission antenna configured to transmit an electromagnetic wave;
- a reception antenna configured to receive an electromagnetic wave when the transmitted electromagnetic wave has been reflected by an object;
- a reception power calculator configured to compute power of the received electromagnetic wave as a function of time;
- an area calculator configured to compute area of a region in a specific time segment defined by a curve representing the function as one boundary; and
- a detection section configured to determine whether the object is a low height object based on the computed area.

24. The apparatus of claim 23, wherein the detection section computes the area based on intensity of the reception wave only when the time is within a specific range.

25. The apparatus of claim 21, wherein the area calculator computes area of a region defined by the curve and a specific straight line as boundaries, or computes the area of a region defined by the curve and a specific curve as boundaries.

26. The apparatus of claim 21, wherein the area calculator computes area of a region defined by the curve and a specific straight line determined according to an average value of received reception wave power as boundaries.

27. The apparatus of claim 21, wherein the detection section determines that the object is a normal object when a sum of areas over plural segments exceeds a specific threshold value.

28. The apparatus of claim 21, wherein the detection section determines that the object is a normal object when an area in any segment from plural segments exceeds a specific threshold value.

29. The apparatus of claim 21, wherein the detection section determines that the object is a normal object when a number of times the area exceeds a specific threshold value has exceeded a predetermined number of times.

30. The apparatus of claim 23, wherein the area calculator computes area of a region defined by the curve and a specific straight line as boundaries, or computes the area of a region defined by the curve and a specific curve as boundaries.

31. The apparatus of claim 23, wherein the area calculator computes area of a region defined by the curve and a specific straight line determined according to an average value of received reception wave power as boundaries.

32. The apparatus of claim 23, wherein the detection section determines that the object is a normal object when a sum of areas over plural segments exceeds a specific threshold value.

33. The apparatus of claim 23, wherein the detection section determines that the object is a normal object when an area in any segment from plural segments exceeds a specific threshold value.

34. The apparatus of claim 23, wherein the detection section determines that the object is a normal object when a number of times the area exceeds a specific threshold value has exceeded a predetermined number of times.

35. A non-transitory computer readable medium storing instructions executed by a processor, the instructions comprising:
- acquiring an electromagnetic wave received by a reception antenna at specific intervals in time;
- computing power of the received electromagnetic wave as a function of an acquisition time number;
- extracting plural representative points from the function; and
- determining whether the object is an overhead object positioned higher than an optical axis of the reception antenna based on the representative points.

* * * * *